US012362463B2

(12) United States Patent
Yang et al.

(10) Patent No.: US 12,362,463 B2
(45) Date of Patent: Jul. 15, 2025

(54) WIRELESS EARPHONE

(71) Applicant: Huawei Technologies Co., Ltd., Shenzhen (CN)

(72) Inventors: Chungwen Yang, Dongguan (CN); Hanyang Wang, Reading (GB); Huiliang Xu, Dongguan (CN); Zhongying Long, Dongguan (CN); Junhong Zhang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 307 days.

(21) Appl. No.: 18/044,924

(22) PCT Filed: Aug. 4, 2021

(86) PCT No.: PCT/CN2021/110421
§ 371 (c)(1),
(2) Date: Mar. 10, 2023

(87) PCT Pub. No.: WO2022/052675
PCT Pub. Date: Mar. 17, 2022

(65) Prior Publication Data

US 2024/0021976 A1 Jan. 18, 2024

(30) Foreign Application Priority Data

Sep. 10, 2020 (CN) ........................ 202010944636.7

(51) Int. Cl.
*H01Q 1/27* (2006.01)
*H01Q 1/48* (2006.01)
(Continued)

(52) U.S. Cl.
CPC ........... *H01Q 1/273* (2013.01); *H04R 1/1016* (2013.01); *H04R 1/1041* (2013.01); *H04R 1/1058* (2013.01); *H04R 2420/07* (2013.01)

(58) Field of Classification Search
CPC .............. H04R 2420/07; H04R 1/1016; H04R 1/1041; H04R 2225/51; H04R 1/1091;
(Continued)

(56) References Cited

U.S. PATENT DOCUMENTS

2017/0201821 A1* 7/2017 McAuliffe ........... H04R 1/1066
2018/0035193 A1* 2/2018 Tsubone ................... H04R 1/24
(Continued)

FOREIGN PATENT DOCUMENTS

CN 110650405 A 1/2020
CN 210838065 U 6/2020

*Primary Examiner* — Wei (Victor) Y Chan
(74) *Attorney, Agent, or Firm* — Conley Rose, P.C.

(57) ABSTRACT

A wireless earphone, including an earbud part, an earbud stem part, and an antenna unit disposed in the earbud part and the earbud stem part. The antenna unit includes: a first antenna radiator having a first end fed by a first feeding unit and a second antenna radiator having a second end fed by a second feeding unit, where the second end and the first end are disposed at intervals; and a third antenna radiator having a first ground point and a third end. At least a part of the third antenna radiator is located in the earbud part. One of the first and second antenna radiators is located in the earbud part, and the other is located in the earbud stem part; or at least a part of the first and second antenna radiators both are located in the earbud stem part.

20 Claims, 64 Drawing Sheets

(51) Int. Cl.
*H01Q 9/42* (2006.01)
*H01Q 21/28* (2006.01)
*H04R 1/10* (2006.01)

(58) Field of Classification Search
CPC ........ H04R 1/1058; H01Q 1/243; H01Q 9/42; H01Q 21/28; H01Q 1/48; H01Q 1/273; H01Q 5/328; H01Q 5/35
See application file for complete search history.

(56) References Cited

U.S. PATENT DOCUMENTS

2018/0367899 A1* 12/2018 Lee ........................ H01Q 1/273
2019/0103661 A1* 4/2019 Cousins ................. H01Q 1/273

* cited by examiner (a) (b)

(a) (b)

(a) (b)

(a) (b)

(a) (b)

(a) (b)

WIRELESS EARPHONE

CROSS-REFERENCE TO RELATED APPLICATIONS

This is a U.S. National Stage of International Patent Application No. PCT/CN2021/110421 filed on Aug. 4, 2021, which claims priority to Chinese Patent Application No. 202010944636.7 filed on Sep. 10, 2020, both of which are hereby incorporated by reference in their entireties.

TECHNICAL FIELD

Embodiments of this application relate to the field of wireless device technologies, and in particular, to a wireless earphone.

BACKGROUND

A wireless earphone, especially a true wireless stereo (TWS, True Wireless Stereo) Bluetooth (BT, Bluetooth) earphone, is increasingly loved by a user because of convenience and miniaturization. However, because the TWS earphone is directly worn on the ear of the user, antenna performance of the TWS earphone is likely to be affected by the head of the user. Consequently, it is relatively difficult to implement excellent antenna performance.

SUMMARY

This application provides a wireless earphone, to increase communication functions of a wireless earphone with a narrow inner cavity by setting a plurality of antennas in the wireless earphone.

According to a first aspect, a wireless earphone is provided. The wireless earphone includes an earbud part, an earbud stem part, and an antenna unit disposed in the earbud part and the earbud stem part. The antenna unit includes:

- a first antenna radiator, where the first antenna radiator includes a first end;
- a first feeding unit, where the first feeding unit is electrically connected to the first end, to feed the first antenna radiator,
- a second antenna radiator, where the second antenna radiator includes a second end, and the second end of the second antenna radiator and the first end of the first antenna radiator are disposed at intervals;
- a second feeding unit, where the second feeding unit is electrically connected to the second end, to feed the second antenna radiator; and
- a third antenna radiator, where the third antenna radiator includes a first ground point, at least a part of the third antenna radiator is located in the earbud part, the third antenna radiator includes a third end, a distance between the third end and the first end is less than a first preset threshold, and a distance between the third end and the second end is less than the first preset threshold.

At least a part of one of the first antenna radiator and the second antenna radiator is located in the earbud part, and the other is located in the earbud stem part; or at least a part of the first antenna radiator and at least a part of the second antenna radiator both are located in the earbud stem part.

In this application, an inner cavity of the wireless earphone having the earbud and the earbud stem is generally relatively narrow. Because one end of a grounded antenna radiator is close the other two antenna radiators, a dual-antenna structure may be formed in the wireless earphone.

The dual-antenna structure is disposed in the wireless earphone with a narrow inner cavity, so as to help increase communication functions of the wireless earphone. In addition, the first antenna radiator and the second antenna radiator share the grounded third antenna radiator, so as to help obtain relatively good isolation, and reduce occupation of an internal space of the wireless earphone.

With reference to the first aspect, in some implementations of the first aspect, an extension direction of the first antenna radiator at the first end is a first direction, and an extension direction of the second antenna radiator at the second end is a second direction, where an included angle between the first direction and the second direction ranges from 90° to 270°.

With reference to the first aspect, in some implementations of the first aspect, an included angle between the first direction and the second direction ranges from 135° to 225°.

With reference to the first aspect, in some implementations of the first aspect, the first end of the first antenna radiator is disposed opposite to the second end of the second antenna radiator.

With reference to the first aspect, in some implementations of the first aspect, an extension direction of an end that is of the first antenna radiator and that is close to the first feeding unit is a first direction, and an extension direction of an end that is of the second antenna radiator and that is close to the second feeding unit is a second direction, where an included angle between the first direction and the second direction is greater than a second preset threshold.

With reference to the first aspect, in some implementations of the first aspect, the second preset threshold is one of the following angle values: 90°, 120°, 150°, and 160°.

With reference to the first aspect, in some implementations of the first aspect, the wireless earphone meets at least one of the following:

When the first feeding unit feeds the first antenna radiator and the second feeding unit feeds the second antenna radiator, a first current is formed on the first antenna radiator, a second current is formed on the second antenna radiator, the first antenna radiator and the third antenna radiator are coupled to form a first ground current on the third antenna radiator, and the second antenna radiator and the third antenna radiator are coupled to form a second ground current on the third antenna radiator, where a sum of the first current and the first ground current is a first equivalent current, a sum of the second current and the second ground current is a second equivalent current, and an included angle between a direction of the first equivalent current and a direction of the second equivalent current is greater than a third preset threshold.

When the first feeding unit feeds the first antenna radiator and the second feeding unit feeds the second antenna radiator, a first current is formed on the first antenna radiator, a second current is formed on the second antenna radiator, the first antenna radiator and the third antenna radiator are coupled to form a first ground current on the third antenna radiator, and the second antenna radiator and the third antenna radiator are coupled to form a second ground current on the third antenna radiator, where a direction of the first ground current is the same as a direction of the second ground current, and an included angle between a direction of the first current and a direction of the second current is greater than a fourth preset threshold.

In this application, a placement direction of an antenna radiator, an equivalent current direction, and/or a current direction are/is adjusted, so as to help increase a head phantom directivity mode difference between a first antenna and a second antenna in a dual-antenna structure, help improve antenna performance of the wireless earphone, and further help improve data transmission efficiency, an audio play effect, and the like of the wireless earphone.

With reference to the first aspect, in some implementations of the first aspect, the earbud stem part includes a connecting segment, a top segment, and a bottom segment, the connecting segment is located between the top segment and the bottom segment, and the connecting segment is a region connected to the earbud part and the earbud stem part; and the first antenna radiator includes a part extending from the connecting segment to the top segment, and the second antenna radiator includes a part extending from the connecting segment to the bottom segment; or the first antenna radiator includes a part extending from the connecting segment to the earbud part, and the second antenna radiator includes a part extending from the connecting segment the bottom segment; or the first antenna radiator includes a part extending from the connecting segment to the top segment, and the second antenna radiator includes a part extending from the connecting segment to the earbud part.

With reference to the first aspect, in some implementations of the first aspect, the earbud stem part includes a connecting segment and a bottom segment, the connecting segment is connected between the earbud part and the bottom segment, the first antenna radiator includes a part extending from the connecting segment to the earbud part, and the second antenna radiator includes a part extending from the connecting segment to the bottom segment.

In this application, a location of an antenna radiator in the wireless earphone is flexibly adjusted, so as to help adjust antenna performance that can be implemented by the wireless earphone, and further help adjust data transmission efficiency, an audio play effect, and the like of the wireless earphone.

With reference to the first aspect, in some implementations of the first aspect, the third antenna radiator further includes a fourth end located in the earbud part.

In this application, a space of the earbud part is used to accommodate the third antenna radiator, so as to help obtain relatively good antenna performance.

With reference to the first aspect, in some implementations of the first aspect, the second antenna radiator extends in a length direction of the earbud stem part, and the third antenna radiator further includes a fourth end and a fifth end, where the fourth end is located in the earbud part; and the third end is connected between the fourth end and the fifth end, the third antenna radiator extends from the fourth end to the third end and extends from the third end to the fifth end, and a part that is of the third antenna radiator and that is between the third end and the fifth end includes a first mutual-interference reduction segment, a second mutual-interference reduction segment, and a mutual-interference reduction segment connecting segment, where the mutual-interference reduction segment connecting segment is connected between the first mutual-interference reduction segment and the second mutual-interference reduction segment, both the first mutual-interference reduction segment and the second mutual-interference reduction segment extend in the length direction of the earbud stem part, and both a distance between the first mutual-interference reduction segment and the second antenna radiator and a distance between the second mutual-interference reduction segment and the second antenna radiator are less than a preset distance.

In this application, the third antenna radiator includes a mutual-interference reduction segment, so as to help improve antenna performance corresponding to the second antenna radiator and reduce a constraint on extension of the third antenna radiator in the wireless earphone.

With reference to the first aspect, in some implementations of the first aspect, the wireless earphone further includes a loop antenna, and the loop antenna includes:

a fourth antenna radiator, where the fourth antenna radiator is located in the earbud part; and a third feeding unit, where two ends of the third feeding unit are electrically connected to two ends of the fourth antenna radiator respectively.

In this application, the loop antenna is further disposed in the wireless earphone with a narrow inner cavity, so that a three-antenna structure can be formed in the wireless earphone. This helps increase communications function of the wireless earphone.

With reference to the first aspect, in some implementations of the first aspect, when the third feeding unit feeds the fourth antenna radiator, the fourth antenna radiator operates as the loop antenna, an electrical length of the loop antenna is an integer multiple of a, and $a=(0.7\sim1.3)\times\lambda$, where $\lambda$ is a target resonance wavelength, and the target resonance wavelength corresponds to an operating frequency band of the wireless earphone.

With reference to the first aspect, in some implementations of the first aspect, the earbud part is truncated-cone-shaped, and the fourth antenna radiator is circumferentially disposed relative to the earbud part.

With reference to the first aspect, in some implementations of the first aspect, the fourth antenna radiator is umbrella-shaped, the fourth antenna radiator includes a plurality of umbrella bone edges and a plurality of umbrella bone connecting edges, only one umbrella bone connecting edge is connected between two adjacent umbrella bone edges, the plurality of umbrella bone edges include a target umbrella bone edge, the plurality of umbrella bone connecting edges include a first umbrella bone connecting edge and a second umbrella bone connecting edge, the target umbrella bone edge is connected between the first umbrella bone connecting edge and the second umbrella bone connecting edge, and the first umbrella bone connecting edge and the second umbrella bone connecting edge are respectively located at two ends of the target umbrella bone edge.

In this application, a structure of an antenna radiator is flexibly adjusted, so as to help adjust antenna performance that can be implemented by the wireless earphone, and further help adjust data transmission efficiency, an audio play effect, and the like of the wireless earphone.

With reference to the first aspect, in some implementations of the first aspect, an included angle between a target plane of the fourth antenna radiator and a first direction is less than a seventh preset threshold, and an included angle between the target plane and a second direction is less than the seventh preset threshold, where the target plane is a plane that is perpendicularly disposed relative to an axis of the fourth antenna radiator, the first direction is an extension direction of an end that is of the first antenna radiator and that is close to the first feeding unit, and the second direction is an extension direction of an end that is of the second antenna radiator and that is close to the second feeding unit.

With reference to the first aspect, in some implementations of the first aspect, the wireless earphone meets the following:

When the first feeding unit feeds the first antenna radiator, the second feeding unit feeds the second antenna radiator, and the third feeding unit feeds the fourth antenna radiator, a first current is formed on the first antenna radiator, a second current is formed on the second antenna radiator, the first antenna radiator and the third antenna radiator are coupled to form a first ground current on the third antenna radiator, and the second antenna radiator and the third antenna radiator are coupled to form a second ground current on the third antenna radiator, where a sum of the first current and the first ground current is a first equivalent current, a sum of the second current and the second ground current is a second equivalent current, a third equivalent current is formed on the fourth antenna radiator, an included angle between the first equivalent current and the third equivalent current is greater than a third preset threshold, and an included angle between the second equivalent current and the third equivalent current is greater than the third preset threshold.

In this application, a placement direction of an antenna radiator, an equivalent current direction, and/or a current direction are/is adjusted, so as to help increase a head phantom directivity mode difference between a loop antenna and another antenna in a dual-antenna structure, help improve antenna performance of the wireless earphone, and further help improve data transmission efficiency, an audio play effect, and the like of the wireless earphone.

With reference to the first aspect, in some implementations of the first aspect, the wireless earphone further includes a battery, the battery is located in the earbud part, and both the first antenna radiator and the second antenna radiator are located in the earbud stem part.

In this application, a location of the battery in the wireless earphone is flexibly adjusted, so as to help adjust antenna performance that can be implemented by the wireless earphone, and further help adjust data transmission efficiency, an audio play effect, and the like of the wireless earphone.

With reference to the first aspect, in some implementations of the first aspect, the first antenna radiator includes a first segment and a second segment, where the first segment extends in the length direction of the earbud stem part, the second segment is spiral-shaped, and the first segment is connected between the first feeding unit and the second segment.

The first antenna radiator extends in the length direction of the earbud stem part.

In this application, a location of an antenna radiator in the wireless earphone is flexibly adjusted, so as to help adjust antenna performance that can be implemented by the wireless earphone, and further help adjust data transmission efficiency, an audio play effect, and the like of the wireless earphone.

With reference to the first aspect, in some implementations of the first aspect, the second segment is perpendicularly disposed relative to the length direction of the earbud stem part.

In this application, a location of an antenna radiator in the wireless earphone is flexibly adjusted, so as to help adjust antenna performance that can be implemented by the wireless earphone, and further help adjust data transmission efficiency, an audio play effect, and the like of the wireless earphone.

With reference to the first aspect, in some implementations of the first aspect, the second antenna radiator and the first antenna radiator are respectively located at two ends of the earbud stem part.

In this application, a location of an antenna radiator in the wireless earphone is flexibly adjusted, so as to help adjust antenna performance that can be implemented by the wireless earphone, and further help adjust data transmission efficiency, an audio play effect, and the like of the wireless earphone.

With reference to the first aspect, in some implementations of the first aspect, a difference between a width of the second antenna radiator and a width of the first antenna radiator is less than a preset width.

In this application, a structure of an antenna radiator is flexibly adjusted, so as to help adjust antenna performance that can be implemented by the wireless earphone, and further help adjust data transmission efficiency, an audio play effect, and the like of the wireless earphone.

With reference to the first aspect, in some implementations of the first aspect, the wireless earphone further includes a battery, the battery is located in the earbud stem part, and the battery is disposed in the length direction of the earbud stem part.

In this application, a location of the battery in the wireless earphone is flexibly adjusted, so as to help adjust antenna performance that can be implemented by the wireless earphone, and further help adjust data transmission efficiency, an audio play effect, and the like of the wireless earphone.

With reference to the first aspect, in some implementations of the first aspect, when the first feeding unit feeds the first antenna radiator, the first antenna radiator and the third antenna radiator operate as a first antenna, an electrical length of the first antenna is an integer multiple of b, and $$b = \left(\frac{0.7}{2} \sim \frac{1.3}{2}\right) \times \lambda;$$

and when the second feeding unit feeds the second antenna radiator, the second antenna radiator and the third antenna radiator operate as a second antenna, an electrical length of the second antenna is an integer multiple of c, and $$c = \left(\frac{0.7}{2} \sim \frac{1.3}{2}\right) \times \lambda,$$

where λ is the target resonance wavelength, and the target resonance wavelength corresponds to the operating frequency band of the wireless earphone.

In this application, an electrical length of an antenna radiator is flexibly adjusted, so as to help implement a resonance structure and further obtain relatively good antenna performance.

With reference to the first aspect, in some implementations of the first aspect, the operating frequency band covers a Bluetooth frequency band.

With reference to the first aspect, in some implementations of the first aspect, the first antenna radiator and the first feeding unit form a monopole antenna or an inverted F antenna.

With reference to the first aspect, in some implementations of the first aspect, the second antenna radiator and the second feeding unit form an inverted F antenna.

With reference to the first aspect, in some implementations of the first aspect, the first antenna radiator and/or the second antenna radiator are/is disposed on a housing of the wireless earphone.

In this application, an antenna radiator is disposed on the housing, so as to help reduce a space occupied by the antenna radiator in the wireless earphone.

According to a second aspect, a wireless earphone is provided. The wireless earphone includes an earbud part, an earbud stem part, and an antenna unit disposed in the earbud part and the earbud stem part. The antenna unit includes:

- a first antenna radiator, where the first antenna radiator is located in the earbud stem part and/or the earbud part, and the first antenna radiator includes a first end;
- a first feeding unit, where the first feeding unit is electrically connected to the first end, to feed the first antenna radiator;
- a second antenna radiator, where the second antenna radiator is located in the earbud stem part and/or the earbud part, and the second antenna radiator includes a second end;
- a second feeding unit, where the second feeding unit is electrically connected to the second end, to feed the second antenna radiator;
- a third antenna radiator, where the third antenna radiator includes a first ground point, the third antenna radiator is located in the earbud part, the third antenna radiator includes a third end, and a distance between the third end and the first end is less than a first preset threshold; and
- a fifth antenna radiator, where the fifth antenna radiator includes a second ground point, the fifth antenna radiator is located in the earbud part, the fifth antenna radiator includes a sixth end, and a distance between the sixth end and the second end is less than the first preset threshold.

In this application, an inner cavity of the wireless earphone having the earbud and the earbud stem is generally relatively narrow. Because one end of a grounded antenna radiator is close to the other two antenna radiators, a dual-antenna structure may be formed in the wireless earphone. The dual-antenna structure is disposed in the wireless earphone with a narrow inner cavity, so as to help increase communication functions of the wireless earphone.

With reference to the second aspect, in some implementations of the second aspect, the wireless earphone meets the following:

When the first feeding unit feeds the first antenna radiator and the second feeding unit feeds the second antenna radiator, a first current is formed on the first antenna radiator, a second current is formed on the second antenna radiator, the first antenna radiator and the third antenna radiator are coupled to form a first ground current on the third antenna radiator, and the second antenna radiator and the fifth antenna radiator are coupled to form a second ground current on the fifth antenna radiator, where a sum of the first current and the first ground current is a first equivalent current, a sum of the second current and the second ground current is a second equivalent current, and an included angle between a direction of the first equivalent current and a direction of the second equivalent current is greater than a third preset threshold.

In this application, an equivalent current direction is adjusted, so as to help increase a head phantom directivity mode difference between a first antenna and a second antenna in a dual-antenna structure, help improve antenna performance of the wireless earphone, and further help improve data transmission efficiency, an audio play effect, and the like of the wireless earphone.

According to a third aspect, a wireless earphone is provided. The wireless earphone includes an earbud part, an earbud stem part, and an antenna unit disposed in the earbud part and the earbud stem part. The antenna unit includes:

- a first antenna radiator, where the first antenna radiator is located in the earbud stem part, and the first antenna radiator includes a first end;
- a first feeding unit, where the first feeding unit is electrically connected to the first end, to feed the first antenna radiator;
- a grounded third antenna radiator, where the third antenna radiator includes a first ground point, the third antenna radiator is located in the earbud part, the third antenna radiator includes a third end, and a distance between the third end and the first end is less than a first preset threshold; and
- a loop antenna, where the loop antenna includes a fourth antenna radiator and a third feeding unit, the fourth antenna radiator is located in the earbud part, and two ends of the third feeding unit are electrically connected to two ends of the fourth antenna radiator respectively, to feed the fourth antenna radiator.

In this application, an inner cavity of the wireless earphone having the earbud and the earbud stem is generally relatively narrow. Because end parts of two grounded antenna radiators are respectively close to the other two antenna radiators, a dual-antenna structure may be formed in the wireless earphone. The dual-antenna structure is disposed in the wireless earphone with a narrow inner cavity, so as to help increase communication functions of the wireless earphone.

With reference to the third aspect, in some implementations of the third aspect, the wireless earphone meets at least one of the following:

An included angle between a target plane of the fourth antenna radiator and a first direction is less than a seventh preset threshold, where the target plane is a plane that is perpendicularly disposed relative to an axis of the fourth antenna radiator, and the first direction is an extension direction of an end that is of the first antenna radiator and that is close to the first feeding unit.

When the first feeding unit feeds the first antenna radiator and the third feeding unit feeds the fourth antenna radiator, a first current is formed on the first antenna radiator, a third equivalent current is formed on the fourth antenna radiator, and the first antenna radiator and the third antenna radiator are coupled to form a first ground current on the third antenna radiator, where a sum of the first current and the first ground current is a first equivalent current, and an included angle between the first equivalent current and the third equivalent current is greater than a third preset threshold.

In this application, a placement direction of an antenna radiator and an equivalent current direction are adjusted, so as to help increase a head phantom directivity mode difference between dual antennas in a dual-antenna structure, help improve antenna performance of the wireless earphone, and further help improve data transmission efficiency, an audio play effect, and the like of the wireless earphone.

With reference to the third aspect, in some implementations of the third aspect, the seventh preset threshold is one of the following angle values: 45°, 30°, 15°. 10°, and 5°.

With reference to the third aspect, in some implementations of the third aspect, both the target plane and the first direction are disposed in a length direction of the earbud stem part.

In this application, a location of an antenna radiator in the wireless earphone is flexibly adjusted, so as to help adjust antenna performance that can be implemented by the wireless earphone, and further help adjust data transmission efficiency, an audio play effect, and the like of the wireless earphone.

With reference to the third aspect, in some implementations of the third aspect, the earbud stem part includes a connecting segment, a top segment, and a bottom segment, the connecting segment is located between the top segment and the bottom segment, the connecting segment is connected to the earbud part, and the first antenna radiator includes a part extending from the connecting segment to the top segment.

With reference to the third aspect, in some implementations of the third aspect, the connecting segment is connected between the earbud part and the bottom segment, and the first antenna radiator includes a part extending from the connecting segment to the bottom segment.

In this application, a location of an antenna radiator in the wireless earphone is flexibly adjusted, so as to help adjust antenna performance that can be implemented by the wireless earphone, and further help adjust data transmission efficiency, an audio play effect, and the like of the wireless earphone.

With reference to the third aspect, in some implementations of the third aspect, the earbud part is truncated-cone-shaped, and the fourth antenna radiator is circumferentially disposed relative to the earbud part.

With reference to the third aspect, in some implementations of the third aspect, the fourth antenna radiator is umbrella-shaped, the fourth antenna radiator includes a plurality of umbrella bone edges and a plurality of umbrella bone connecting edges, only one umbrella bone connecting edge is connected between two adjacent umbrella bone edges, the plurality of umbrella bone edges include a target umbrella bone edge, the plurality of umbrella bone connecting edges include a first umbrella bone connecting edge and a second umbrella bone connecting edge, the target umbrella bone edge is connected between the first umbrella bone connecting edge and the second umbrella bone connecting edge, and the first umbrella bone connecting edge and the second umbrella bone connecting edge are respectively located at two ends of the target umbrella bone edge.

With reference to the third aspect, in some implementations of the third aspect, the third antenna radiator further includes a fourth end located in the earbud part.

In this application, a space of the earbud part is used to accommodate the third antenna radiator, so as to help obtain relatively good antenna performance.

With reference to the third aspect, in some implementations of the third aspect, the first antenna radiator extends in a length direction of the earbud stem part, and the third antenna radiator further includes a fourth end and a fifth end, where the fourth end is located in the earbud part; and the third end is connected between the fourth end and the fifth end, the third antenna radiator extends from the fourth end to the third end and extends from the third end to the fifth end, and a part that is of the third antenna radiator and that is between the third end and the fifth end includes a first mutual-interference reduction segment, a second mutual-interference reduction segment, and a mutual-interference reduction segment connecting segment, where the mutual-interference reduction segment connecting segment is connected between the first mutual-interference reduction segment and the second mutual-interference reduction segment, both the first mutual-interference reduction segment and the second mutual-interference reduction segment extend in the length direction of the earbud stem part, and both a distance between the first mutual-interference reduction segment and the first antenna radiator and a distance between the second mutual-interference reduction segment and the first antenna radiator are less than a preset distance.

In this application, the third antenna radiator includes a mutual-interference reduction segment, so as to help improve antenna performance corresponding to the second antenna radiator and reduce a constraint on extension of the third antenna radiator in the wireless earphone.

With reference to the third aspect, in some implementations of the third aspect, when the third feeding unit (223) feeds the fourth antenna radiator (214), the fourth antenna radiator (214) operates as the loop antenna (203), an electrical length of the loop antenna (203) is an integer multiple of a, and a=(0.7~1.3)×λ; and when the first feeding unit (221) feeds the first antenna radiator (211), the first antenna radiator (211) and the third antenna radiator (213) are coupled to form a first resonance structure whose wavelength is an integer multiple of b, and $$b=\left(\frac{0.7}{2}\sim\frac{1.3}{2}\right)\times\lambda,$$

where λ is a target resonance wavelength, and the target resonance wavelength corresponds to an operating frequency band of the wireless earphone (100).

In this application, an electrical length of an antenna radiator is flexibly adjusted, so as to help implement a resonance structure and further obtain relatively good antenna performance.

With reference to the third aspect, in some implementations of the third aspect, the operating frequency band covers a Bluetooth frequency band.

With reference to the third aspect, in some implementations of the third aspect, the wireless earphone further includes a battery, the battery is located in the earbud stem part, and the battery is disposed in the length direction of the earbud stem part.

In this application, a location of the battery in the wireless earphone is flexibly adjusted, so as to help adjust antenna performance that can be implemented by the wireless earphone, and further help adjust data transmission efficiency, an audio play effect, and the like of the wireless earphone.

With reference to the third aspect, in some implementations of the third aspect, the first antenna radiator and/or the second antenna radiator are/is disposed on a housing of the wireless earphone.

In this application, an antenna radiator is disposed on the housing, so as to help reduce a space occupied by the antenna radiator in the wireless earphone.

According to a fourth aspect, a driving method is provided. The driving method is applied to the wireless earphone according to any one of the possible implementations of the first aspect or the second aspect. The method includes at least two of the following:

driving the first feeding unit to feed the first antenna radiator, and simultaneously disabling the second feeding unit;

driving the second feeding unit to feed the second antenna radiator, and simultaneously disabling the first feeding unit; and driving the first feeding unit to feed the first antenna radiator, and simultaneously driving the second feeding unit to feed the second antenna radiator.

In this application, a wireless earphone having a dual-antenna structure may have a flexible antenna driving manner.

With reference to the fourth aspect, in some implementations of the fourth aspect, the third antenna radiator further includes a fourth end located in the earbud part, the second antenna radiator is disposed in parallel relative to the earbud stem part, and the third antenna radiator further includes a fifth end that is far away from the fourth end; and the third end is connected between the fourth end and the fifth end, and a part that is of the third antenna radiator and that is connected between the third end and the fifth end includes a first mutual-interference reduction segment, a second mutual-interference reduction segment, and a mutual-interference reduction segment connecting segment, where the mutual-interference reduction segment connecting segment is connected between the first mutual-interference reduction segment and the second mutual-interference reduction segment, both the first mutual-interference reduction segment and the second mutual-interference reduction segment are disposed in parallel relative to the earbud stem part, and both a distance between the first mutual-interference reduction segment and the second antenna radiator and a distance between the second mutual-interference reduction segment and the second antenna radiator are less than a preset distance. The method further includes:

- driving the third feeding unit to feed the third antenna radiator.

In this application, a wireless earphone having a three-antenna structure may have a more flexible antenna driving manner.

According to a fifth aspect, a driving method is provided. The driving method is applied to the wireless earphone according to any one of the possible implementations of the third aspect. The method includes at least two of the following:

- driving the first feeding unit to feed the first antenna radiator, and simultaneously disabling the third feeding unit;
- driving the third feeding unit to feed the fourth antenna radiator, and simultaneously disabling the first feeding unit; and
- driving the first feeding unit to feed the first antenna radiator, and simultaneously driving the third feeding unit to feed the fourth antenna radiator.

In this application, a wireless earphone having a dual-antenna structure may have a flexible antenna driving manner.

DESCRIPTION OF EMBODIMENTS

The following describes technical solutions in this application with reference to the accompanying drawings.

Figure 1:
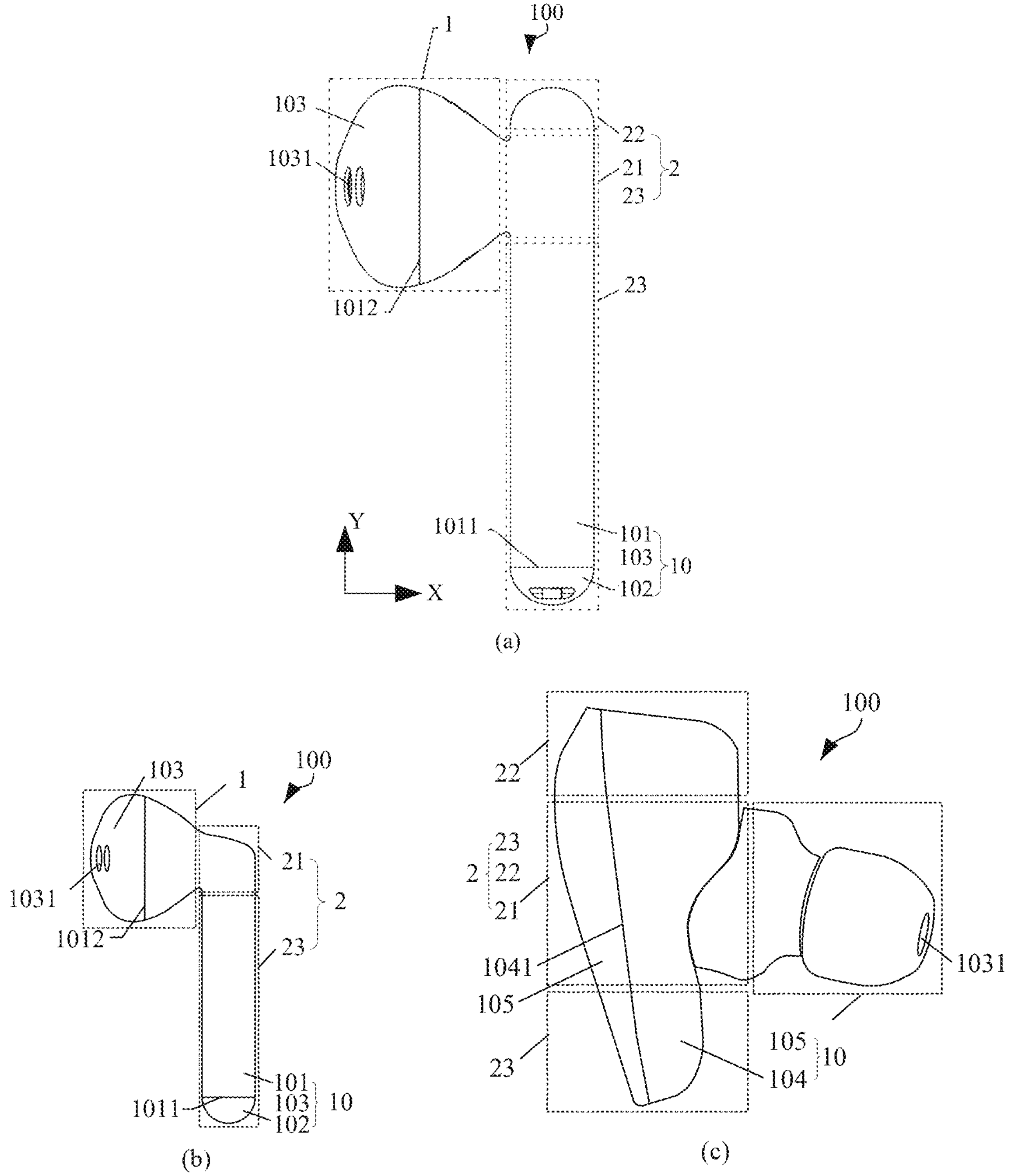
FIG. 1 is a schematic diagram of structures of wireless earphones.

FIG. 1 is a schematic diagram of structures of a plurality of wireless earphones 100 according to this application. The wireless earphone 100 may be, for example, a TWS Bluetooth earphone. The wireless earphone 100 may be divided into an earbud part 1 and an earbud stem part 2. The earbud part 1 is connected to one end of the earbud stem part 2. The earbud 1 may be accommodated or embedded in an auricle of a user, and the earbud stem part 2 may be hung on an edge of the auricle of the user, and is located at an outer circumference of the auricle of the user.

As shown in (a) and (c) in FIG. 1, the earbud stem part 2 may be further divided into a connecting segment 21 that is connected to the earbud part 1, and a top segment 22 and a bottom segment 23 that are located on two sides of the connecting segment 21. The top segment 22, the connecting segment 21, and the bottom segment 23 of the earbud stem part 2 are sequentially arranged in a longitudinal direction of the wireless earphone. In this application, the longitudinal direction may be an extension direction (a Y axis shown in (a) in FIG. 1) of the earbud stem part 2, and is also a length direction of the earbud stem part 2. Two ends of the longitudinal direction may be respectively a top end and a bottom end. The top segment 22, the connecting segment 21, and the bottom segment 23 may be of an integrated structure or a split structure.

As shown in (b) in FIG. 1, the earbud stem part 2 may be further divided into a connecting segment 21 that is connected to the earbud part 1 and a bottom segment 23 that is located on a side of the connecting segment 21. The connecting end 21 is connected between the earbud part 1 and the bottom segment 23. The connecting segment 21 and the bottom segment 23 are distributed in a longitudinal direction of the wireless earphone 100. In other words, in this application, the wireless earphone 100 may have or may not have the top segment 22 shown in (a) and (c) in FIG. 1.

As shown in (a) and (b) in FIG. 1, the wireless earphone 100 may include a housing 10. The housing 10 may be configured to accommodate various components in the wireless earphone 100. The housing 10 may include a main housing 101, a bottom housing 102, and a side housing 103.

The main housing 101 may cover a part of the bottom segment 23 of the earbud stem part 2, the connecting segment 21 of the earbud stem part 2, the top segment 22 of the earbud stem part 2, and a part that is of the earbud part 1 and that is connected to the connecting segment 21. The main housing 101 may form a first opening 1011 in the bottom segment 23 of the earbud stem part 2, and may form a second opening 1012 in the earbud part 1. The first opening 1011 and the 20 second opening 1012 may be configured to mount components in the wireless earphone 100.

The bottom housing 102 may be located at the very bottom of the bottom segment 23 of the earbud stem part 2. The bottom housing 102 may be fixedly connected to the main housing 101 by using the first opening 1011. In a possible implementation, the connection between the bottom housing 102 and the main housing 101 is a detachable connection (for example, a fastening connection or a threaded connection), so as to facilitate subsequent repair (or maintenance) of the wireless earphone 100. In another possible implementation, the connection between the bottom housing 102 and the main housing 101 may be a non-detachable connection (for example, a glued connection), so as to reduce a risk of accidental fall-off of the bottom housing 102 and help improve reliability of the wireless earphone 100.

The side housing 103 may be located on a side that is of the earbud part 1 and that is far away from the earbud stem part 2. The side housing 103 may be fixedly connected to the main housing 101 by using the second opening 1012. In a possible implementation, the connection between the side housing 103 and the main housing 101 is a detachable connection (for example, a fastening connection or a threaded connection), so as to facilitate subsequent repair (or maintenance) of the wireless earphone 100. In another possible implementation, the connection between the side housing 103 and the main housing 101 may alternatively be a non-detachable connection (for example, a glued connection), so as to reduce a risk of accidental fall-off of the side housing 103 and help improve reliability of the wireless earphone 100.

One or more speaker holes 1031 may be disposed on the side housing 103, so that sound inside the housing 10 can be transmitted to the outside of the housing 10 through the speaker holes 1031. A quantity of speaker holes 1031, and shapes, locations, and the like of the speaker holes 1031 may be not limited in this application.

It should be understood that a quantity of openings and locations of the openings on the housing 10 may be not limited in this application. Different wireless earphones 100 may have different quantities of openings and/or different locations of the openings. For example, as shown in (c) in FIG. 1, the housing 10 may include a first housing 104 and a second housing 105. A third opening 1041 may be formed on the first housing 104. The first housing 104 may be fixedly connected to the second housing 105 by using the third opening 1041. In the example shown in (c) in FIG. 1, the wireless earphone 100 may have fewer openings.

It should be understood that the structures of the wireless earphones 100 shown in FIG. 1 are merely some examples. The wireless earphone 100 may alternatively have other different embodiments. The following uses only the wireless earphone 100 shown in (a) in FIG. 1 as an example for detailed description.

Figure 2:
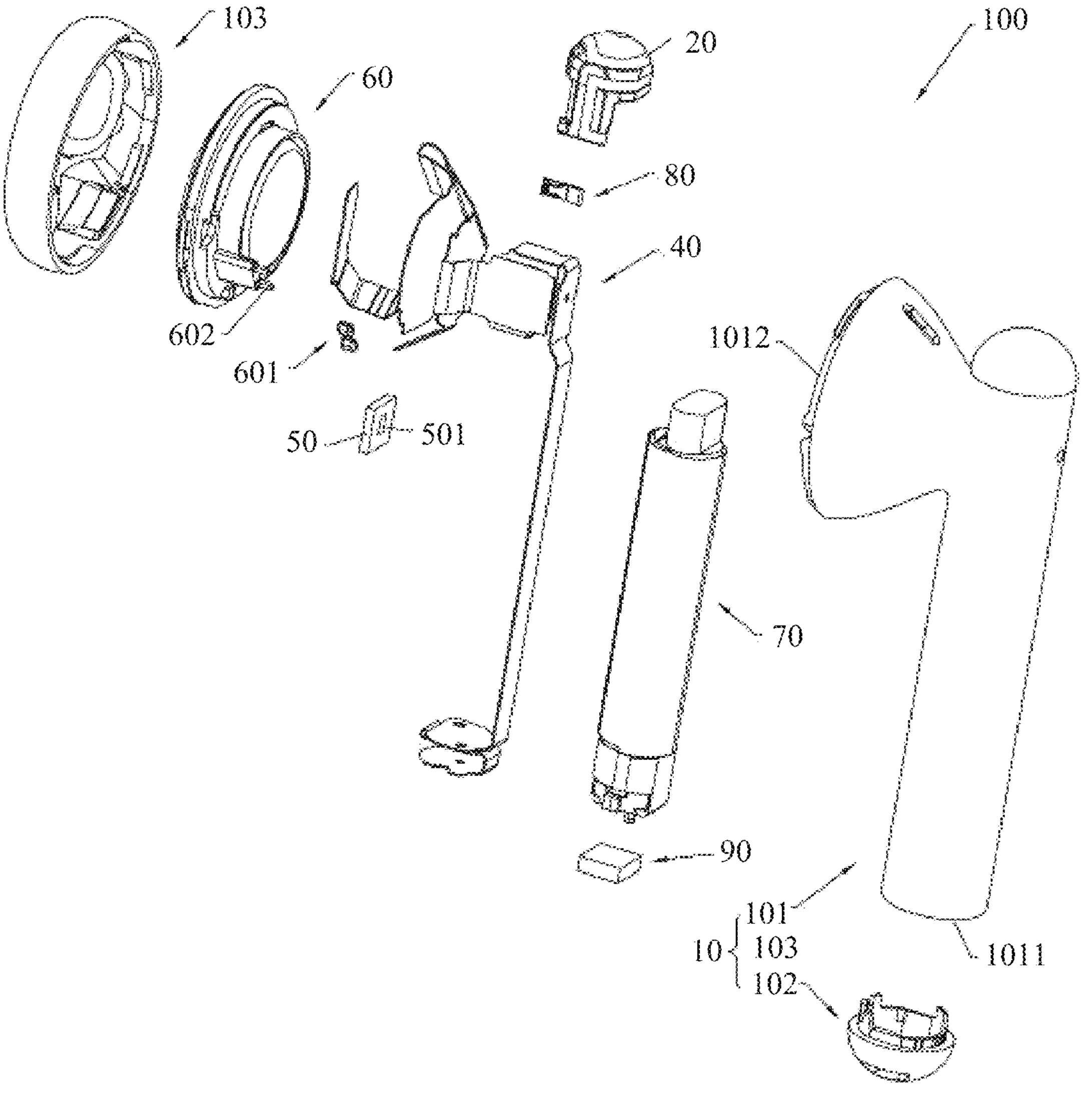
FIG. 2 is an exploded diagram of a wireless earphone.

FIG. 2 is an exploded diagram of the wireless earphone 100 shown in (a) in FIG. 1. A possible structure of the wireless earphone 100 is described below with reference to FIG. 2.

Components in the wireless earphone 100 may include an antenna 20, a flexible circuit board 40, a chip 50, a speaker assembly 60, a battery 70, and a microphone assembly 90.

The battery 70 may be a power supply of the wireless earphone 100, and is configured to provide electrical energy for a plurality of components in the wireless earphone 100. The battery 70 may be disposed, for example, in the bottom segment 23 of the earbud stem part 2. The battery 70 may be electrically connected to the flexible circuit board 40 to be coupled or electrically connected to an electronic component (such as the antenna 20, the chip 50, or the speaker assembly 60) in the wireless earphone 100. As shown in FIG. 2, the battery 70 may be of a strip shape, so as to be better accommodated in the earbud stem part 2 of the main housing 101. The shape of the battery 70 may be not limited in this embodiment of this application.

The flexible circuit board 40 may be configured to transmit signals between a plurality of components (such as the antenna 20, the chip 50, the speaker assembly 60, and the battery 70) in the wireless earphone 100. The flexible circuit board 40 may extend from the bottom segment 23 of the earbud stem part 2 to the earbud part 1 through the connecting segment 21 of the earbud stem part 2. The flexible circuit board 40 may have one or more bending structures, and any bending structure may be located in the earbud part 1 or the earbud stem part 2. The flexible circuit board 40 may be electrically connected to two ends (a positive electrode and a negative electrode) of the battery 70. The flexible circuit board 40 may be further electrically connected to a component that is close to the flexible circuit board 40, so as to supply power to the component that is close to the flexible circuit board 40.

The antenna 20 may be electrically connected to the flexible circuit board 40, so as to transmit or receive a signal. The antenna 20 may be, for example, an antenna that operates in a Bluetooth frequency band. A specific operating frequency band of the wireless earphone 100 may be not limited in this application. In this application, an "electrical connection" may be understood as physical contact and electrical conduction between components, or may be understood as a form in which different components in a line structure are connected by using a physical line that can transmit an electrical signal, such as a printed circuit board (printed circuit board, PCB) copper foil or a conducting wire. A "communication connection" may mean electrical signal transmission, including a wireless communication connection and a wired communication connection. The wireless communication connection does not need an entity medium, and does not belong to a connection relationship that limits product construction.

In this application, a "connection" may mean a mechanical connection relationship or a physical connection relationship. In other words, that A connects to B or that A and B are connected may mean that there is a fastening component (such as a screw, a bolt, or a rivet) between A and B, or A and B are in contact with each other and A and B are difficult to be separated.

The chip 50 may be configured to process signal data. The chip 50 may be, for example, a system-on-a-chip (system-on-a-chip, SOC). For example, the chip 50 may include a radio frequency circuit 501. The radio frequency circuit 501 may be configured to process a radio frequency signal from the antenna 20 or to be transmitted to the antenna 20. The radio frequency circuit 501 may be, for example, configured to modulate or demodulate a radio frequency signal. For another example, the chip 50 may be configured to process an electrical signal to be transmitted to the speaker assembly 60. The chip 50 may be disposed, for example, in the earbud part 1. The chip 50 may be fastened (for example, through welding) to the flexible circuit board 40, and is electrically connected to the flexible circuit board 40.

The speaker assembly (or earpiece assembly) 60 may be configured to convert an electrical signal into a sound signal. The speaker assembly 60 may be coupled to the chip 50. The speaker assembly 60 may be disposed in the earbud part 1, and is located on a side that is of the chip 50 and that is far away from the earbud stem part 2, so as to be close to the outside of the wireless earphone 100, so that a sound signal formed by the speaker assembly 60 is output to the outside of the wireless earphone 100. The speaker assembly 60 may be electrically connected to the flexible circuit board 40. As shown in FIG. 2, the wireless earphone 100 may further include a fastening terminal pair 601, and the fastening terminal pair 601 may be fastened to the flexible circuit board 40. A connection terminal 602 of the speaker assembly 60 may be plug-connected to the fastening terminal pair 601, so as to implement an electrical connection between the speaker assembly 60 and the flexible circuit board 40.

The microphone assembly (or the microphone assembly) 90 is configured to convert a sound signal into an electrical signal. For example, an electrical signal that is output by the microphone assembly 90 may be transmitted to the chip 50 by using the flexible circuit board 40. The microphone assembly 90 may be located, for example, in the bottom segment 23 or the connecting segment 21 of the earbud stem part 2. The microphone assembly 90 may be located on a side that is of the battery 70 and that is far away from the antenna 20, or may be located between the battery 70 and the antenna 20.

It should be understood that an internal structure of the wireless earphone 100 shown in FIG. 2 is merely an example. A quantity of components, and types, locations, and the like of the components in the wireless earphone 100 may be not limited in this application. For example, in other possible examples, the wireless earphone 100 may include more or fewer components.

For a wireless earphone having only a single antenna, because the wireless earphone is close to the head of the user, antenna performance of the wireless earphone is likely to be affected by the head of the user. Consequently, it is relatively difficult to implement excellent antenna performance. If the wireless earphone may have a plurality of antennas, and the plurality of antennas have relatively excellent antenna performance (for example, relatively good isolation between the plurality of antennas), use performance of the wireless earphone is improved.

However, for a small-sized wireless earphone (the wireless earphone shown in FIG. 2 is merely an example), because the earbud part 1 needs to be embedded in the auricle of the user and the earbud stem part 2 needs to be hung on the edge of the auricle of the user (a volume of the auricle of the user is quite limited, and a smaller volume of the wireless earphone indicates that a weight of the wireless earphone is more likely to be reduced), a space that can be used to accommodate an antenna in the wireless earphone is quite limited. Therefore, it is relatively difficult to dispose dual antennas or even more antennas in a wireless earphone with a narrow inner cavity and enable the wireless earphone to have excellent antenna performance.

Figure 3:
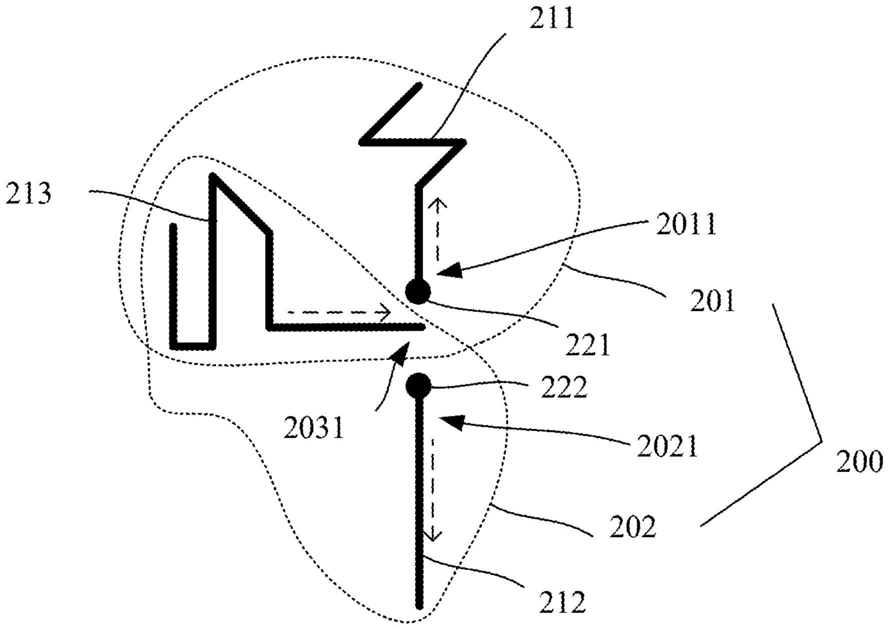
FIG. 3 is a diagram of an operating principle of a dual-antenna structure according to an embodiment of this application.

FIG. 3 is a diagram of an operating principle of a dual-antenna structure 200 according to an embodiment of this application.

The wireless earphone 100 may include a first antenna radiator 211, a first feeding unit 221, a second antenna radiator 212, a second feeding unit 222, and a third antenna radiator 213.

The first antenna radiator 211 may include a first end 2011 that is electrically connected to the first feeding unit 221. In other words, a location at which the first antenna radiator 211 is electrically connected to the first feeding unit 221 may be a first feeding point of the first antenna radiator 211, the first feeding point may be disposed at the first end 2011, and the first feeding unit 221 may feed the first antenna radiator 211 at the first feeding point. The first end 2011 may be a feeding end of the first antenna radiator 211. Therefore, a first current may be formed on the first antenna radiator 211 (a current direction may be shown, for example, by a dashed arrow on the right of the first antenna radiator 211 in FIG. 3). For example, the first feeding unit 221 may be electrically connected to the first end 2011 (the first feeding point) of the first antenna radiator 211 by using a lead.

The second antenna radiator 212 may include a second end 2021 that is electrically connected to the second feeding unit 222. In other words, a location at which the second antenna radiator 212 is electrically connected to the second feeding unit 222 may be a second feeding point of the second antenna radiator 212, the second feeding point may be disposed at the second end 2021, and the second feeding unit 222 may feed the second antenna radiator 212 at the second feeding point. The second end 2021 may be a feeding end of the second antenna radiator 212. Therefore, a second current may be formed on the second antenna radiator 212 (a current direction may be shown, for example, by a dashed arrow on the right of the second antenna radiator 212 in FIG. 3). For example, the second antenna radiator 212 may be electrically connected to the second end 2021 (or the second feeding point) of the second antenna radiator 212 by using a lead. The second end 2021 of the second antenna radiator 212 and the first end 2011 of the first antenna radiator 211 are disposed at intervals. It should be understood that the second end 2021 of the second antenna radiator 212 is not in direct contact with the first end 2011 of the first antenna radiator 211. In an embodiment, the whole of the first antenna radiator 211 and the whole of the second antenna radiator 212 are disposed at intervals, that is, are not in direct contact.

In this application, the feeding unit may be a signal output unit. With reference to FIG. 2 and FIG. 3, the feeding unit may be, for example, a signal output port of the chip 50 or an output end of the radio frequency circuit 501 in the chip 50. For example, the first feeding unit 221 and the second feeding unit 222 may be respectively two signal output ports of the chip 50. For another example, the first feeding unit 221 and the second feeding unit 222 may be respectively output ends of different radio frequency circuits 501 in the chip 50. For another example, the first feeding unit 221 and the second feeding unit 222 may be respectively two different output ends of a same radio frequency circuit 501 in the chip 50.

The third antenna radiator 213 may include a first ground point. The third antenna radiator 213 may include a third end 2031. The third end 2031 is close to both the first end 2011 and the second end 2021. Both a distance between the first end 2011 and the third end 2031 and a distance between the second end 2021 and the third end 2031 may be less than a first preset threshold (the first preset threshold may be, for example, 5 mm, 3 mm, 2 mm, 1 mm, or 0.5 mm).

An electrical length of the first antenna radiator 211 may be (approximately) λ/4, where λ is a target resonance wavelength (for example, may be $$\frac{0.7\lambda}{4} \sim \frac{1.3\lambda}{4}),$$

so that the first antenna radiator 211 can operate in a λ/4 mode. Alternatively, an electrical length of the first antenna radiator 211 may be (approximately) an integer multiple of λ/4 (for example, may be $$\frac{0.7\lambda M_1}{4} \sim \frac{1.3\lambda M_1}{4},$$

where $M_1$ is a positive integer greater than 1). It should be noted that the target resonance wavelength may be a resonance wavelength corresponding to a target frequency. The target frequency may be, for example, within a Bluetooth frequency band range of 2.4 GHz to 2.485 GHz, and a physical length of λ/4 may be, for example, 15 mm to 30 mm. In this application, the electrical length may be a ratio of a physical length of a transmission line to a wavelength of an electromagnetic wave transmitted by the transmission line. The physical length is a length that can be measured by using a ruler.

An electrical length of the second antenna radiator 212 may be (approximately) λ/4, where λ is a target resonance wavelength (for example, may be $$\frac{0.7\lambda}{4} \sim \frac{1.3\lambda}{4}),$$

so that the second antenna radiator 212 can operate in a λ/4 mode. Alternatively, an electrical length of the second antenna radiator 212 may be (approximately) an integer multiple of λ/4 (for example, may be $$\frac{0.7\lambda M_2}{4} \sim \frac{1.3\lambda M_2}{4},$$

where $M_2$ is a positive integer greater than 1).

An electrical length of the third antenna radiator 213 may be (approximately) λ/4, where λ is a target resonance wavelength (for example, may be $$\frac{0.7\lambda}{4} \sim \frac{1.3\lambda}{4}),$$

so that the third antenna radiator 213 can operate in a λ/4 mode. Alternatively, an electrical length of the third antenna radiator 213 may be (approximately) an integer multiple of λ/4 (for example, may be $$\frac{0.7\lambda M_3}{4} \sim \frac{1.3\lambda M_3}{4},$$

where $M_3$ is a positive integer greater than 1).

The feeding end of the first antenna radiator 211 is close to the grounded third antenna radiator 213, and the electrical length of the first antenna radiator 211 and the electrical length of the third antenna radiator 213 each are approximately an integer multiple of λ/4. Therefore, the first antenna radiator 211 and the third antenna radiator 213 may be coupled to form a first antenna 201 in the dual-antenna structure 200. An electrical length of the first antenna 201 may be a first resonance structure (which may also be referred to as a first half-wave dipole) that meets an integer multiple of λ/2, and a physical length of the first antenna 201 may be, for example, an integer multiple of $$\frac{0.7}{2}\lambda \sim \frac{1.3}{2}\lambda$$

due to impact of a radiator dielectric constant or the like. The first antenna 201 may be, for example, an inverted F antenna (inverted F antenna, IFA) or a monopole antenna (Monopole Antenna).

The feeding end of the second antenna radiator 212 is close to the grounded third antenna radiator 213, and the electrical length of the second antenna radiator 212 and the electrical length of the third antenna radiator 213 each are approximately an integer multiple of λ/4. Therefore, the second antenna radiator 212 and the third antenna radiator 213 may be coupled to form a second antenna 202 in the dual-antenna structure 200. An electrical length of the second antenna 202 may be a second resonance structure (which may also be referred to as a second half-wave dipole) that meets an integer multiple of λ/2, and a physical length of the second antenna 202 may be, for example, an integer multiple of $$\frac{0.7}{2}\lambda \sim \frac{1.3}{2}\lambda$$

due to impact of a radiator dielectric constant or the like. The second antenna 202 may be, for example, an inverted F antenna (inverted F antenna, IFA) or a monopole antenna (Monopole Antenna).

It should be understood that, in another embodiment, the electrical length of the first antenna radiator 211, the electrical length of the second antenna radiator 212, and the electrical length of the third antenna radiator 213 each may alternatively be greater than or less than an integer multiple of λ/4, the electrical length of the first antenna 201 formed after the first antenna radiator 211 and the third antenna radiator 213 are coupled is still an integer multiple of λ/2, and the electrical length of the second antenna 202 formed after the second antenna radiator 212 and the third antenna radiator 213 are coupled is still an integer multiple of λ/2. Likewise, a physical length of the first antenna radiator 211, a physical length of the second antenna radiator 212, and a physical length of the third antenna radiator 213 each may alternatively be greater than or less than an integer multiple of $$\frac{0.7}{4}\lambda \sim \frac{1.3}{4}\lambda.$$

Details are not described herein again.

A ground current may be formed on the third antenna radiator 213 (a current direction is shown, for example, by a dashed arrow above the third antenna radiator 213 in FIG. 3). Specifically, because the feeding end of the first antenna radiator 211 is close to the grounded third antenna radiator 213, when the first feeding unit 221 feeds the first antenna radiator 211, a first ground current may be formed on the third antenna radiator 213. Because the feeding end of the second antenna radiator 212 is close to the grounded third antenna radiator 213, when the second feeding unit 222 feeds the second antenna radiator 212, a second ground current may be formed on the third antenna radiator 213. Both the feeding end (the first end 2011) of the first antenna radiator 211 and the feeding end (the second end 2021) of the second antenna radiator 212 are close to (the third end 2031 of) the grounded third antenna radiator 213.

A sum of the first current and the first ground current may be considered or formed as a first equivalent current (as shown in 623 in FIG. 6 below), and a sum of the second current and the second ground current may be considered or formed as a second equivalent current (as shown in 823 in FIG. 8 below).

An included angle between a placement direction of the first antenna radiator 211 (for example, a central axis of the first antenna radiator 211 or an extension direction of an end that is of the first antenna radiator 211 and that is close to the first feeding unit 221) and a placement direction of the second antenna radiator 212 (for example, a central axis of the second antenna radiator 212 or an extension direction of an end that is of the second antenna radiator 212 and that is close to the second feeding unit 222) may range from 90° to 270°. In one example, the included angle may range from 135° to 225°. In another example, the included angle may be greater than a second preset threshold and less than or equal to 180° (the second preset threshold may be, for example, 90°, 120°, 150°, or 160°). Therefore, an included angle between a current direction of the first equivalent current and a current direction of the second equivalent current may be greater than a third preset threshold (the third preset threshold may be, for example, 15°, 20°, 30° 45°, 60°, or 90°). In still another example, the first end 2011 of the first antenna radiator 211 is disposed opposite to the second end 2012 of the second antenna radiator 212. In other words, a direction extending from an end that is of the first antenna radiator 211 and that is far away from the first feeding unit 221 to an end (the first end 2011) that is of the first antenna radiator 211 and that is close to the second feeding unit 222 is an extension direction 1, a direction extending from an end that is of the second antenna radiator 212 and that is far away from the second feeding unit 222 to an end that is of the second antenna radiator 212 and that is close to the second feeding unit 222 is an extension direction 2, and the extension direction 1 is opposite to the extension direction 2.

Alternatively, an included angle between the direction of the first current on the first antenna radiator 211 and the direction of the second current on the second antenna radiator 212 may be greater than a fourth preset threshold (the fourth preset threshold may be, for example, 90°, 120°, 150°, or 180°). Therefore, the included angle between the current direction of the first equivalent current and the current direction of the second equivalent current may be greater than the foregoing third preset threshold.

With reference to FIG. 1 to FIG. 5, the following describes a circuit board component 500 according to an embodiment of this application. The circuit board component 500 may include, for example, a circuit board 40 (the flexible circuit board 40 shown in FIG. 2 is used as an example for description in this embodiment of this application) and the dual-antenna structure 200 shown in FIG. 3.

Figure 4:
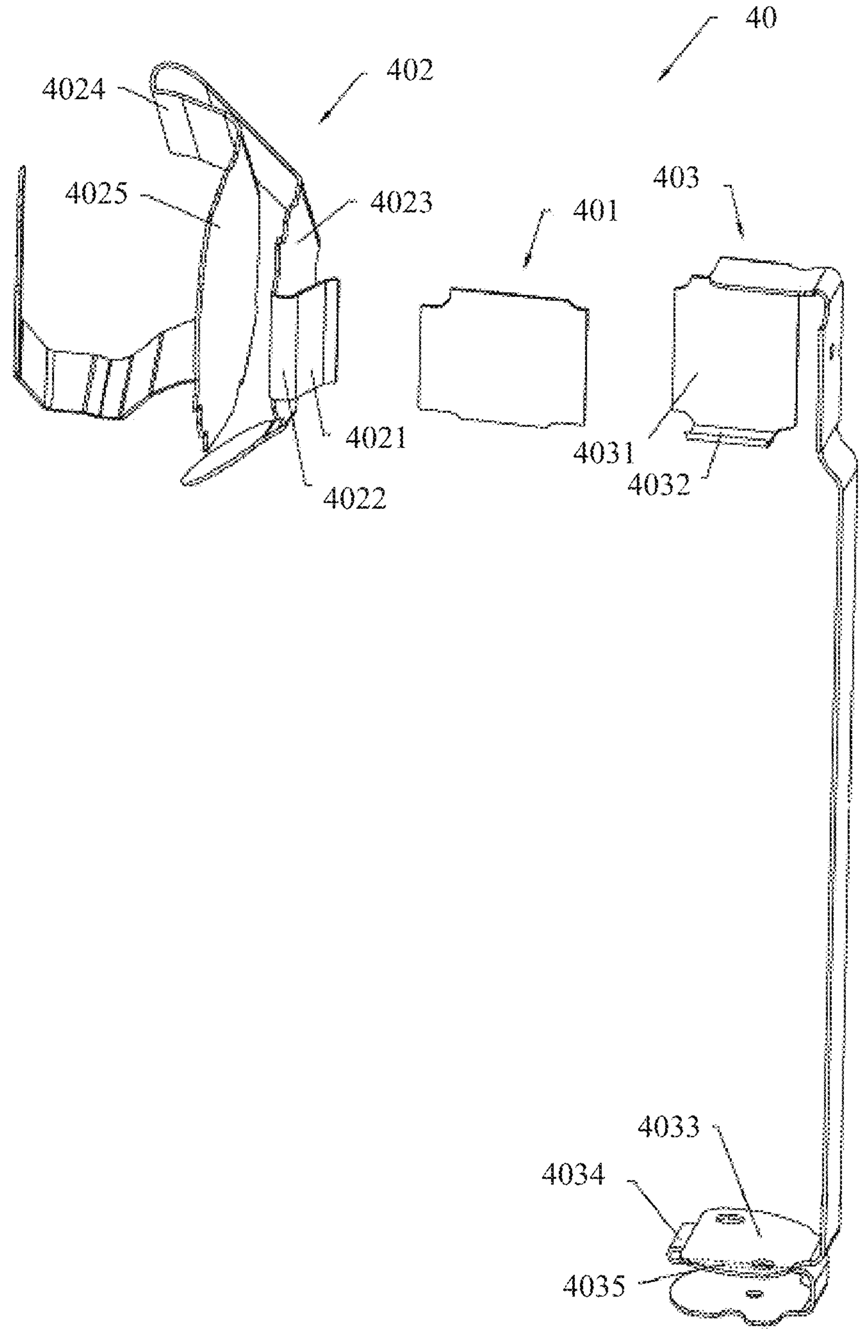
FIG. 4 is a schematic diagram of a structure of a circuit board according to an embodiment of this application.

FIG. 4 shows a specific structure of the circuit board 40 according to an embodiment of this application.

The circuit board 40 may include a feeding part 401, a first extension part 402, and a second extension part 403.

The feeding part 401 may be electrically connected between the first extension part 402 and the second extension part 403. In other words, the first extension part 402 is electrically connected to a side of the feeding part 401, and the second extension part 403 is electrically connected to another side of the feeding part 401. With reference to (a) in FIG. 1 and FIG. 4, the feeding part 401 may be located, for example, in the connecting segment 21 of the earbud stem part 2 shown in (a) in FIG. 1. The first extension part 402 may extend, for example, from the feeding part 401 to the earbud part 1 shown in (a) in FIG. 1. The second extension part 403 may extend, for example, from the feeding part 401 to the bottom segment 23 of the earbud stem part 2 shown in (a) in FIG. 1.

Optionally, the feeding part 401, the first extension part 402, and the second extension part 403 may be integrally formed. In other words, the circuit board 40 may be an integral part that cannot be simply split.

Optionally, the feeding part 401, the first extension part 402, and the second extension part 403 may be assembled into a whole. For example, the circuit board 40 may include a plurality of sub-circuit boards. A first part of the plurality of sub-circuit boards may form the feeding part 401 of the circuit board 40, a second part of the plurality of sub-circuit boards may form the first extension part 402 of the circuit board 40, and a third part of the plurality of sub-circuit boards may form the second extension part 403 of the circuit board 40.

The first extension part 402 may include a plurality of regions that are sequentially connected.

In an example, the plurality of regions may include at least one planar region 4021 and at least one curved surface region 4022 shown in FIG. 4. Optionally, areas and/or shapes of any two planar regions 4021 may be the same or may be different. Optionally, areas and/or shapes of any two curved surface regions 4022 may be the same or may be different.

For example, the first extension part 402 may include a first planar region 4023, a first curved surface region 4024, and a second planar region 4025 that are sequentially connected. The first planar region 4023 and the second planar region 4025 are two planar regions 4021 of the first extension part 402. The first curved surface region 4024 is a curved surface region 4022 of the first extension part 402. The second planar region 4025 and the first planar region 4023 may be disposed in parallel relatively (approximately), or an included angle between the second planar region 4025 and the first planar region 4023 may be less than or equal to a fifth preset threshold (the fifth preset threshold may be, for example, 30°, 60°, or 90°). This helps increase a bending degree of the circuit board 40 in the first extension part 402.

In an example, the plurality of regions may include only a plurality of curved surface regions 4022 shown in FIG. 4.

In an example, the plurality of regions may include only a plurality of planar regions 4021 shown in FIG. 4, the plurality of planar regions 4021 may include a first target planar region, a second target planar region, and a third target planar region, an included angle between the first target planar region and the second target planar region may be less than or equal to the foregoing fifth preset threshold, and an included angle between the first target planar region and the third target planar region may be greater than or equal to a sixth preset threshold (the sixth preset threshold may be, for example, 30°, 60°, or 90°).

This helps increase a length of the first extension part 402 in a limited space, or helps reduce an occupied space of the first extension part 402 in a case in which a length of the first extension part 402 is a fixed value.

The second extension part 403 may include a plurality of regions that are sequentially connected.

In an example, the plurality of regions may include at least one planar region 4031 and at least one curved surface region 4032 shown in FIG. 4. Optionally, areas and/or shapes of any two planar regions 4031 may be the same or may be different. Optionally, areas and/or shapes of any two curved surface regions 4032 may be the same or may be different.

For example, the second extension part 403 may include a third planar region 4033, a second curved surface region 4034, and a fourth planar region 4035 that are sequentially connected. The third planar region 4033 and the fourth planar region 4035 are two planar regions 4031 of the second extension part 403. The second curved surface region 4034 is a curved surface region 4032 of the second extension part 403. The third planar region 4033 and the fourth planar region 4035 may be disposed in parallel relatively (approximately), or an included angle between the third planar region 4033 and the fourth planar region 4035 may be less than or equal to the foregoing fifth preset threshold. This helps increase a bending degree of the circuit board 40 in the second extension part 403.

In an example, the plurality of regions may include only a plurality of curved surface regions 4032 shown in FIG. 4.

In an example, the plurality of regions may include only a plurality of planar regions 4031 shown in FIG. 4, the plurality of planar regions 4031 may include a fourth target planar region, a fifth target planar region, and a sixth target planar region, an included angle between the fourth target planar region and the fifth target planar region may be less than or equal to the foregoing fifth preset threshold, and an included angle between the fourth target planar region and the sixth target planar region may be greater than or equal to the foregoing sixth preset threshold.

Therefore, the embodiment of the flexible circuit board 40 helps increase a length of the second extension part 403 in a limited space, or helps reduce an occupied space of the second extension part 403 in a case in which a length of the second extension part 403 is a fixed value.

Figure 5:
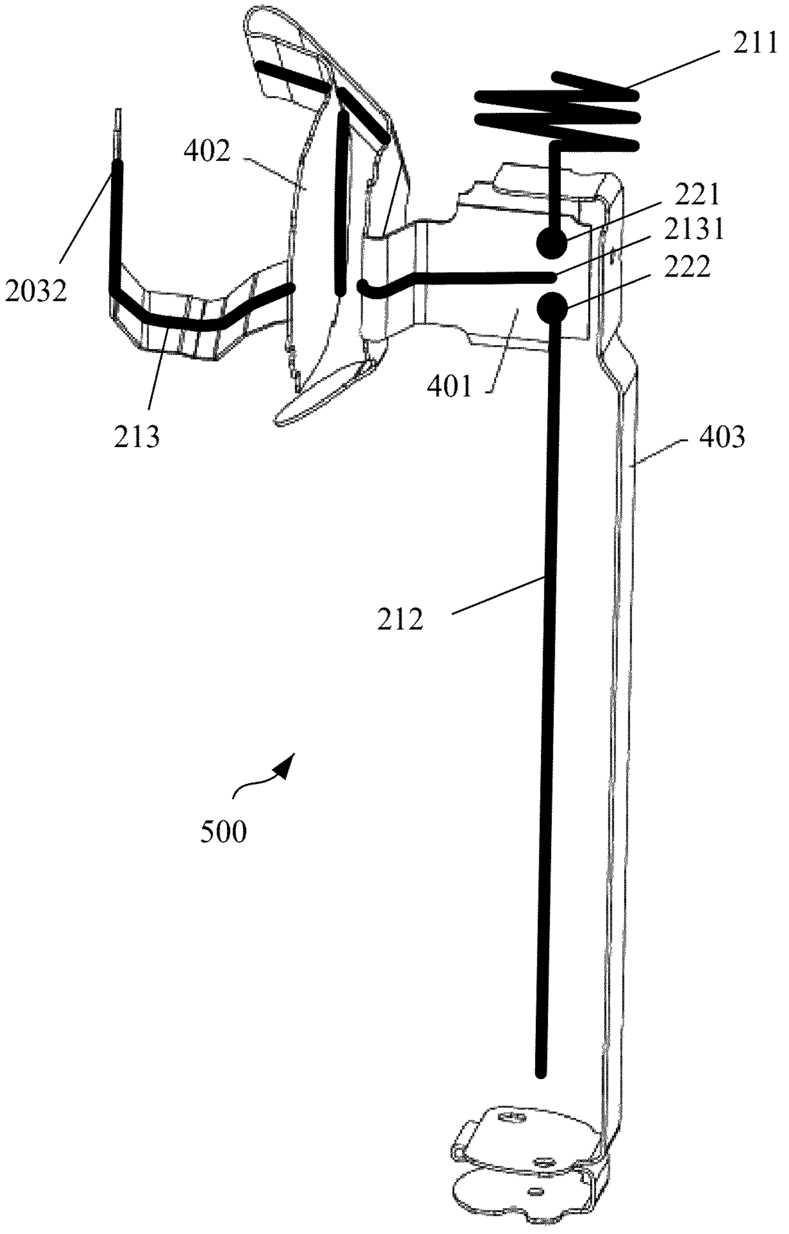
FIG. 5 is a schematic diagram of a structure of a circuit board component according to an embodiment of this application.

FIG. 5 shows a possible implementation in which the dual-antenna structure 200 shown in FIG. 3 is disposed on the circuit board 40 shown in FIG. 4.

With reference to FIG. 4 and FIG. 5, the first feeding unit 221 and the second feeding unit 222 may be disposed in the feeding part 401 or a region that is close to the feeding part 401 (for example, the first feeding unit 221 and the second feeding unit 222 may be integrated on the chip 50 shown in FIG. 2, and the chip 50 may be disposed in the feeding part 401 or the region that is close to the feeding part 401).

In an example, a distance between a feeding unit and an end that is of an antenna radiator and that is electrically connected to the feeding unit may be less than a preset distance, that is, the antenna radiator may be disposed close to the feeding unit (for example, the antenna radiator may be disposed close to the chip). In this case, the antenna radiator may be directly connected to the chip.

In another example, a distance between a feeding unit and an end that is of an antenna radiator and that is electrically connected to the feeding unit is greater than a preset distance, that is, the antenna radiator may be disposed far away from the feeding unit (for example, the antenna radiator may be disposed far away from the chip). In this case, the antenna radiator may be electrically connected to the feeding unit by using a lead or a feeder.

With reference to (a) in FIG. 1 and FIG. 5, both the first antenna radiator 211 and the second antenna radiator 212 shown in FIG. 5 may be disposed in the earbud stem part 2 shown in (a) in FIG. 1, and the third antenna radiator 213 shown in FIG. 5 may be disposed in the earbud part 1 shown in (a) in FIG. 1.

With reference to (a) in FIG. 1 and FIG. 5, it can be learned that the first antenna radiator 211 may extend from the first feeding unit 221 (the first feeding unit 221 may be located, for example, in the connecting segment 21 of the earbud stem part 2) to the top segment 22 of the earbud stem part 2. In other words, the top segment 22 of the earbud stem part 2 may be used to accommodate the first antenna radiator 211, or the top segment 22 and a part of the connecting segment 21 of the earbud stem part 2 may be used to accommodate the first antenna radiator 211.

In another embodiment, with reference to (b) in FIG. 1 and FIG. 5, it can be learned that the first antenna radiator 211 may extend from the first feeding unit 221 (the first feeding unit 221 may be located, for example, in the connecting segment 21 or the bottom segment 23 of the earbud stem part 2) to the connecting segment 21 of the earbud stem part 2, for example, may extend in a length direction of the earbud stem part 2. In other words, the connecting segment 21 of the earbud stem part 2 may be used to accommodate the first antenna radiator 211, or the connecting segment 21 and a part of the bottom segment 23 of the earbud stem part 2 may be used to accommodate the first antenna radiator 211.

With reference to (a) in FIG. 1 and FIG. 5, it can be learned that the second antenna radiator 212 may extend from the second feeding unit 222 (the second feeding unit 222 may be located, for example, in the connecting segment 21 of the earbud stem part 2) to the bottom segment 23 of the earbud stem part 2. In other words, the bottom segment 23 of the earbud stem part 2 may be used to accommodate the second antenna radiator 212, or the bottom segment 23 and a part of the connecting segment 21 of the earbud stem part 2 may be used to accommodate the second antenna radiator 212.

With reference to (a) in FIG. 1 and FIG. 5, it can be learned that the third end 2031 of the third antenna radiator 213 may be located, for example, in the connecting segment 21 of the earbud stem part 2, and the third antenna radiator 213 may extend from the connecting segment 21 of the earbud stem part 2 to the earbud part 1. The third antenna radiator 213 may have a fourth end 2032 located in the earbud part 1. In other words, the earbud part 1 may be used to accommodate the third antenna radiator 213, or the earbud part 1 and a part of the connecting segment 21 may be used to accommodate the third antenna radiator 213.

Figure 6:
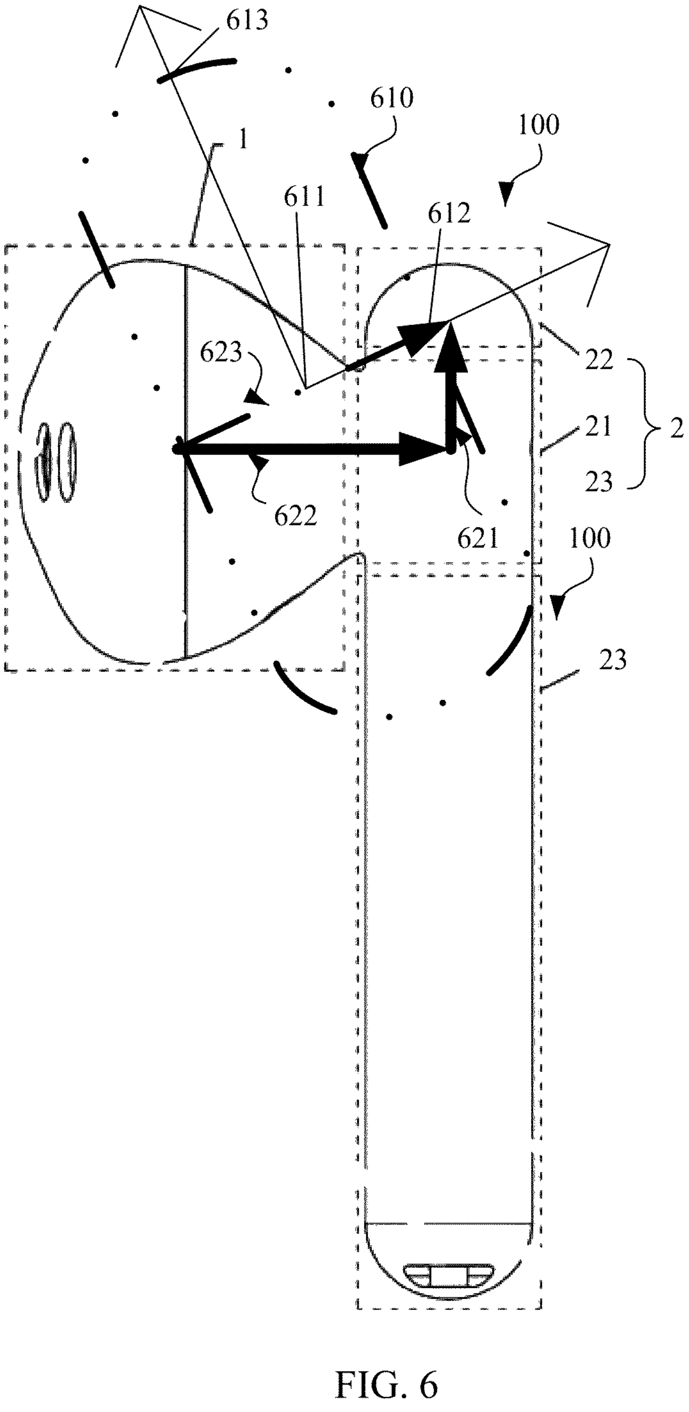
FIG. 6 is a schematic diagram of a current direction of a first antenna according to an embodiment of this application.

A schematic diagram of a current direction shown in FIG. 6 may be obtained based on specific locations of the first antenna radiator 211 and the third antenna radiator 213 in FIG. 5 in the wireless earphone 100 shown in (a) in FIG. 1.

With reference to FIG. 5 and FIG. 6, because the first antenna radiator 211 may extend from the connecting segment 21 of the earbud stem part 2 to the top segment 22 of the earbud stem part 2, a direction of a first current 621 formed on the first antenna radiator 211 may be considered as extending from the connecting segment 21 of the earbud stem part 2 to the top segment 22 of the earbud stem part 2. As shown in FIG. 6, the first current 621 may extend in the length direction of the earbud stem part 2, and the direction of the first current 621 may extend from bottom to top. It should be understood that, in this application, extending in the length direction of the earbud stem part 2 may mean extending in a straight line manner, a plane manner, a three-dimensional manner, or the like in a direction parallel to the length direction of the earbud stem part 2.

With reference to FIG. 5 and FIG. 6, because the third antenna radiator 213 may extend from the connecting segment 21 of the earbud stem part 2 to the earbud part 1, and an end that is of the third antenna radiator 213 and that is close to the first antenna radiator 211 may be located in the connecting segment 21 of the earbud stem part 2, a direction of a first ground current 622 formed on the third antenna radiator 213 may be considered as extending from the earbud part 1 to the connecting segment 21 of the earbud stem part 2. As shown in FIG. 6, the first ground current 622 may extend in a direction (approximately) perpendicular to the length direction of the earbud stem part 2, and the direction of the first ground current 622 may extend from a location that is far away from the earbud stem part 2 to a location that is close to the earbud stem part 2.

A direction of a first equivalent current 623 (as shown by a single-dot dashed line in FIG. 6) formed by the first current 621 and the first ground current 622 may extend, for example, from the earbud part 1 to the top segment 22 of the earbud stem part 2.

The first equivalent current 623 may form, for example, a radiation field pattern 610 shown in FIG. 6 (as shown by a double-dot dashed line in FIG. 6). A connection line between a center 611 of the radiation field pattern 610 and a radiation null point 612 may extend (approximately) in a direction from the earbud part 1 to the top segment 22 of the earbud stem part 2 (for example, the direction of the first equivalent current 623). A connection line between the center 611 of the radiation field pattern 610 and a radiation intensity point 613 may extend in a direction (approximately) perpendicular to the direction from the earbud part 1 to the top segment 22 of the earbud stem part 2.

Figure 7:
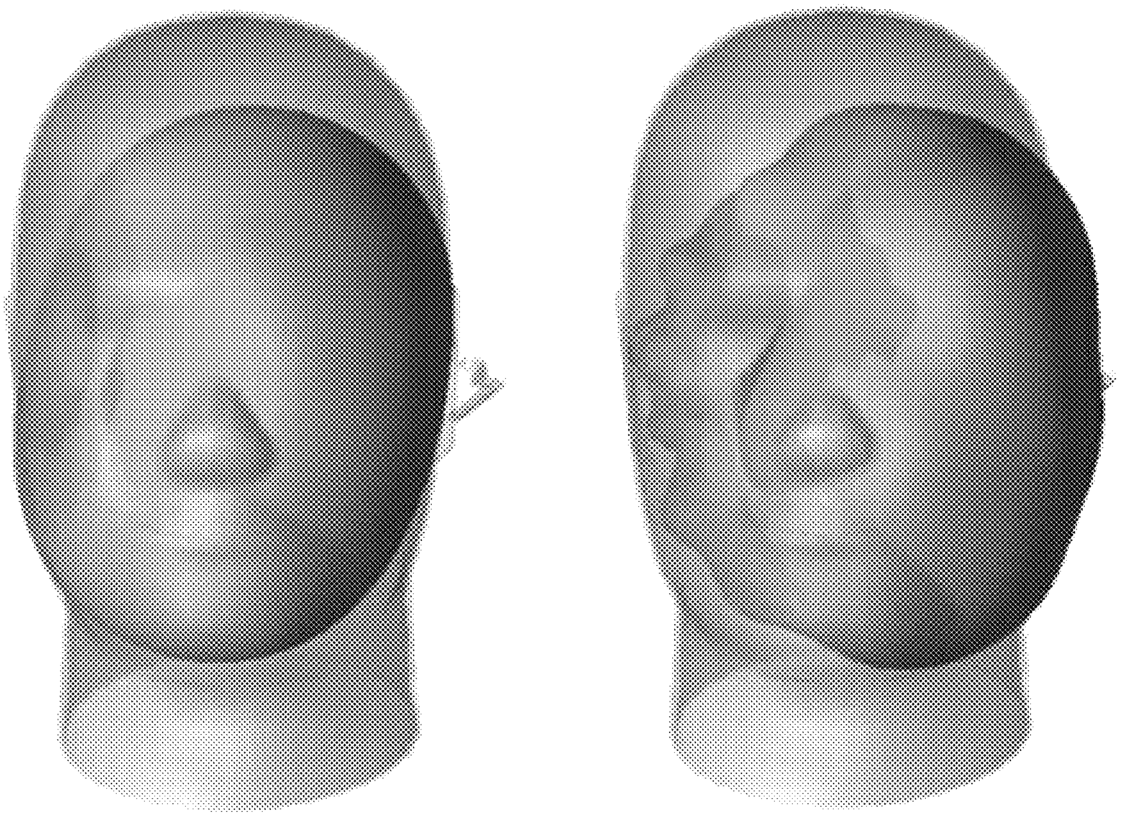
FIG. 7 is a schematic diagram of a head phantom directivity mode of a first antenna according to an embodiment of this application.

When the wireless earphone 100 is not worn on the ear of the user, the first antenna 201 shown in FIG. 3 may form a head phantom directivity pattern shown in (a) in FIG. 7.

When the wireless earphone 100 is worn on the ear of the user, because of impact of the head of the user on antenna performance of the wireless earphone 100, the first antenna 201 shown in FIG. 3 may form a head phantom directivity pattern shown in (b) in FIG. 7.

Figure 8:
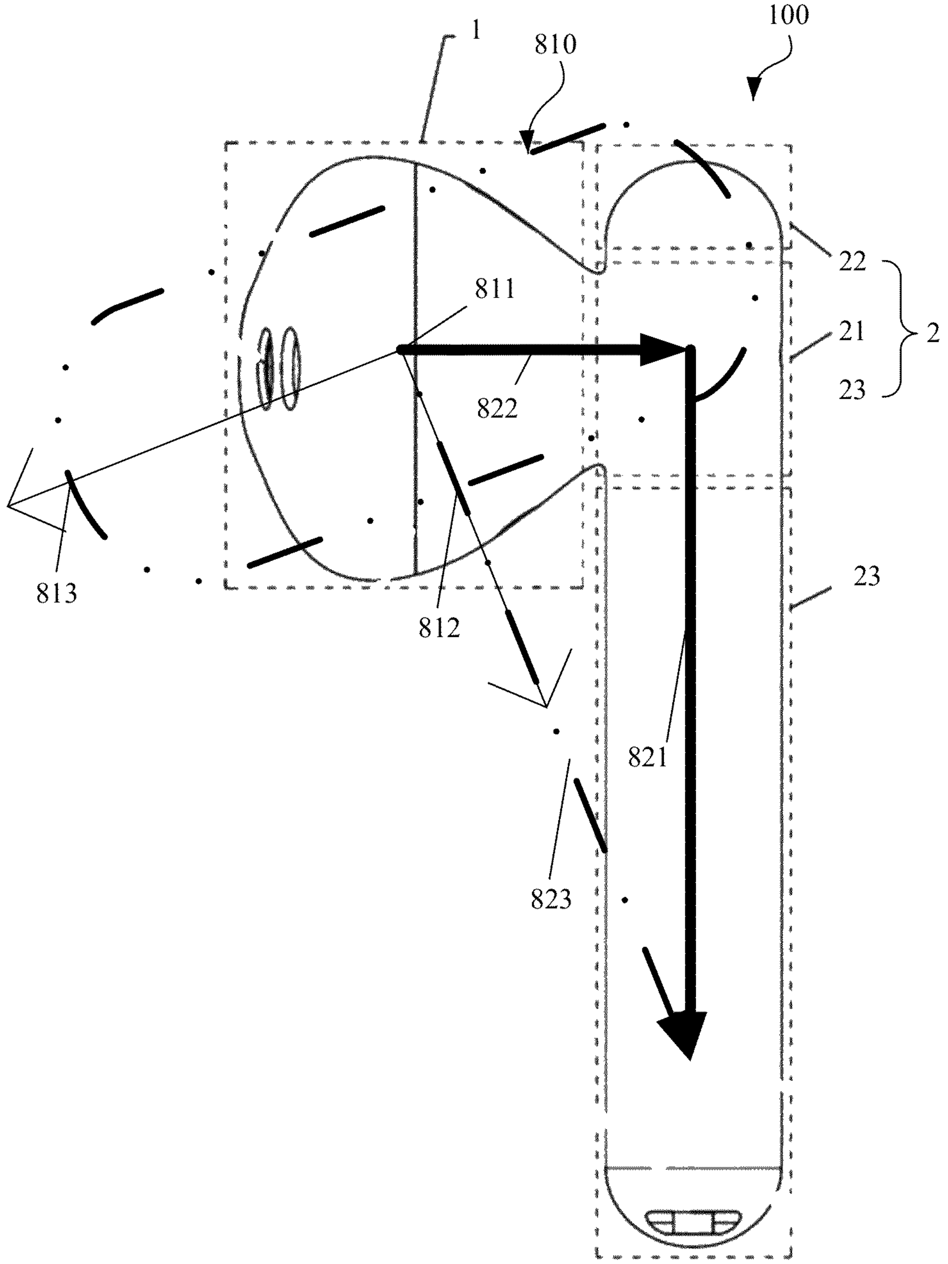
FIG. 8 is a schematic diagram of a current direction of a second antenna according to an embodiment of this application.

A schematic diagram of a current direction shown in FIG. 8 may be obtained based on specific locations of the second antenna radiator 212 and the third antenna radiator 213 in FIG. 5 in the wireless earphone 100 shown in (a) in FIG. 1.

With reference to FIG. 5 and FIG. 8, because the second antenna radiator 212 may extend from the connecting segment 21 of the earbud stem part 2 to the bottom segment 23 of the earbud stem part 2, a direction of a second current 821 formed on the second antenna radiator 212 may extend (approximately) from the connecting segment 21 of the earbud stem part 2 to the bottom segment 23 of the earbud stem part 2. As shown in FIG. 8, the second current 821 may (approximately) extend in the length direction of the earbud stem part 2, and the direction of the second current 821 may extend from top to bottom.

With reference to FIG. 5 and FIG. 8, because the third antenna radiator 213 may extend from the connecting segment 21 of the earbud stem part 2 to the earbud part 1, and an end that is of the third antenna radiator 213 and that is close to the second antenna radiator 212 may be located in the connecting segment 21 of the earbud stem part 2, a direction of a second ground current 822 formed on the third antenna radiator 213 may extend (approximately) from the earbud part 1 to the connecting segment 21 of the earbud stem part 2. As shown in FIG. 8, the second ground current 822 may extend in a direction (approximately) perpendicular to an extension direction of the earbud stem part 2, and the direction of the second ground current 822 may extend from a location that is far away from the earbud stem part 2 to a location that is close to the earbud stem part 2.

A direction of a second equivalent current 823 (as shown by a single-dot dashed line in FIG. 8) formed by the second current 821 and the second ground current 822 may extend, for example, from the earbud part 1 to the bottom segment 23 of the earbud stem part 2.

The second equivalent current 823 may form, for example, a radiation field pattern 810 shown in FIG. 8 (as shown by a double-dot dashed line in FIG. 8). A connection line between a center 811 of the radiation field pattern 810 and a radiation null point 812 may extend in a direction from the earbud part 1 to the bottom segment 23 of the earbud stem part 2 (for example, the direction of the second equivalent current 823). A connection line between the center 811 of the radiation field pattern 810 and a radiation intensity point 813 may extend in a direction (approximately) perpendicular to the direction from the earbud part 1 to the bottom segment 23 of the earbud stem part 2.

Figure 9:
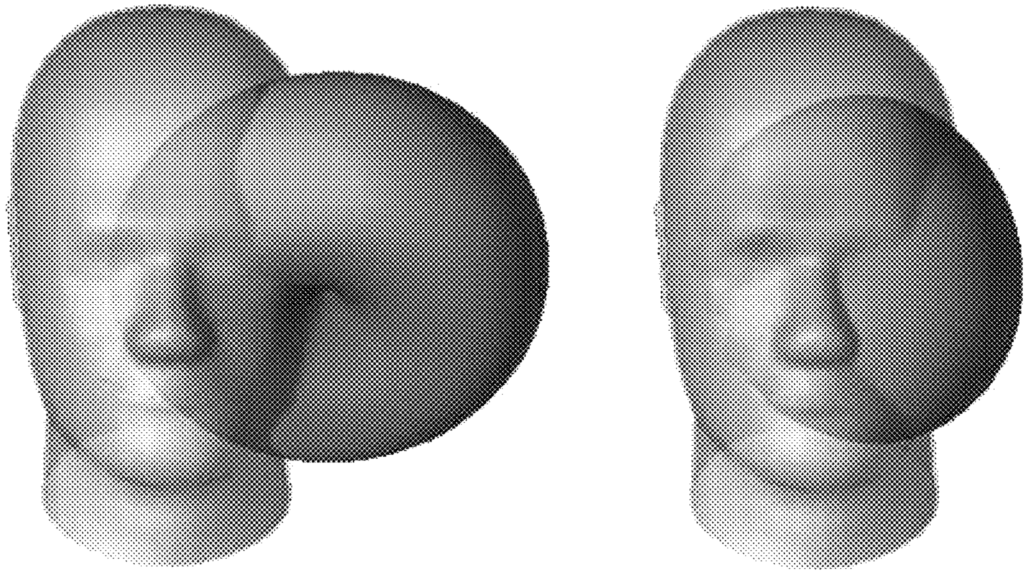
FIG. 9 is a schematic diagram of a head phantom directivity mode of a second antenna according to an embodiment of this application.

When the wireless earphone 100 is not worn on the ear of the user, the second antenna 202 shown in FIG. 3 may form a head phantom directivity pattern shown in (a) in FIG. 9.

When the wireless earphone 100 is worn on the ear of the user, because of impact of the head of the user on antenna performance of the wireless earphone 100, the second antenna 202 shown in FIG. 3 may form a head phantom directivity pattern shown in (b) in FIG. 9.

With reference to FIG. 6 to FIG. 9, regardless of whether the wireless earphone 100 is worn on the ear of the user, the dual-antenna structure 200 provided in this embodiment of this application can implement two different radiation field patterns and two different head phantom directivity modes. A single radiation field pattern (or a single head phantom directivity mode) is simpler, and cannot implement good antenna performance in some directions (or angles or ranges). However, different radiation field patterns (or different head phantom directivity modes) may complement each other. Antenna performance that cannot be implemented by one radiation field pattern (or one head phantom directivity pattern) may be complemented by another radiation field pattern (or another head phantom directivity pattern). This helps improve overall antenna performance of the wireless earphone 100.

Figure 10:
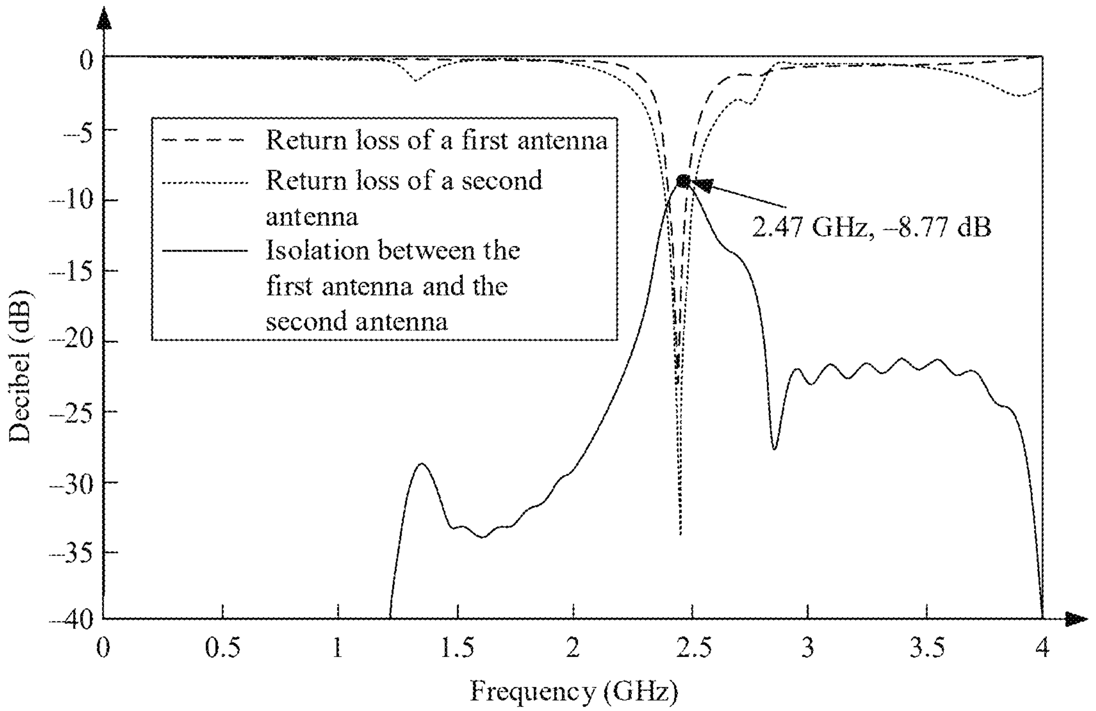
FIG. 10 is a schematic diagram of antenna performance of a dual-antenna structure according to an embodiment of this application.

FIG. 10 shows antenna performance that can be implemented by the dual-antenna structure 200 shown in FIG. 3.

A dashed line in FIG. 10 shows return losses of the first antenna 201 shown in FIG. 3 in different frequency bands. It can be learned that a return loss of the first antenna 201 in a Bluetooth frequency band is relatively low (for example, may be less than −8 dB).

A dotted line in FIG. 10 shows return losses of the second antenna 202 shown in FIG. 3 in different frequency bands. It can be learned that a return loss of the second antenna 202 in the Bluetooth frequency band is relatively low (for example, may be less than −8 dB).

A solid line in FIG. 10 shows isolation of the dual-antenna structure 200 shown in FIG. 3 in different frequency bands. It can be learned that the dual-antenna structure 200 has relatively good isolation in the Bluetooth frequency band (for example, may be less than −8 dB. Specifically, isolation between the first antenna 201 and the second antenna 202 may be −8.77 dB in 2.47 GHz).

It can be learned from this that the wireless earphone 100 having the dual-antenna structure 200 may operate in the Bluetooth frequency band, and has relatively good antenna performance.

Figure 11:
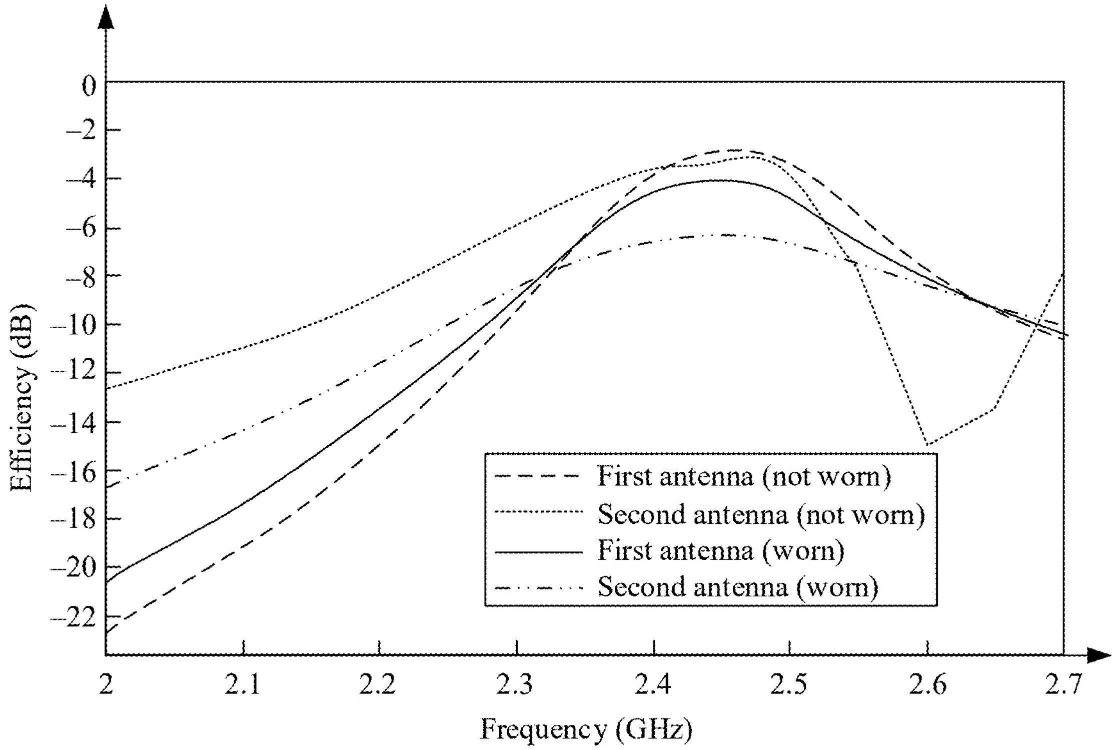
FIG. 11 is a schematic diagram of antenna performance of a dual-antenna structure according to an embodiment of this application.

FIG. 11 shows a change of operating efficiency of the dual-antenna structure 200 shown in FIG. 3 before and after wearing.

A dashed line in FIG. 11 shows operating efficiency of the first antenna 201 shown in FIG. 3 in different frequency bands when the wireless earphone 100 is not worn by the user. A solid line in FIG. 11 shows operating efficiency of the first antenna 201 shown in FIG. 3 in different frequency bands when the wireless earphone 100 is worn by the user. It can be learned that operating efficiency of the first antenna 201 in the Bluetooth frequency band is relatively high. After the first antenna 201 is worn on the head of the user, the operating efficiency is slightly reduced.

A dotted line in FIG. 11 shows operating efficiency of the second antenna 202 shown in FIG. 3 in different frequency bands when the wireless earphone 100 is not worn by the user. A double-dot dashed line in FIG. 11 shows operating efficiency of the second antenna 202 shown in FIG. 3 in different frequency bands when the wireless earphone 100 is worn by the user. It can be learned that operating efficiency of the second antenna 202 in the Bluetooth frequency band is relatively high. After the second antenna 202 is worn on the head of the user, the operating efficiency is slightly reduced.

Figure 12:
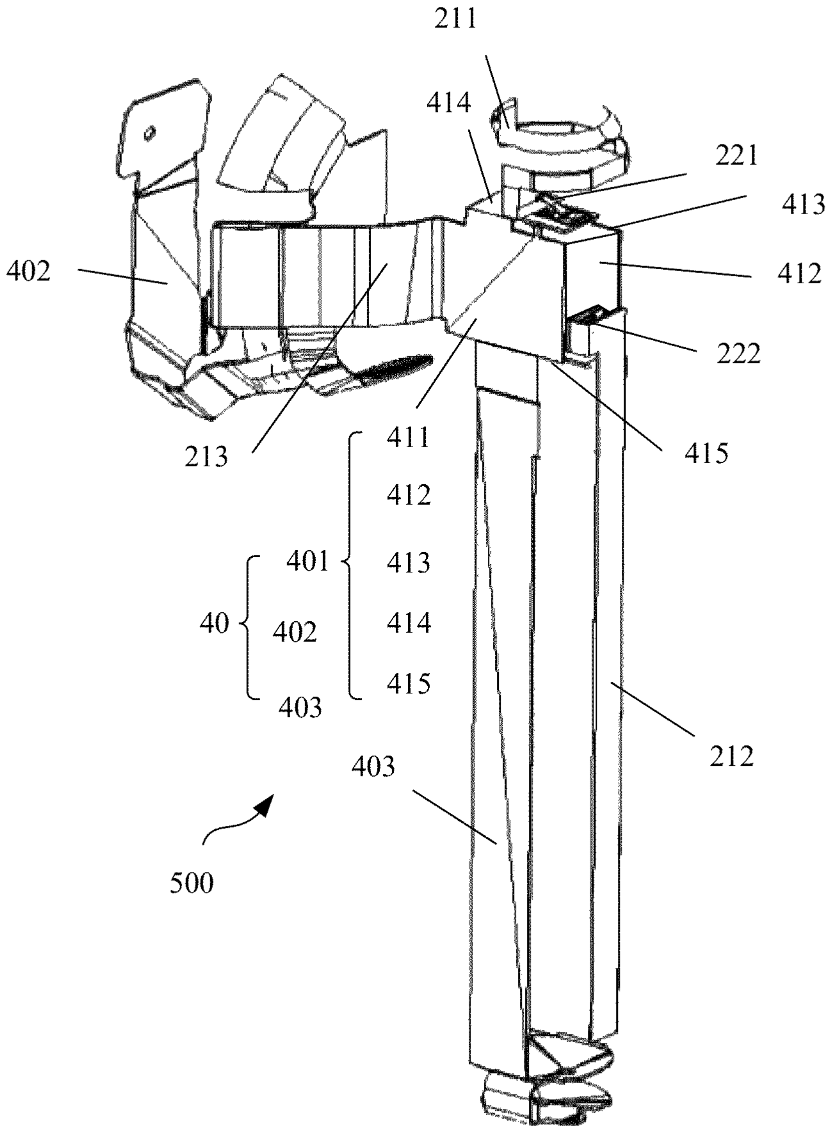
FIG. 12 is a schematic diagram of a structure of a circuit board component according to an embodiment of this application.

With reference to (a) in FIG. 1, FIG. 12 is a schematic diagram of a structure of another circuit board component 500 according to an embodiment of this application.

The circuit board component 500 may include a circuit board 40, a first antenna radiator 211, a second antenna radiator 212, a third antenna radiator 213, a first feeding unit 221, and a second feeding unit 222.

The circuit board 40 may include a feeding part 401, a first extension part 402, and a second extension part 403.

The feeding part 401 may be located in the connecting segment 21 of the earbud stem part 2 of the wireless earphone 100 shown in (a) in FIG. 1. As shown in FIG. 12, the feeding part 401 may specifically include a first-side feeding surface 411, a second-side feeding surface 412, a third-side feeding surface 413, a top feeding surface 414, and a bottom feeding surface 415. The first-side feeding surface 411, the second-side feeding surface 412, and the third-side feeding surface 413 each may be located on a side surface of the feeding part 401. The top feeding surface 414 may be located on the top of the feeding part 401, and the bottom feeding surface 415 may be located at the bottom of the feeding part 401. The second-side feeding surface 412 may be a side surface that is of the feeding part 401 and that is far away from the first extension part 402. The second-side feeding surface 412 is connected between the first-side feeding surface 411 and the third-side feeding surface 413. The first-side feeding surface 411 and the third-side feeding surface 413 may be disposed in parallel (approximately).

It should be understood that the feeding part 401 may further have more or fewer surfaces. For example, the feeding part 401 may have fewer side surfaces. For another example, the feeding part 401 may have no top surface.

The first extension part 402 may be connected to a side of the feeding part 401 (as shown in FIG. 12, the first extension part 402 may be connected to the first-side feeding surface 411 of the feeding part 401). The first extension part 402 may include a plurality of regions that are sequentially connected, and the plurality of regions may include at least one planar region and at least one curved surface region.

The second extension part 403 is connected to another side of the feeding part 401 (as shown in FIG. 12, the second extension part 403 may be connected to the first-side feeding surface 411 of the feeding part 401). The second extension part 403 may include a plurality of regions that are sequentially connected, and the plurality of regions may include at least one planar region and at least one curved surface region.

In an example, with reference to (a) in FIG. 1 and FIG. 12, the first feeding unit 221 may be disposed on the top feeding surface 414 of the feeding part 401. The first antenna radiator 211 may be electrically connected to the first feeding unit 221, and extends towards the top segment 22 of the earbud stem part 2. In other words, the first antenna radiator 211 may extend from the top feeding surface 414 of the feeding part 401 to the top segment 22 of the earbud stem part 2.

In another example, the first feeding unit 221 may be disposed, for example, on a side surface (for example, the first-side feeding surface 411, the second-side feeding surface 412, or the third-side feeding surface 413) of the feeding part 401 or a bottom surface of the feeding part 401.

In an example, with reference to (a) in FIG. 1 and FIG. 12, the second feeding unit 222 may be disposed on the second-side feeding surface 412 of the feeding part 401. The second antenna radiator 212 may be electrically connected to the second feeding unit 222, and extends towards the bottom segment 23 of the earbud stem part 2. In other words, the second antenna radiator 212 may extend from the second-side feeding surface 412 of the feeding part 401 to the bottom segment 23 of the earbud stem part 2.

In another example, the second feeding unit 222 may be disposed, for example, on another side surface (for example, the first-side feeding surface 411 or the third-side feeding surface 413) of the feeding part 401, a top surface of the feeding part 401, or a bottom surface of the feeding part 401.

With reference to (a) in FIG. 1 and FIG. 12, the second antenna radiator 212 may be disposed on a first side of the battery 70 shown in (a) in FIG. 1, and the second extension part 403 may be disposed on a second side of the battery 70 shown in (a) in FIG. 1. In other words, the second antenna radiator 212, the battery 70, and the second extension part 403 of the circuit board 40 may be disposed in the bottom segment 23 of the earbud stem part 2 of the wireless earphone 100. The second antenna radiator 212, the battery 70, and the second extension part 403 may be disposed (approximately) in parallel with the earbud stem part 2 of the wireless earphone 100. The second antenna radiator 212 and the second extension part 403 may surround the battery 70.

With reference to (a) in FIG. 1 and FIG. 12, for example, the positive electrode and the negative electrode of the battery 70 shown in (a) in FIG. 1 may be electrically connected to the bottom feeding surface 415 of the feeding part 401, or may be electrically connected to a bottom end (that is, one end that is far away from the feeding part 401) of the second extension part 403.

Figure 13:
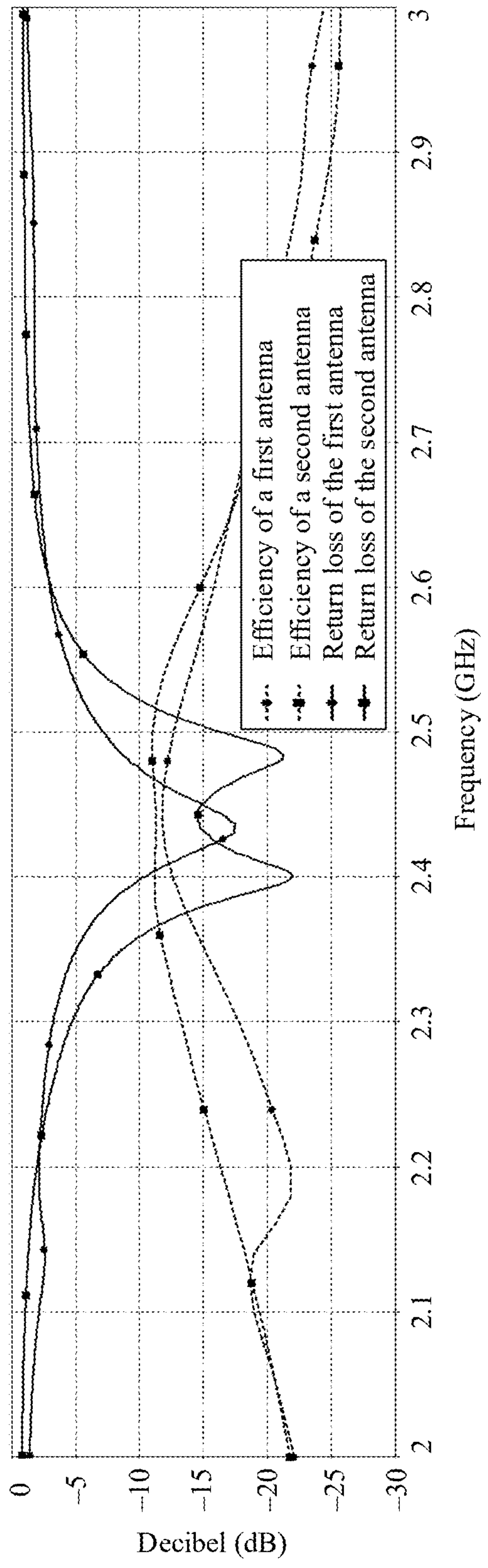
FIG. 13 is a schematic diagram of antenna performance of a dual-antenna structure according to an embodiment of this application.

FIG. 13 shows antenna efficiency and a return loss that can be implemented by the circuit board component 500 shown in FIG. 12. With reference to FIG. 3 and FIG. 13, the first antenna 201 including the first antenna radiator 211 and the third antenna radiator 213 may implement relatively high antenna efficiency in 2.4 GHz to 2.55 GHz, and the first antenna 201 may further have a relatively low return loss in 2.4 GHz to 2.55 GHz. With reference to FIG. 3 and FIG. 13, the second antenna 202 including the second antenna radiator 212 and the third antenna radiator 213 may implement relatively high antenna efficiency in 2.4 GHz to 2.55 GHz, and the second antenna 202 may further have a relatively low return loss in 2.4 GHz to 2.55 GHz.

Figure 14:
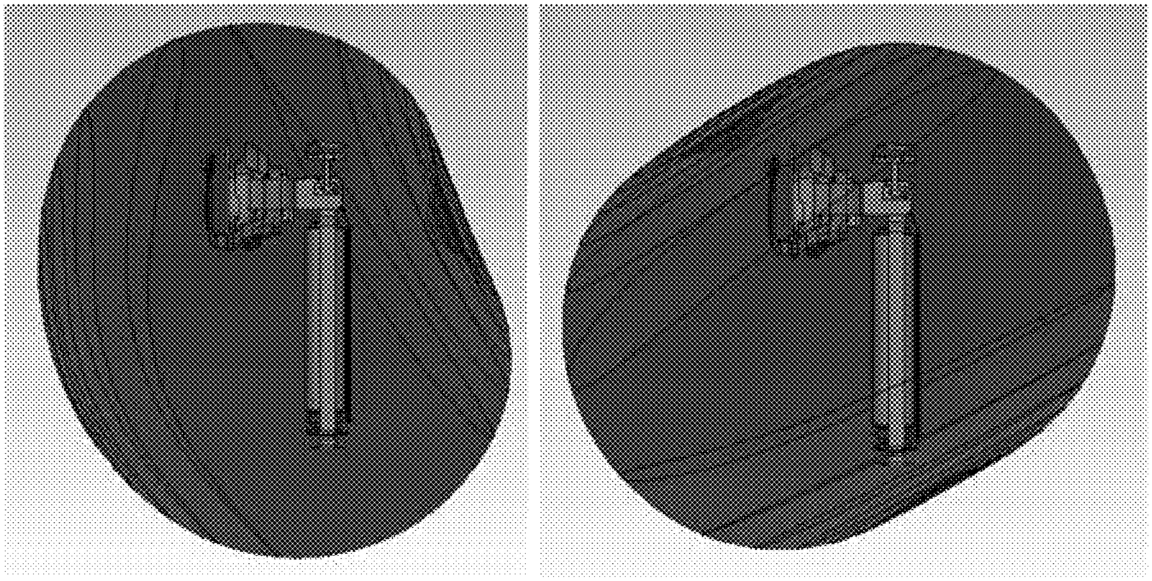
FIG. 14 is a schematic diagram of a head phantom directivity mode of a dual-antenna structure according to an embodiment of this application.

FIG. 14 is an antenna directivity diagram that can be implemented by a wireless earphone 10. The wireless earphone 100 includes the circuit board component 500 shown in FIG. 12, and the wireless earphone 100 is not worn on the ear of a user.

From a front view of the earphone, an antenna directivity diagram of the first antenna 201 shown in (a) in FIG. 14 may be obtained.

From the front view of the earphone, an antenna directivity diagram of the second antenna 202 shown in (b) in FIG. 14 may be obtained.

It can be learned from this that a free space mode of the first antenna 201 is greatly different from a free space mode in a head phantom directivity of the second antenna 202.

Figure 15:
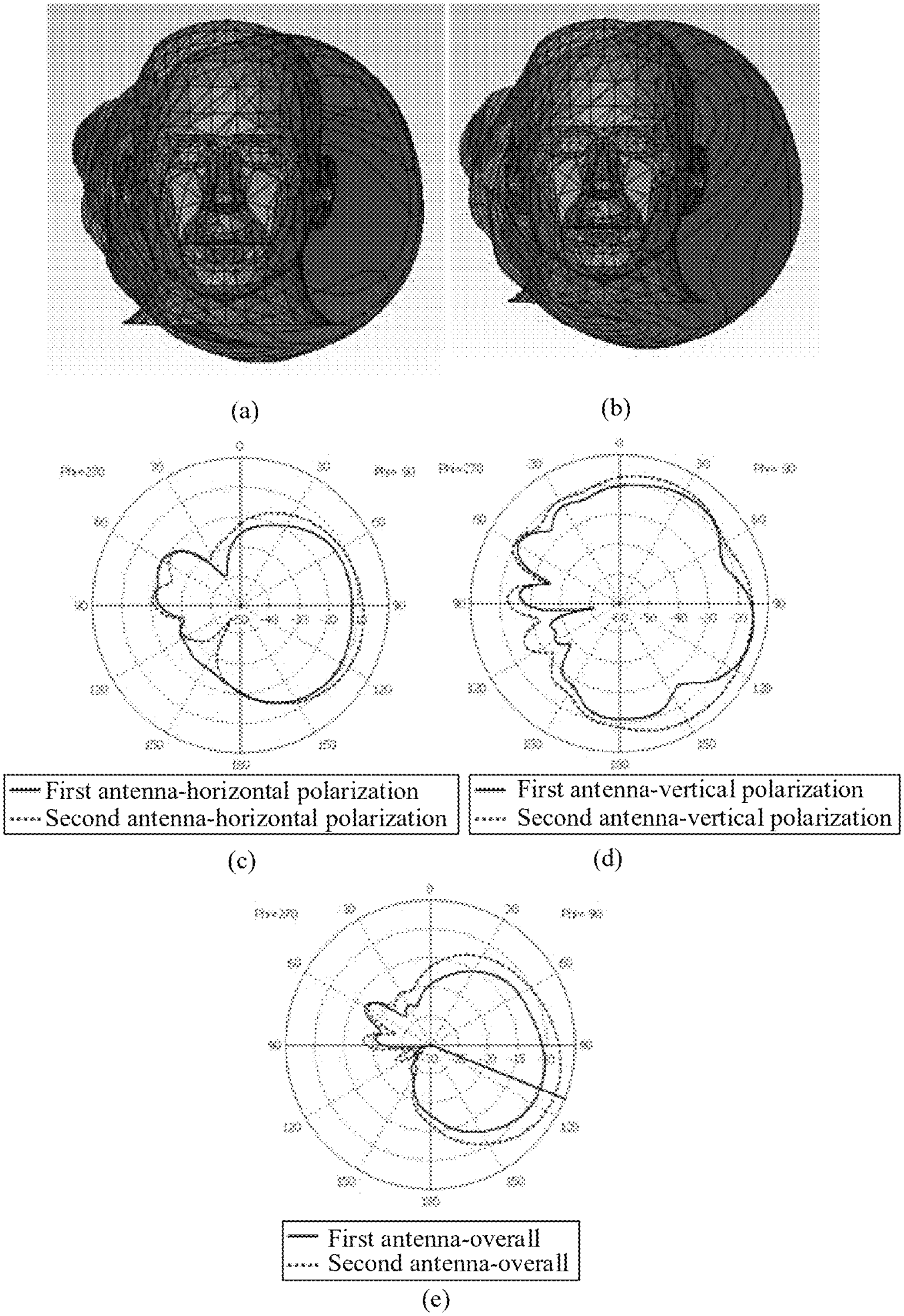
FIG. 15 is a schematic diagram of a head phantom directivity mode and antenna performance of a dual-antenna structure according to an embodiment of this application.
Figure 16:
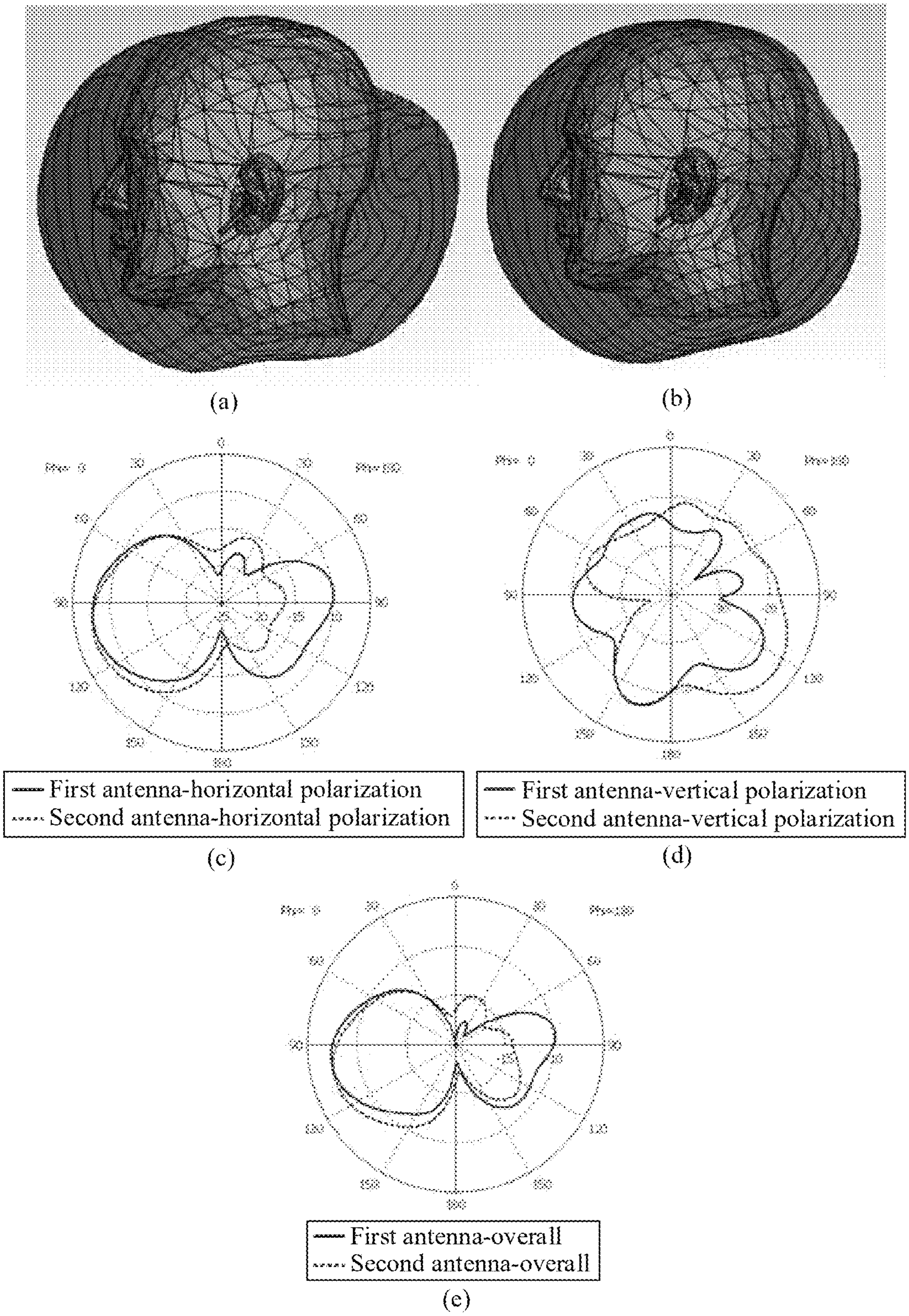
FIG. 16 is a schematic diagram of a head phantom directivity mode and antenna performance of a dual-antenna structure according to an embodiment of this application.
Figure 17:
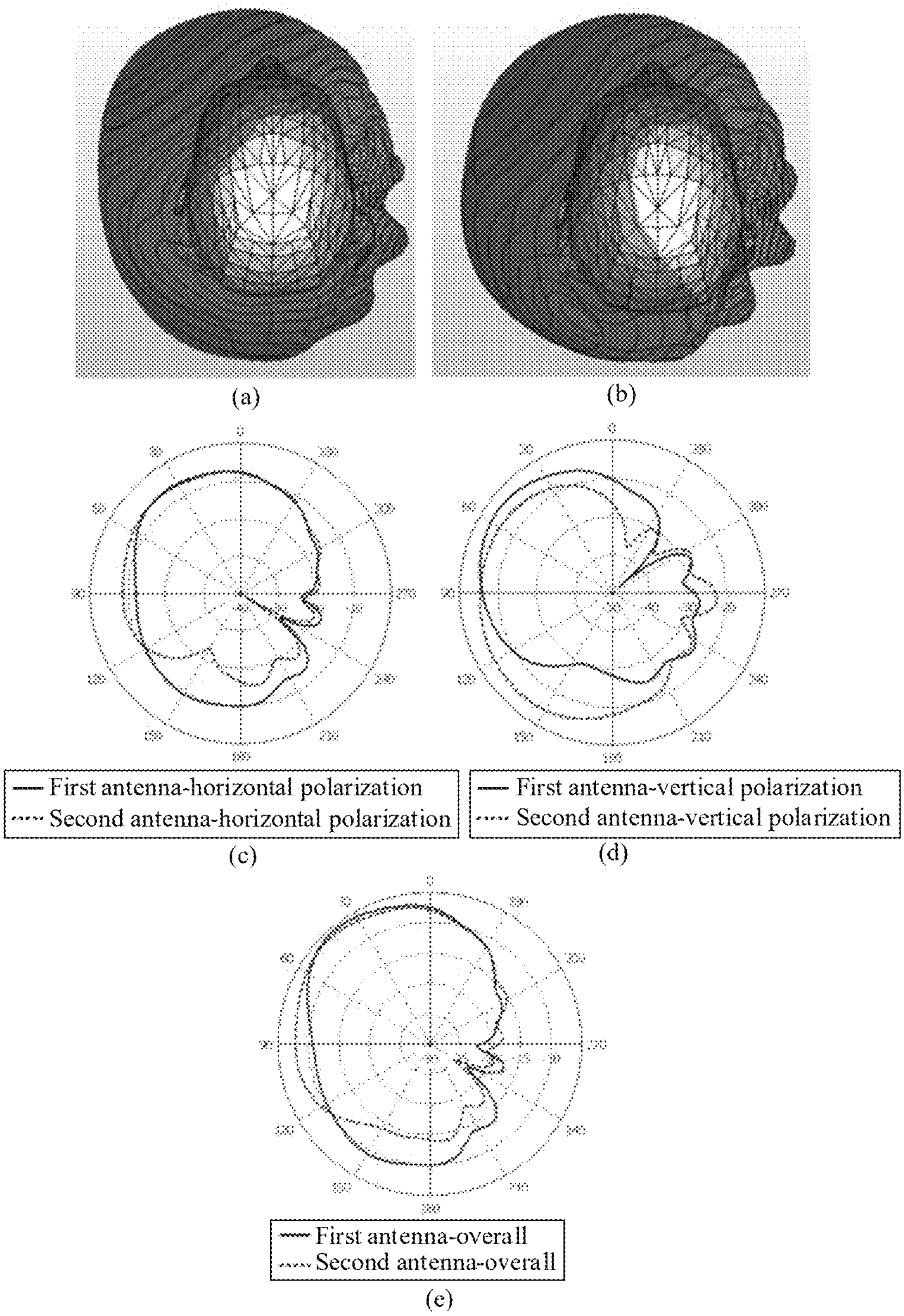
FIG. 17 is a schematic diagram of a head phantom directivity mode and antenna performance of a dual-antenna structure according to an embodiment of this application.

FIG. 15 to FIG. 17 each show a head phantom directivity mode that can be implemented by a wireless earphone 100. The wireless earphone 100 includes the circuit board component 500 shown in FIG. 12, and the wireless earphone 100 is worn on the ear of a user.

From a front view of the face of the user, a profile (shown in (a) in FIG. 15) of a head phantom directivity mode of the first antenna 201 may be obtained.

From the front view of the face of the user, a profile (shown in (b) in FIG. 15) of the head phantom directivity mode of the second antenna 202 may be obtained.

From the front view of the face of the user, a plan view 1-1-1 (shown in (c) in FIG. 15) of the head phantom directivity mode of the first antenna 201 in a horizontal polarization direction and a plan view 2-1-1 (shown in (c) in FIG. 15) of the head phantom directivity mode of the second antenna 202 in the horizontal polarization direction may be obtained.

From the front view of the face of the user, a plan view 1-1-2 (shown in (d) in FIG. 15) of the head phantom directivity mode of the first antenna 201 in a vertical polarization direction and a plan view 2-1-2 (shown in (d) in FIG. 15) of the head phantom directivity mode of the second antenna 202 in the vertical polarization direction may be obtained.

From the front view of the face of the user, an overall plan view 1-1-3 (shown in (e) in FIG. 15) of the head phantom directivity mode of the first antenna 201 and an overall plan view 2-1-3 (shown in (e) in FIG. 15) of the head phantom directivity mode of the second antenna 202 may be obtained by combining the foregoing plan views 1-1-1 and 2-1-1 of the head phantom directivity mode in the horizontal polarization direction and the foregoing plan views 1-1-2 and 2-1-2 of the head phantom directivity mode in the vertical polarization direction.

From a side view of the face of the user, a profile (shown in (a) in FIG. 16) of a head phantom directivity mode of the first antenna 201 may be obtained.

From the side view of the face of the user, a profile (shown in (b) in FIG. 16) of the head phantom directivity mode of the second antenna 202 may be obtained.

From the side view of the face of the user, a plan view 1-2-1 (shown in (c) in FIG. 16) of the head phantom directivity mode of the first antenna 201 in a horizontal polarization direction and a plan view 2-2-1 (shown in (c) in FIG. 16) of the head phantom directivity mode of the second antenna 202 in the horizontal polarization direction may be obtained.

From the side view of the face of the user, a plan view 1-2-2 (shown in (d) in FIG. 16) of the head phantom directivity mode of the first antenna 201 in a vertical polarization direction and a plan view 2-2-2 (shown in (d) in FIG. 16) of the head phantom directivity mode of the second antenna 202 in the vertical polarization direction may be obtained.

From the side view of the face of the user, an overall plan view 1-2-3 (shown in (e) in FIG. 16) of the head phantom directivity mode of the first antenna 201 and an overall plan view 2-2-3 (shown in (e) in FIG. 16) of the head phantom directivity mode of the second antenna 202 may be obtained by combining the foregoing plan views 1-2-1 and 2-2-1 of the head phantom directivity mode in the horizontal polarization direction and the foregoing plan views 1-2-2 and 2-2-2 of the head phantom directivity mode in the vertical polarization direction.

From a top view of the head of the user, a profile (shown in (a) in FIG. 17) of a head phantom directivity mode of the first antenna 201 may be obtained.

From the top view of the head of the user, a profile (shown in (b) in FIG. 17) of the head phantom directivity mode of the second antenna 202 may be obtained.

From the top view of the head of the user, a plan view 1-3-1 (shown in (c) in FIG. 17) of the head phantom directivity mode of the first antenna 201 in a horizontal polarization direction and a plan view 2-3-1 (shown in (c) in FIG. 17) of the head phantom directivity mode of the second antenna 202 in the horizontal polarization direction may be obtained.

From the top view of the head of the user, a plan view 1-3-2 (shown in (d) in FIG. 17) of the head phantom directivity mode of the first antenna 201 in a vertical polarization direction and a plan view 2-3-2 (shown in (d) in FIG. 17) of the head phantom directivity mode of the second antenna 202 in the vertical polarization direction may be obtained.

From the top view of the head of the user, an overall plan view 1-3-3 (shown in (e) in FIG. 17) of the head phantom directivity mode of the first antenna 201 and an overall plan view 2-3-3 (shown in (e) in FIG. 17) of the phantom directivity mode of the second antenna 202 may be obtained by combining the foregoing plan views 1-3-1 and 2-3-1 of the head phantom directivity mode in the horizontal polarization direction and the foregoing plan views 1-3-2 and 2-3-2 of the head phantom directivity mode in the vertical polarization direction.

It can be learned from antenna performance shown in FIG. 15 to FIG. 17 that antenna performance that can be implemented by the first antenna 201 is relatively limited, and antenna performance that can be implemented by the second antenna 202 is also relatively limited. However, because the head phantom directivity mode that can be implemented by the first antenna 201 is different from the head phantom directivity mode that can be implemented by the second antenna 202, a region in which the head phantom directivity mode of the first antenna 201 is relatively weak may be complemented by the second antenna 202. Similarly, a region in which the head phantom directivity mode of the second antenna 202 is relatively weak may be complemented by the first antenna 201.

It can be learned from the antenna performance shown in FIG. 14 to FIG. 17 that disposing dual antennas with different head phantom directivity modes in the wireless earphone 100 helps improve overall antenna performance of the wireless earphone 100, and further helps improve data transmission efficiency, an audio play effect, and the like of the wireless earphone 100.

Figure 18:
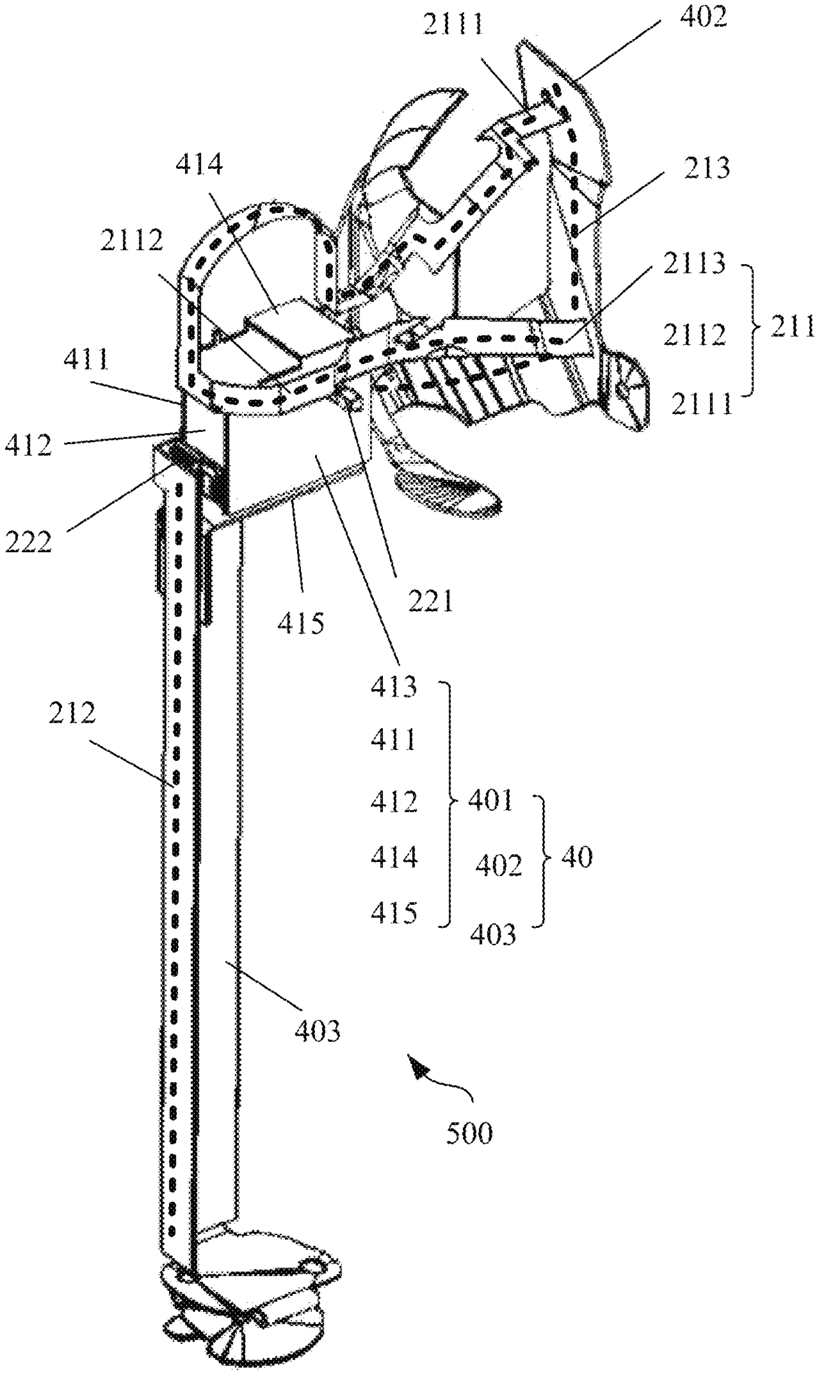
FIG. 18 is a schematic diagram of a structure of a circuit board component according to an embodiment of this application.

FIG. 18 is a schematic diagram of a structure of another circuit board component 500 according to an embodiment of this application.

A difference between the circuit board component 500 shown in FIG. 18 and the circuit board component 500 shown in FIG. 12 may include: A location of the first feeding unit 221 shown in FIG. 18 is different from a location of the first feeding unit 221 shown in FIG. 12, and a structure of the first antenna radiator 211 shown in FIG. 18 is different from a structure of the first antenna radiator 211 shown in FIG. 12.

According to a first aspect, as shown in FIG. 18, the second extension part 403 of the circuit board 40 may be connected to the first-side feeding surface 411 of the feeding part 401, and the first feeding unit 221 may be disposed on the third-side feeding surface 413 of the feeding part 401. Because the grounded third antenna radiator 213 is disposed on the second extension part 403, disposing the first feeding unit 221 on the third-side feeding surface 413 helps reduce mutual interference between the first antenna radiator 211 and the third antenna radiator 213. In another example, the first feeding unit 221 may be disposed, for example, on another side surface (for example, the first-side feeding surface 411 or the second-side feeding surface 412) of the feeding part 401, a top surface of the feeding part 401, or a bottom surface of the feeding part 401.

According to a second aspect, as shown in FIG. 18, the first antenna radiator 211 may include a first segment 2111, a second segment 2113, and a middle segment 2112. The middle segment 2112 may be connected between the first segment 2111 and the second segment 2113, and the first segment 2111, the middle segment 2112, and the second segment 2113 are sequentially connected together to form the first antenna radiator 211. The middle segment 2112 may be electrically connected to the first feeding unit 221. The middle segment 2112 may be located in the connecting segment 21 of the earbud stem part 2. With reference to (a) in FIG. 1 and FIG. 18, the first segment 2111 may sequentially extend from the connecting segment 21 of the earbud stem part 2 of the wireless earphone 100 to the top segment 22 of the earbud stem part 2 and the earbud part 1, and the second segment 2113 may extend from the connecting segment 21 of the earbud stem part 2 of the wireless earphone 100 to the earbud part 1 (that is, the second segment 2113 may not pass through the top segment 22 of the earbud stem part 2).

It should be understood that, with reference to (b) in FIG. 1 and FIG. 18, it can be learned that, when the wireless earphone 100 does not have the top segment 22, the first antenna radiator 211 may include a first segment and a second segment that are sequentially connected together. The first segment extends from the earbud part 1 to the connecting segment 21, and the second segment extends from the connecting segment 21 to the earbud part 1. In addition, when the wireless earphone 100 has the top segment 22, the first antenna radiator 211 may not pass through the top segment 22 either.

Figure 19:
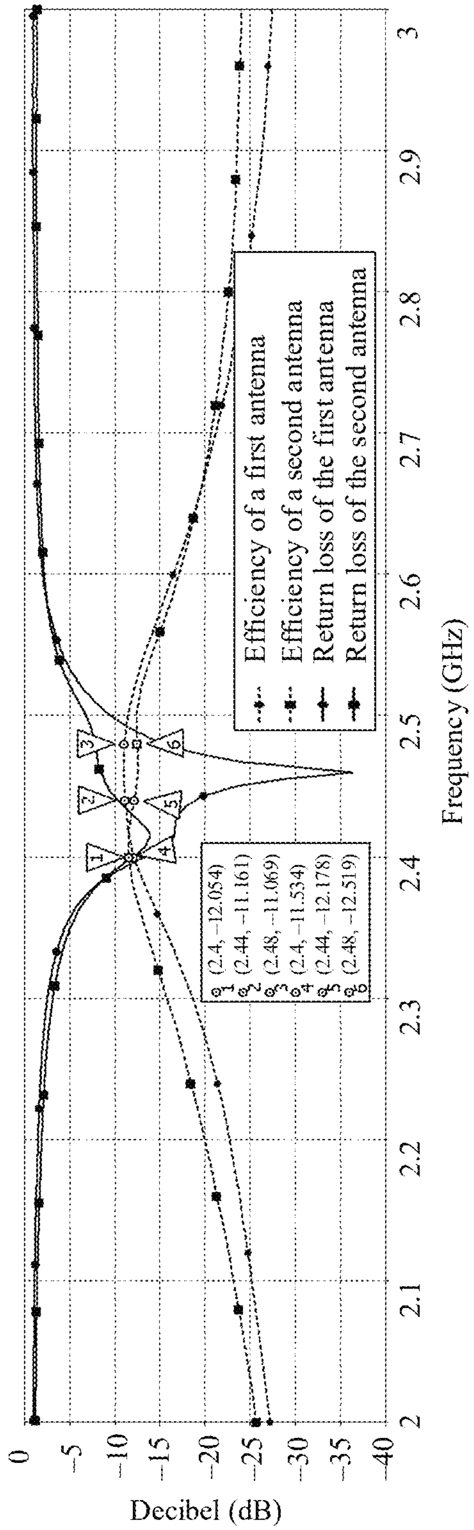
FIG. 19 is a schematic diagram of antenna performance of a dual-antenna structure according to an embodiment of this application.

FIG. 19 shows antenna efficiency and a return loss that can be implemented by the circuit board component 500 shown in FIG. 18. With reference to FIG. 3 and FIG. 19, the first antenna 201 including the first antenna radiator 211 and the third antenna radiator 213 may implement relatively high antenna efficiency in 2.4 GHz to 2.5 GHz, and the first antenna 201 may further have a relatively low return loss in 2.4 GHz to 2.5 GHz. With reference to FIG. 3 and FIG. 19, the second antenna 202 including the second antenna radiator 212 and the third antenna radiator 213 may implement relatively high antenna efficiency in 2.4 GHz to 2.5 GHz, and the second antenna 202 may further have a relatively low return loss in 2.4 GHz to 2.5 GHz.

It can be learned from the antenna performance shown in FIG. 13 and FIG. 19 that, in a frequency band of 2.4 GHz to 2.5 GHz, the first antenna 201 shown in FIG. 18 may have a relatively low return loss. In other words, changing a location of the first feeding unit 221 in the wireless earphone 100 and changing a structure and a location of the first antenna radiator 211 in the wireless earphone 100 help optimize the return loss of the first antenna 201.

Figure 20:
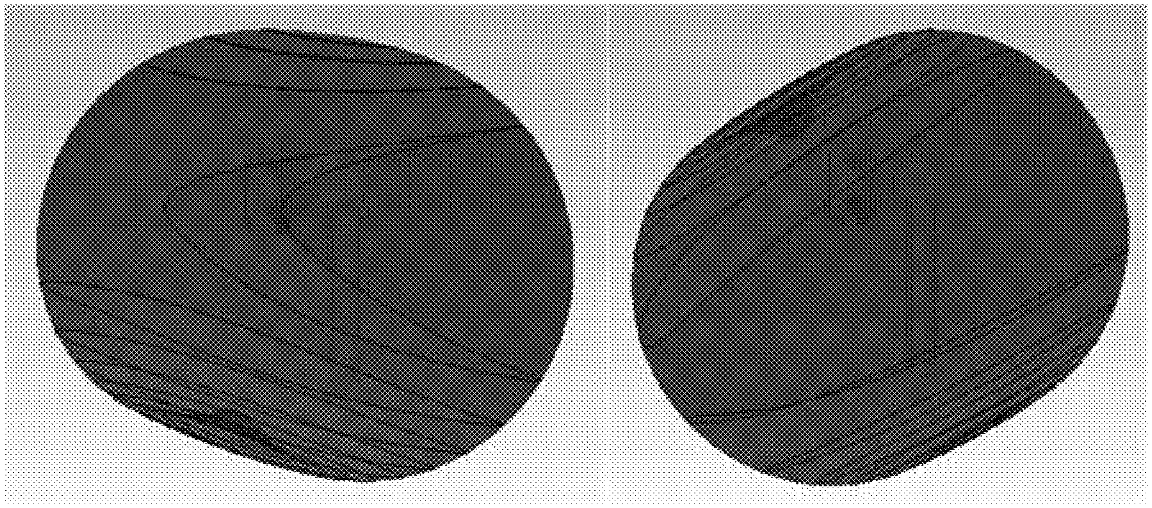
FIG. 20 is a schematic diagram of a head phantom directivity mode of a dual-antenna structure according to an embodiment of this application.

FIG. 20 is an antenna directivity diagram that can be implemented by a wireless earphone 100. The wireless earphone 100 includes the circuit board component 500 shown in FIG. 18, and the wireless earphone 100 is not worn on the ear of a user.

From a front view of the earphone, an antenna directivity diagram of the first antenna 201 shown in (a) in FIG. 20 and an antenna directivity diagram of the second antenna 202 shown in (b) in FIG. 20 may be obtained.

It can be learned from this that the antenna directivity diagram of the first antenna 201 is greatly different from the antenna directivity diagram of the second antenna 202.

It can be learned from the antenna performance shown in FIG. 14 and FIG. 20 that, when the wireless earphone 100 is not worn on the ear of the user, the antenna directivity diagram of the first antenna 201 shown in FIG. 18 may be different from the antenna directivity diagram of the first antenna 201 shown in FIG. 12. In other words, changing a location of the first feeding unit 221 in the wireless earphone 100 and changing a structure and a location of the first antenna radiator 211 in the wireless earphone 100 can change the antenna directivity diagram of the first antenna 201.

Figure 21:
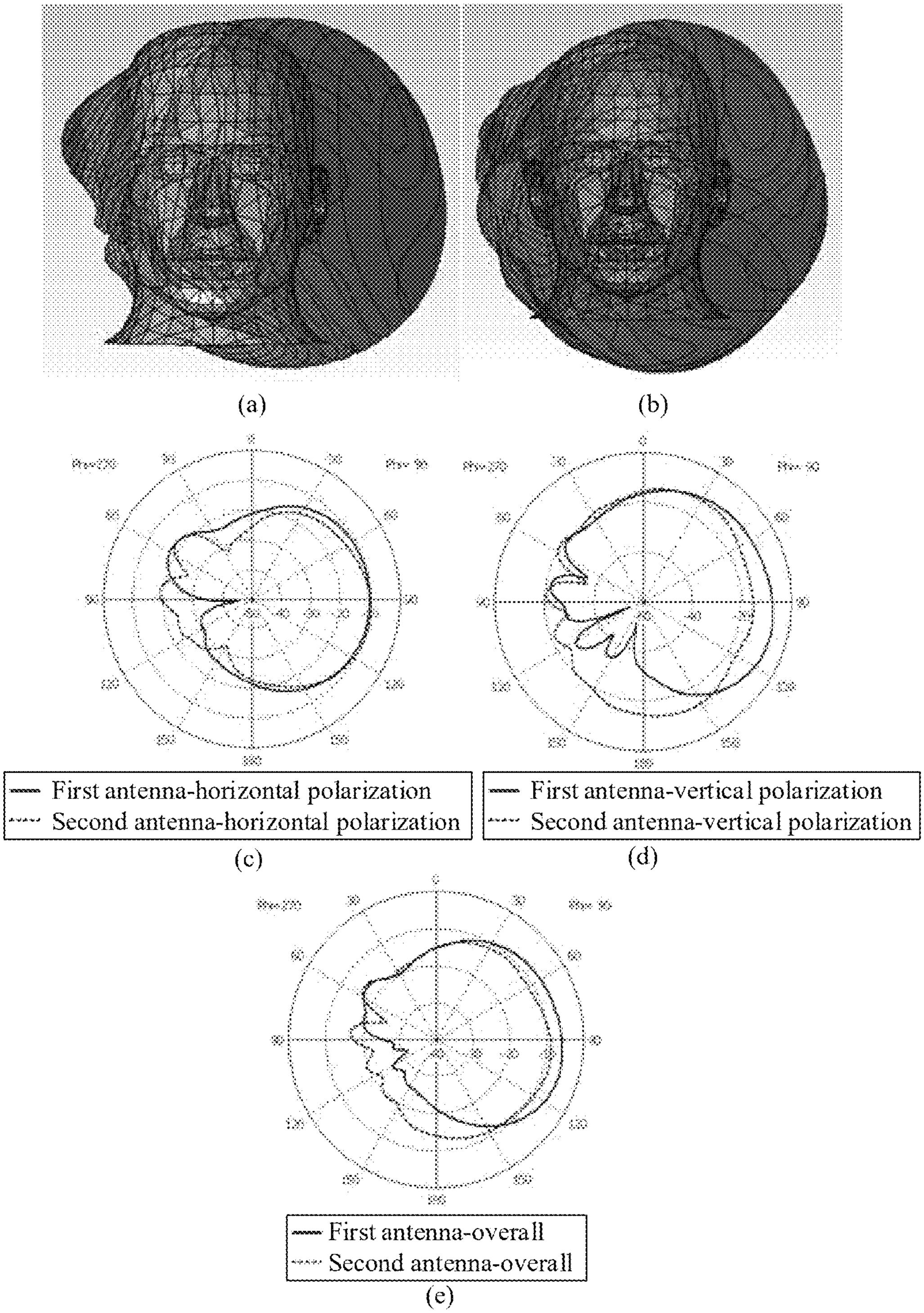
FIG. 21 is a schematic diagram of a head phantom directivity mode and antenna performance of a dual-antenna structure according to an embodiment of this application.

FIG. 21 shows a head phantom directivity mode that can be implemented by a wireless earphone 100. The wireless earphone 100 includes the circuit board component 500 shown in FIG. 18, and the wireless earphone 100 is worn on the ear of a user.

From a front view of the face of the user, a profile (shown in (a) in FIG. 21) of a head phantom directivity mode of the first antenna 201 may be obtained.

From the front view of the face of the user, a profile (shown in (b) in FIG. 21) of the head phantom directivity mode of the second antenna 202 may be obtained.

From the front view of the face of the user, a plan view 1-1-4 (shown in (c) in FIG. 21) of the head phantom directivity mode of the first antenna 201 in a horizontal polarization direction and a plan view 2-1-4 (shown in (c) in FIG. 21) of the head phantom directivity mode of the second antenna 202 in the horizontal polarization direction may be obtained.

From the front view of the face of the user, a plan view 1-1-5 (shown in (d) in FIG. 21) of the head phantom directivity mode of the first antenna 201 in a vertical polarization direction and a plan view 2-1-5 (shown in (d) in FIG. 21) of the head phantom directivity mode of the second antenna 202 in the vertical polarization direction may be obtained.

From the front view of the face of the user, an overall plan view 1-1-6 (shown in (e) in FIG. 21) of the head phantom directivity mode of the first antenna 201 and an overall plan view 2-1-6 (shown in (e) in FIG. 21) of the head phantom directivity mode of the second antenna 202 may be obtained by combining the foregoing plan views 1-1-4 and 2-1-4 of the head phantom directivity mode in the horizontal polarization direction and the foregoing plan views 1-1-5 and 2-1-5 of the head phantom directivity mode in the vertical polarization direction.

Figure 22:
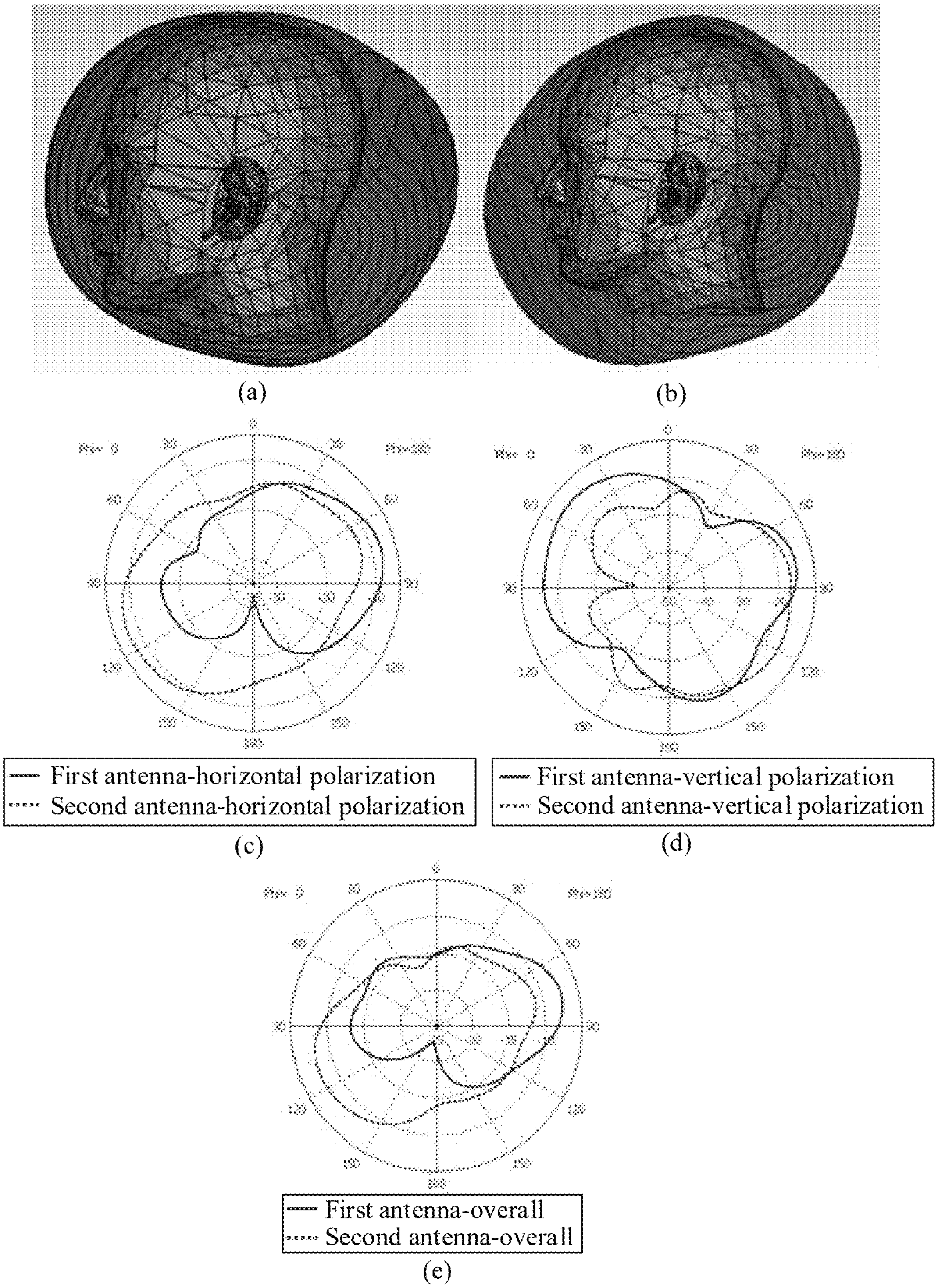
FIG. 22 is a schematic diagram of a head phantom directivity mode and antenna performance of a dual-antenna structure according to an embodiment of this application.

From a side view of the face of the user, a profile (shown in (a) in FIG. 22) of a head phantom directivity mode of the first antenna 201 may be obtained.

From the side view of the face of the user, a profile (shown in (b) in FIG. 22) of the head phantom directivity mode of the second antenna 202 may be obtained.

From the side view of the face of the user, a plan view 1-2-4 (shown in (c) in FIG. 22) of the head phantom directivity mode of the first antenna 201 in a horizontal polarization direction and a plan view 2-2-4 (shown in (c) in FIG. 22) of the head phantom directivity mode of the second antenna 202 in the horizontal polarization direction may be obtained.

From the side view of the face of the user, a plan view 1-2-5 (shown in (d) in FIG. 22) of the head phantom directivity mode of the first antenna 201 in a vertical polarization direction and a plan view 2-2-5 (shown in (d) in FIG. 22) of the head phantom directivity mode of the second antenna 202 in the vertical polarization direction may be obtained.

From the side view of the face of the user, an overall plan view 1-2-6 (shown in (e) in FIG. 22) of the head phantom directivity mode of the first antenna 201 and an overall plan view 2-2-6 (shown in (e) in FIG. 22) of the head phantom directivity mode of the second antenna 202 may be obtained by combining the foregoing plan views 1-2-4 and 2-2-4 of the head phantom directivity mode in the horizontal polarization direction and the foregoing plan views 1-2-5 and 2-2-5 of the head phantom directivity mode in the vertical polarization direction.

Figure 23:
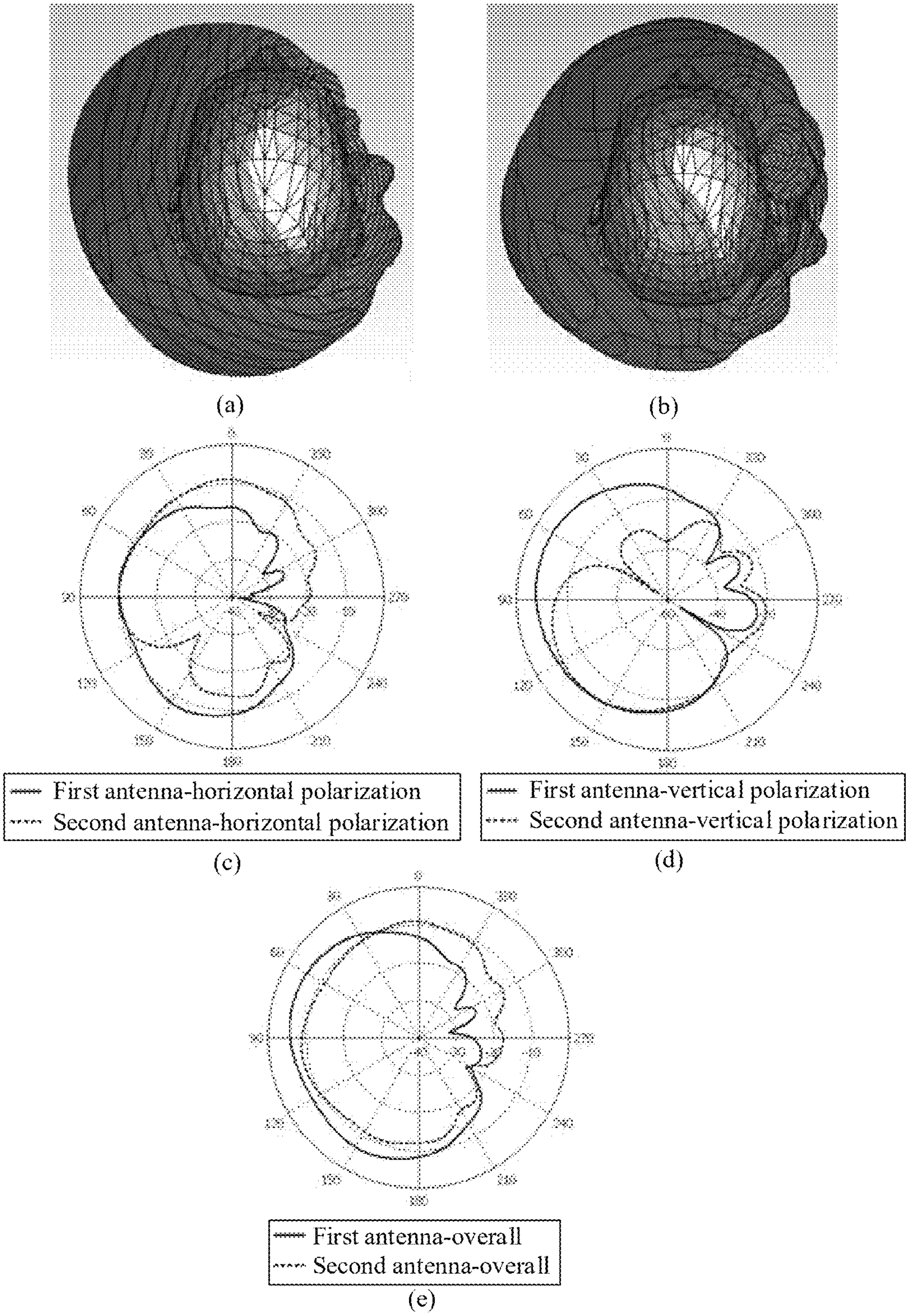
FIG. 23 is a schematic diagram of a head phantom directivity mode and antenna performance of a dual-antenna structure according to an embodiment of this application.

From a top view of the head of the user, a profile (shown in (a) in FIG. 23) of a head phantom directivity mode of the first antenna 201 may be obtained.

From the top view of the head of the user, a profile (shown in (b) in FIG. 23) of the head phantom directivity mode of the second antenna 202 may be obtained.

From the top view of the head of the user, a plan view 1-3-4 (shown in (c) in FIG. 23) of the head phantom directivity mode of the first antenna 201 in a horizontal polarization direction and a plan view 2-3-4 (shown in (c) in FIG. 23) of the head phantom directivity mode of the second antenna 202 in the horizontal polarization direction may be obtained.

From the top view of the head of the user, a plan view 1-3-5 (shown in (d) in FIG. 23) of the head phantom directivity mode of the first antenna 201 in a vertical polarization direction and a plan view 2-3-5 (shown in (d) in FIG. 23) of the head phantom directivity mode of the second antenna 202 in the vertical polarization direction may be obtained.

From the top view of the head of the user, an overall plan view 1-3-6 (shown in (e) in FIG. 23) of the head phantom directivity mode of the first antenna 201 and an overall plan view 2-3-6 (shown in (e) in FIG. 23) of the head phantom directivity mode of the second antenna 202 may be obtained by combining the foregoing plan views 1-3-4 and 2-3-4 of the head phantom directivity mode in the horizontal polarization direction and the foregoing plan views 1-3-5 and 2-3-5 of the head phantom directivity mode in the vertical polarization direction.

It can be learned from the antenna performance shown in FIG. 21 to FIG. 23 that disposing dual antennas with different head phantom directivity modes in the wireless earphone 100 helps improve overall antenna performance of the wireless earphone 100, and further helps improve data transmission efficiency, an audio play effect, and the like of the wireless earphone 100.

It can be learned from the head phantom directivity modes shown in FIG. 15 to FIG. 17 and the head phantom directivity modes shown in FIG. 21 to FIG. 23 that:

From the front view of the face of the user, a radiation low point (the radiation low point may correspond to a minimum gain value) of the dual-antenna structure 200 shown in FIG. 12 in the horizontal polarization direction may be approximately −30 dB (as shown in FIG. 15), and a radiation low point of the dual-antenna structure 200 shown in FIG. 18 in the horizontal polarization direction may be approximately −26 dB (as shown in FIG. 21).

From the front view of the face of the user, a radiation low point of the dual-antenna structure 200 shown in FIG. 12 in the vertical polarization direction may be approximately −35 dB (as shown in FIG. 15), and a radiation low point of the dual-antenna structure 200 shown in FIG. 18 in the vertical polarization direction may be approximately −33 dB (as shown in FIG. 21).

From the front view of the face of the user, an overall radiation low point of the dual-antenna structure 200 shown in FIG. 12 may be approximately −27 dB (as shown in FIG. 15), and a radiation low point of the dual-antenna structure 200 shown in FIG. 18 in the vertical polarization direction may be approximately −28 dB (as shown in FIG. 21).

From the side view of the face of the user, a radiation low point of the dual-antenna structure 200 shown in FIG. 12 in the horizontal polarization direction may be approximately −18 dB (as shown in FIG. 16), and a radiation low point of the dual-antenna structure 200 shown in FIG. 18 in the horizontal polarization direction may be approximately −23 dB (as shown in FIG. 22).

From the side view of the face of the user, a radiation low point of the dual-antenna structure 200 shown in FIG. 12 in the vertical polarization direction may be approximately −24 dB (as shown in FIG. 16), and a radiation low point of the dual-antenna structure 200 shown in FIG. 18 in the vertical polarization direction may be approximately −28 dB (as shown in FIG. 22).

From the side view of the face of the user, an overall radiation low point of the dual-antenna structure 200 shown in FIG. 12 may be approximately −18 dB (as shown in FIG. 16), and a radiation low point of the dual-antenna structure 200 shown in FIG. 18 in the vertical polarization direction may be approximately −25 dB (as shown in FIG. 22).

From the top view of the head of the user, a radiation low point of the dual-antenna structure 200 shown in FIG. 12 in the horizontal polarization direction may be approximately −27 dB (as shown in FIG. 17), and a radiation low point of the dual-antenna structure 200 shown in FIG. 18 in the horizontal polarization direction may be approximately −25 dB (as shown in FIG. 23).

From the top view of the head of the user, a radiation low point of the dual-antenna structure 200 shown in FIG. 12 in the vertical polarization direction may be approximately −35 dB (as shown in FIG. 17), and a radiation low point of the dual-antenna structure 200 shown in FIG. 18 in the vertical polarization direction may be approximately −30 dB (as shown in FIG. 23).

From the top view of the head of the user, an overall radiation low point of the dual-antenna structure 200 shown in FIG. 12 may be approximately −23 dB (as shown in FIG. 17), and a radiation low point of the dual-antenna structure 200 shown in FIG. 18 in the vertical polarization direction may be approximately −23 dB (as shown in FIG. 23).

In other words, compared with the dual-antenna structure 200 shown in FIG. 12, the dual-antenna structure 200 shown in FIG. 18 may change the head phantom directivity mode of the first antenna 201, and further change a complementary result of the first antenna 201 and the second antenna 202 in terms of antenna performance when the wireless earphone 100 is worn.

With reference to (a) in FIG. 1 and FIG. 18, the first antenna radiator 211 may be disposed in a cavity formed by the housing 10 of the wireless earphone 100. For example, the first antenna radiator 211 may be fixed on a support inside the housing 10.

Figure 24:
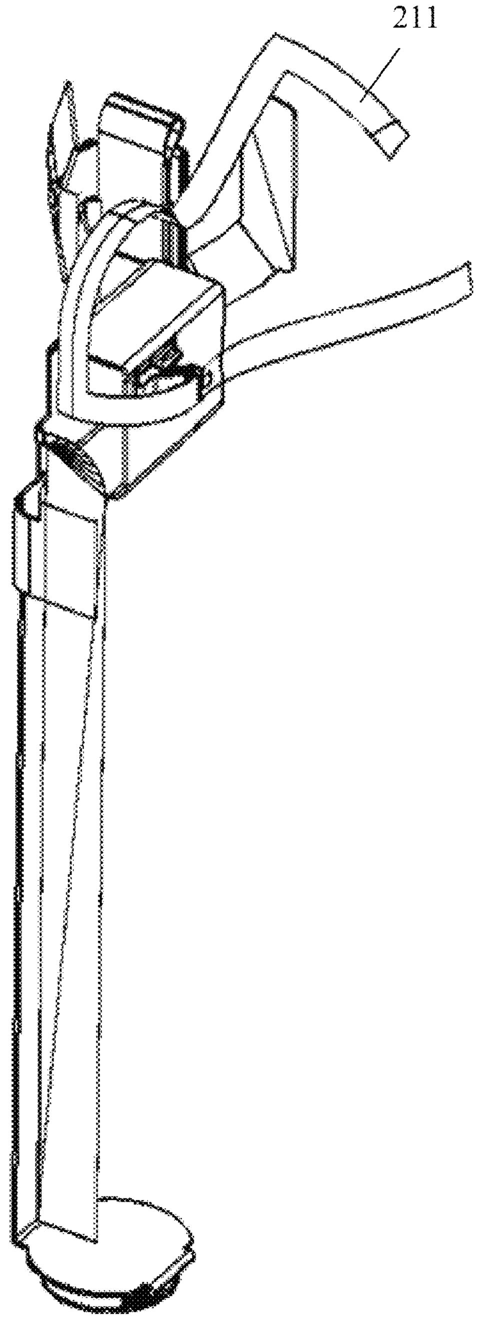
FIG. 24 is a schematic diagram of a structure of a circuit board component according to an embodiment of this application.

With reference to (a) in FIG. 1 and FIG. 24, the first antenna radiator 211 may be processed on the housing 10 of the wireless earphone 100 by using a laser direct structuring (laser direct structuring. LDS) technology, an iron component, a flexible printed circuit (flexible printed circuit, FPC), or the like. The first antenna radiator 211 may be located, for example, inside the wireless earphone 100. In other words, a structure of the first antenna radiator 211 may correspond to an inner profile of the housing 10.

It should be understood that the second antenna radiator 212 may be fixed on a support inside the housing 10. Alternatively; the second antenna radiator 212 may be processed on the housing 10 of the wireless earphone 100 by using LDS, an iron component, an FPC, or the like. The second antenna radiator 212 may be located, for example, inside the wireless earphone 100. In other words, a structure of the second antenna radiator 212 may correspond to an inner profile of the housing 10.

Figure 25:
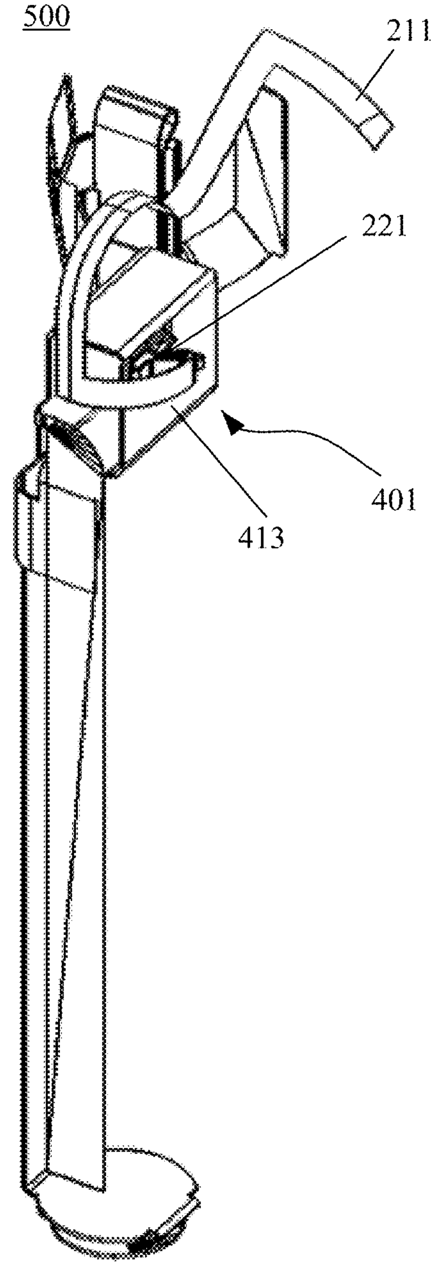
FIG. 25 is a schematic diagram of a structure of a circuit board component according to an embodiment of this application.

FIG. 25 is a schematic diagram of a structure of still another circuit board component 500 according to an embodiment of this application. A difference between the circuit board component 500 shown in FIG. 25 and the circuit board component 500 shown in FIG. 18 may include: The first antenna radiator 211 shown in FIG. 25 may not include the second segment 2113 shown in FIG. 18. In other words, an electrical length of the first antenna radiator 211 is relatively short.

In a possible case, the electrical length of the first antenna radiator 211 is adjusted through designing, so that the first antenna radiator 211 can operate in an operating frequency band. This helps adjust a space occupied by the first antenna radiator 211 in the Bluetooth earphone, and further helps adjust an antenna directivity diagram and antenna efficiency of the wireless earphone 100.

In another example, with reference to (b) in FIG. 1 and FIG. 25, it can be learned that, when the wireless earphone 100 does not have the top segment 22, the first antenna radiator 211 may extend from the connecting segment 21 to the earbud part 1. In addition, when the wireless earphone 100 has the top segment 22, the first antenna radiator 211 may not pass through the top segment 22 either.

In addition, the first feeding unit 221 shown in FIG. 25 may be disposed on the third-side feeding surface 413 of the feeding part 401.

Figure 26:
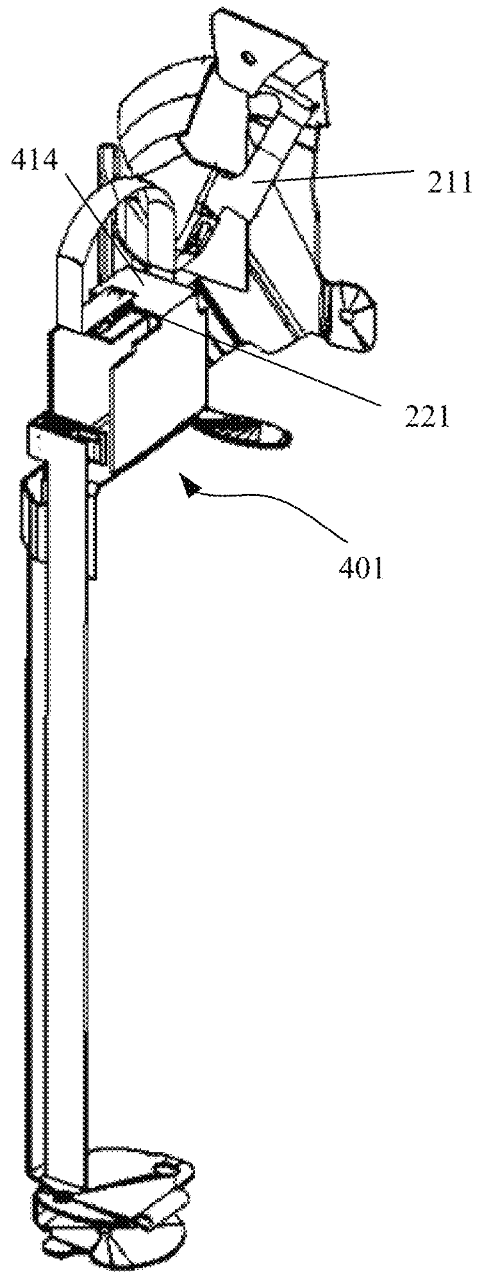
FIG. 26 is a schematic diagram of a structure of a circuit board component according to an embodiment of this application.

As shown in FIG. 26, the first feeding unit 221 may be disposed, for example, on the top feeding surface 414 of the feeding part 401.

Figure 27:
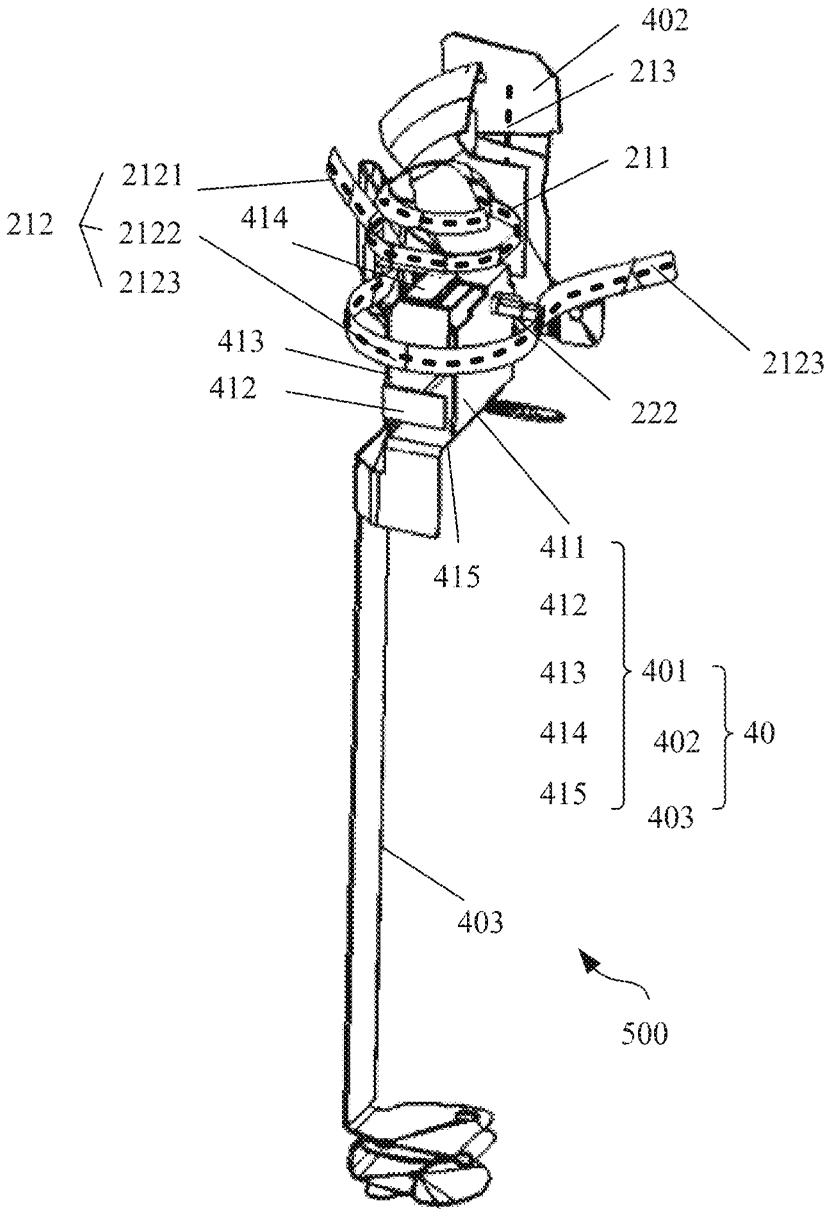
FIG. 27 is a schematic diagram of a structure of a circuit board component according to an embodiment of this application.

FIG. 27 is a schematic diagram of a structure of a circuit board component 500 according to an embodiment of this application.

A difference between the circuit board component 500 shown in FIG. 27 and the circuit board component 500 shown in FIG. 12 may include: A location of the second feeding unit 222 shown in FIG. 27 is different from a location of the second feeding unit 222 shown in FIG. 12, and a structure of the second antenna radiator 212 shown in FIG. 27 is different from a structure of the second antenna radiator 212 shown in FIG. 12.

According to a first aspect, as shown in FIG. 27, the second extension part 403 of the circuit board 40 may be connected to the first-side feeding surface 411 of the feeding part 401, and the second feeding unit 222 may be disposed on the third-side feeding surface 413 of the feeding part 401. In another example, the second feeding unit 222 may be disposed, for example, on another side surface (for example, the first-side feeding surface 411 or the second-side feeding surface 412) of the feeding part 401, a top surface of the feeding part 401, or a bottom surface of the feeding part 401.

According to a second aspect, as shown in FIG. 27, the second antenna radiator 212 may include a first segment 2121, a second segment 2123, and a middle segment 2122, and the middle segment 2122 may be connected between the first segment 2121 and the second segment 2123. The second antenna radiator 212 may be disposed horizontally relative to a length direction of the earbud stem part 2, for example, disposed perpendicular to the length direction of the earbud stem part 2. With reference to (a) in FIG. 1, it can be learned that the middle segment 2122 may be located in the connecting end 21 of the earbud stem part 2. The first segment 2121 and the second segment 2123 may be respectively located on two sides of the feeding part 401. The first segment 2121 may extend from the connecting end 21 of the earbud stem part 2 to the earbud part 1. The second segment 2123 may extend from the connecting end 21 of the earbud stem part 2 to the earbud part 1. The middle segment 2122 may be electrically connected to the second feeding unit 222.

With reference to (a) in FIG. 1 and FIG. 27, the first segment 2121 of the second antenna radiator 212 may extend from the connecting segment 21 of the earbud stem part 2 to the earbud part 1, the second segment 2123 of the second antenna radiator 212 may extend from the connecting segment 21 of the earbud stem part 2 to the earbud part 1, the middle segment 2122 of the second antenna radiator 212 may be located in the connecting segment 21 of the earbud stem part 2, and a minimum distance between the first segment 2121 of the second antenna radiator 212 and the third antenna radiator 213 may be greater than a preset headroom value.

Compared with the dual-antenna structure 200 shown in FIG. 12, the dual-antenna structure 200 shown in FIG. 27 may change a structure of the second antenna radiator 212 and a location of the second feeding unit 222. It can be learned from a simulation result that this helps change a head phantom directivity mode and antenna performance of the second antenna 202, further helps change a complementary result of the first antenna 201 and the second antenna 202 in terms of antenna performance, and further helps improve overall antenna performance, data transmission efficiency, an audio play effect, and the like of the wireless earphone 100.

Figure 28:
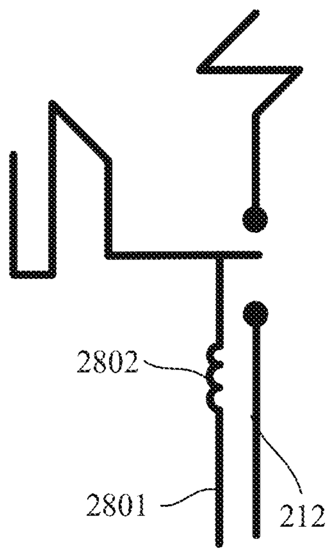
FIG. 28 is a diagram of an operating principle of a dual-antenna structure according to an embodiment of this application.

It should be noted that, to improve operating efficiency of the second antenna radiator 212, inductors 2802 may be connected in series to a grounded radiator 2801 around the second antenna radiator 212 (for example, a distance to the second antenna radiator 212 is less than a preset distance) (it should be noted that inductors may be connected in series on all cables (including ground cables) close to the second antenna radiator 212), as shown in FIG. 28.

Figure 29:
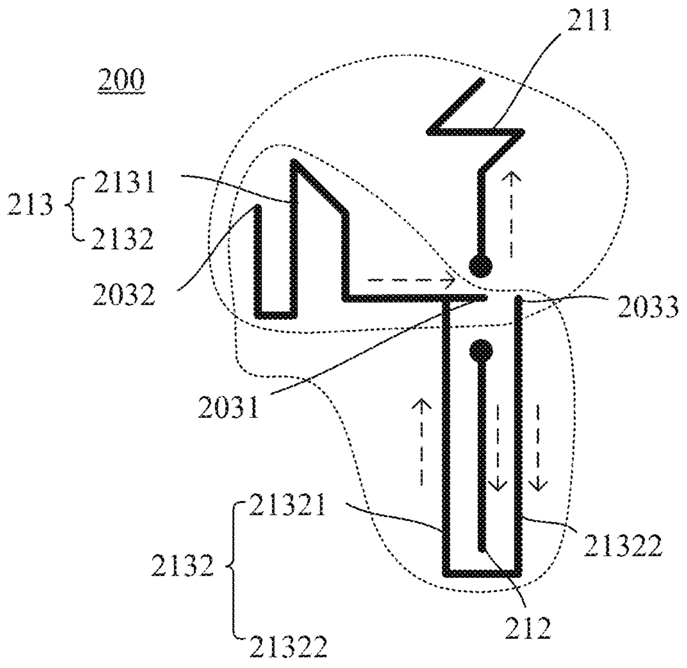
FIG. 29 is a diagram of an operating principle of a dual-antenna structure according to an embodiment of this application.

FIG. 29 is a diagram of an operating principle of another dual-antenna structure 200 according to an embodiment of this application. A difference between the dual-antenna structure 200 shown in FIG. 29 and the dual-antenna structure 200 shown in FIG. 3 may include: A structure of the third antenna radiator 213 is different.

As shown in FIG. 29, the third antenna radiator 213 may include a third end 2031, a fourth end 2032, and a fifth end 2033. The third end 2031 is not only close to the feeding end of the first antenna radiator 211, but also close to the feeding end of the second antenna radiator 212. The fourth end 2032 may be located in the earbud part 1 of the wireless earphone 100. The fifth end 2033 may be located in the earbud stem part 2 of the wireless earphone 100. The third end 2031 is electrically connected or connected between the fourth end 2032 and the fifth end 2033. For example, the third antenna radiator 213 extends from the fourth end 2032 to the third end 2031 and extends from the third end 2031 to the fifth end 2033. In other words, the fifth end 2033 is located on a side that is of the third end 2031 and that is far away from the fourth end 2032.

A part of the third end 2031 to the fourth end 2032 may be used to form a resonance structure. Therefore, the part of the third end 2031 to the fourth end 2032 is briefly referred to as a resonance segment 2131 of the third antenna radiator 213 below. An electrical length of the resonance segment 2131 of the third antenna radiator 213 may be (approximately) $M_4\times(1/4\sim1)\times\lambda$, ($\lambda$ is a target resonance wavelength), where $M_4$ is a positive integer, (for example, may be $$\frac{0.7\lambda M_4}{4}\sim1.3\lambda M_4).$$

A part of the third end 2031 to the fifth end 2033 may be used to reduce mutual interference between the second antenna radiator 212 and the ground cable. Therefore, the part of the third end 2031 to the fifth end 2033 is briefly referred to as a mutual-interference reduction segment 2132 of the third antenna radiator 213 below. An electrical length of the mutual-interference reduction segment 2132 of the third antenna radiator 213 may be (approximately) $\lambda/2$ (for example, may be $$\frac{0.7}{2}\lambda\sim\frac{1.3}{2}\lambda)$$

or an integer multiple of $\lambda/2$ (for example, may be $$\frac{0.7}{2}\lambda M_5\sim\frac{1.3}{2}\lambda M_5,$$

where $M_5$ is a positive integer).

The mutual-interference reduction segment 2132 of the third antenna radiator 213 may be located near the second antenna radiator 212, that is, a distance between the mutual-interference reduction segment 2132 and the second antenna radiator 212 is less than the foregoing preset distance (for example, less than a headroom value 0.1 mm). Specifically, the mutual-interference reduction segment 2132 of the third antenna radiator 213 may include a first mutual-interference reduction segment 21321, a second mutual-interference reduction segment 21322, and a mutual-interference reduction connecting segment connected between the first mutual-interference reduction segment 21321 and the second mutual-interference reduction segment 21322. The first mutual-interference reduction segment 21321 may be electrically connected between the resonance segment 2131 and the second mutual-interference reduction segment 21322 of the third antenna radiator 213.

If only the first mutual-interference reduction segment 21321 and the second antenna radiator 212 exist, a direction of a current on the first mutual-interference reduction segment 21321 is opposite to a direction of a current on the second antenna radiator 212, and an effective radiation current is weakened. The third antenna radiator 213 further includes a compensation current that may be generated by the second mutual-interference reduction segment 21322.

Both the first mutual-interference reduction segment 21321 and the second mutual-interference reduction segment 21322 may be disposed (approximately) in parallel with the second antenna radiator 212. Both the first mutual-interference reduction segment 21321 and the second mutual-interference reduction segment 21322 may extend in a length direction of the earbud stem part 2. The mutual-interference reduction connecting segment may be (approximately) vertically disposed relative to the first mutual-interference reduction segment 21321 and the second mutual-interference reduction segment 21322. An electrical length of the first mutual-interference reduction segment 21321 may be (approximately) $\lambda/4$ or an integer multiple of $\lambda/4$, where $\lambda$ is a target resonance wavelength (for example, may be $$\frac{0.7}{2}\lambda M_6\sim\frac{1.3}{2}\lambda M_6,$$

where $M_6$ is a positive integer). An electrical length of the second mutual-interference reduction segment 21322 may be (approximately) $\lambda/4$ or an integer multiple of $\lambda/4$ (for example, may be $$\frac{0.7}{2}\lambda M_7\sim\frac{1.3}{2}\lambda M_7,$$

where $M_7$ is a positive integer). According to an actual situation, the electrical length of the first mutual-interference reduction segment 21321 may be, for example, slightly greater than the electrical length of the second mutual-interference reduction segment 21322.

Figure 30:
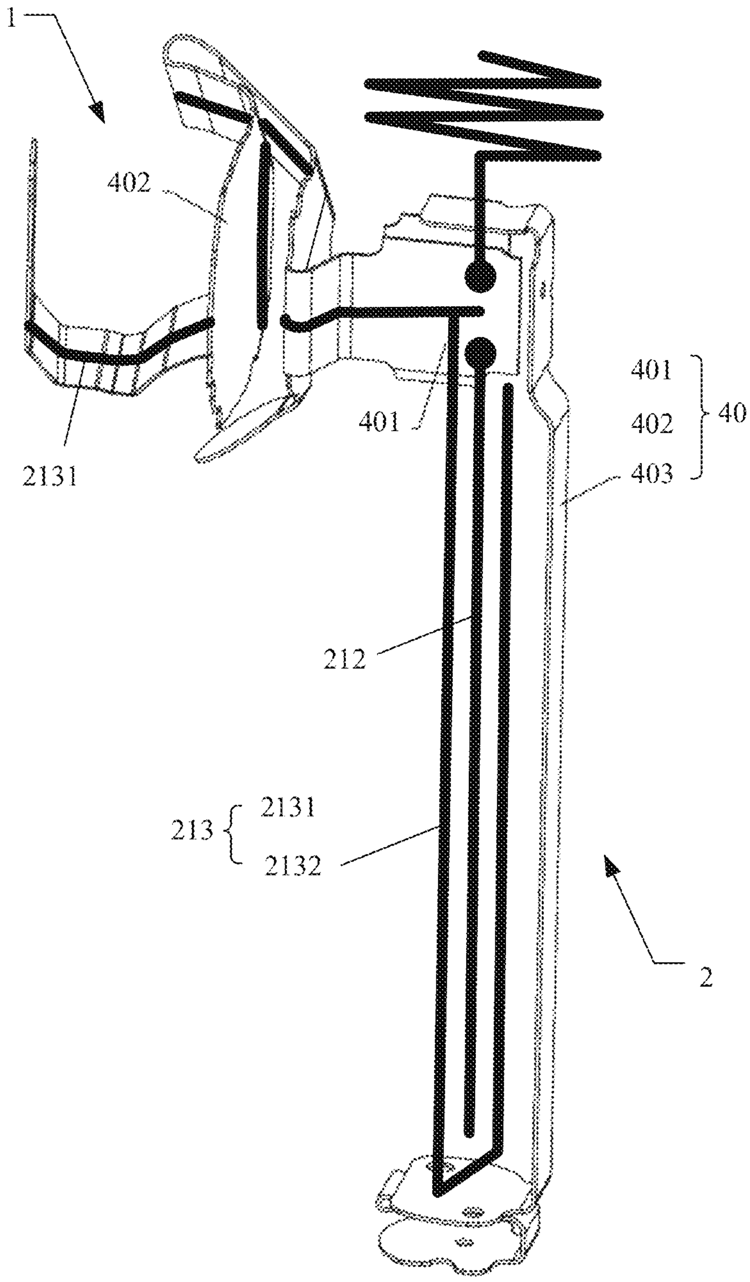
FIG. 30 is a schematic diagram of a structure of a circuit board component according to an embodiment of this application.

In an example, the first mutual-interference reduction segment 21321 and the second mutual-interference reduction segment 21322 may be respectively located on two sides of the second antenna radiator 212 (as shown in FIG. 29 and FIG. 30 below).

Figure 31:
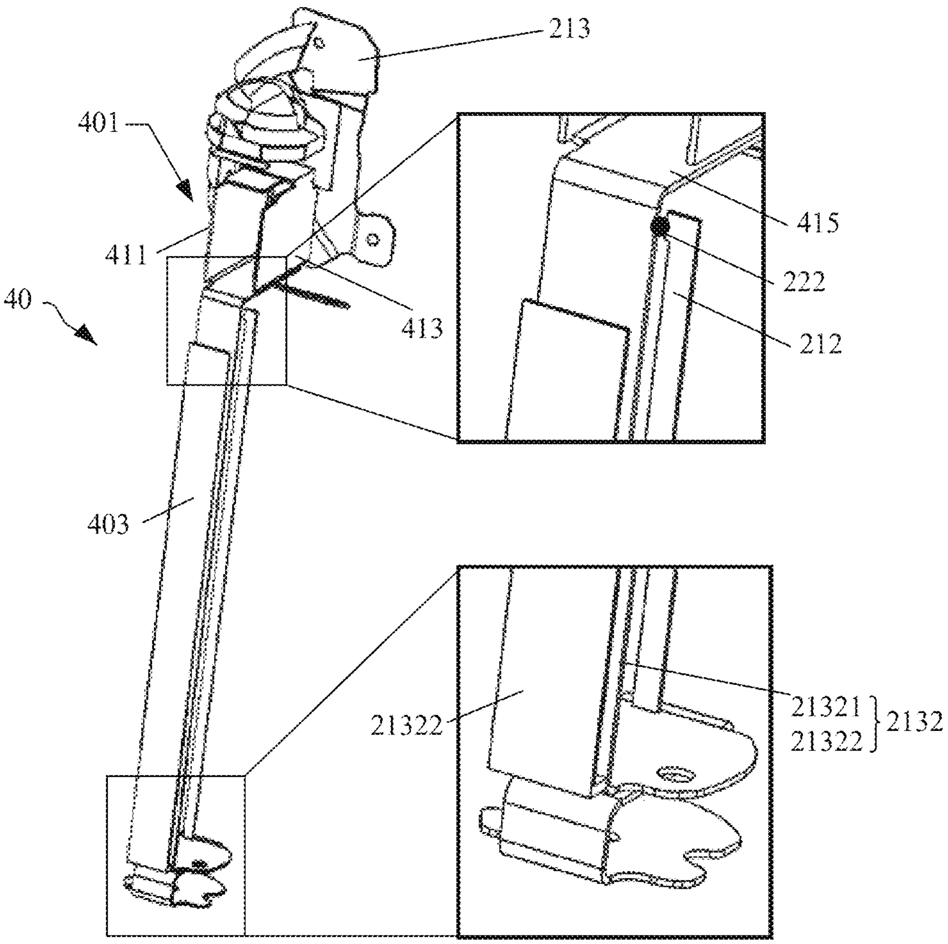
FIG. 31 is a schematic diagram of a structure of a circuit board component according to an embodiment of this application.
Figure 32:
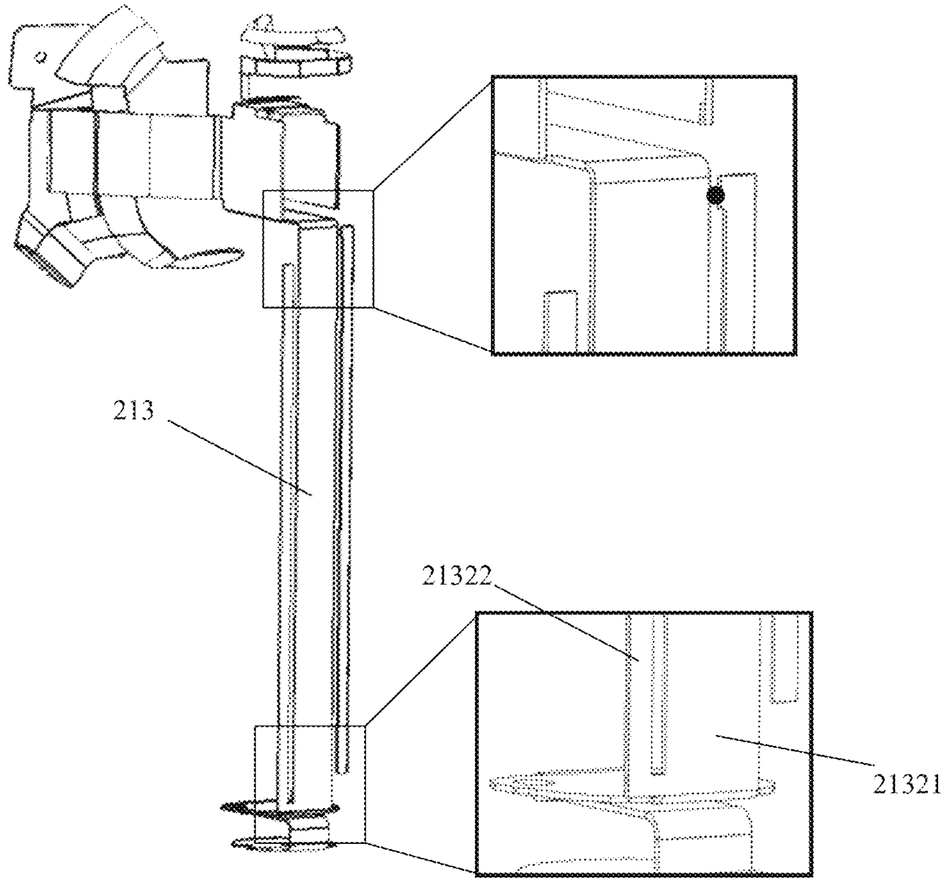
FIG. 32 is a schematic diagram of a structure of a circuit board component according to an embodiment of this application.

In an example, both the first mutual-interference reduction segment 21321 and the second mutual-interference reduction segment 21322 may be located on a same side of the second antenna radiator 212 (as shown in FIG. 31 and FIG. 32 below).

As described above (in FIG. 3), the resonance segment 2131 of the third antenna radiator 213 may form a ground current, and the ground current includes a first ground current and a second ground current. The mutual-interference reduction segment 2132 of the third antenna radiator 213 may form a third ground current. Because the first mutual-interference reduction segment 21321 is close to the second antenna radiator 212 and the second antenna radiator 212 has a second current, the third ground current in a direction opposite to a direction of the second current may be formed on the first mutual-interference reduction segment 21321, and a direction of the third ground current on the second mutual-interference reduction segment 21322 may be further the same as the direction of the second current.

Therefore, the mutual-interference reduction segment 2132 of the third antenna radiator 213 helps reduce mutual interference between the second antenna radiator 212 and the third antenna radiator 213. Both a distance between the first mutual-interference reduction segment 21321 and the second antenna radiator 212 and a distance between the second mutual-interference reduction segment 21322 and the second antenna radiator 212 are less than a preset distance. The preset distance may be, for example, 3 mm, 2 mm, 1.5 mm, 1 mm, 0.5 mm, 0.2 mm, or 0.1 mm.

FIG. 30 shows a possible implementation in which the dual-antenna structure 200 shown in FIG. 29 is disposed on the circuit board 40 shown in FIG. 4. A difference from the implementation shown in FIG. 5 may include: The third antenna radiator 213 further includes the mutual-interference reduction segment 2132.

With reference to (a) in FIG. 1 and FIG. 30, the resonance segment 2131 of the third antenna radiator 213 may be located, for example, in the earbud part 1.

With reference to (a) in FIG. 1 and FIG. 30, the mutual-interference reduction segment 2132 of the third antenna radiator 213 may be located, for example, in the earbud stem part 2. The mutual-interference reduction segment 2132 may be disposed (approximately) in parallel with the second extension part 403 of the circuit board 40. Specifically, the mutual-interference reduction segment 2132 of the third antenna radiator 213 may sequentially extend from the connecting segment 21 of the earbud stem part 2 to the bottom segment 23 of the earbud stem part 2 and the connecting segment 21 of the earbud stem part 2. In other words, the earbud part 1 may be used to accommodate the resonance segment 2131 of the third antenna radiator 213, and the earbud stem part 2 may be used to accommodate the mutual-interference reduction segment 2132 of the third antenna radiator 213.

FIG. 31 shows a possible implementation in which the dual-antenna structure 200 shown in FIG. 29 is disposed on the circuit board 40 shown in FIG. 12. The second extension part 403 of the circuit board 40 may be connected to the bottom feeding surface 415 of the feeding part 401 of the circuit board 40. The mutual-interference reduction segment 2132 of the third antenna radiator 213 may be located in the second extension part 403 of the circuit board 40. The second feeding unit 222 (the second feeding unit shown in FIG. 31 is merely an example, and for detailed descriptions of the second feeding unit 222, refer to another embodiment provided in this application) may be located, for example, in the second extension part 403. The second antenna radiator 212 may be located on a side that is of the third-side feeding surface 413 of the feeding part 401 and that is far away from the first-side feeding surface 411.

The first mutual-interference reduction segment 21321, the second mutual-interference reduction segment 21322, and the mutual-interference reduction segment connecting segment of the third antenna radiator 213 may be disposed on the second extension part 403. Compared with the second mutual-interference reduction segment 21322, the first mutual-interference reduction segment 21321 is closer to the feeding part 401 of the circuit board 40. In other words, the first mutual-interference reduction segment 21321 may be connected between the feeding part 401 and the second mutual-interference reduction segment 21322. Both the first mutual-interference reduction segment 21321 and the second mutual-interference reduction segment 21322 may be (approximately) vertically disposed relative to the bottom feeding surface 415 of the feeding part 401. In addition, the first mutual-interference reduction segment 21321 and the second mutual-interference reduction segment 21322 may be located on different planes. For a specific implementation of the embodiment shown in FIG. 31, refer to the embodiment shown in FIG. 30. Details are not described herein again.

FIG. 32 shows another possible implementation in which the dual-antenna structure 200 shown in FIG. 29 is disposed on the circuit board 40 shown in FIG. 12. A difference from the implementation shown in FIG. 31 may include: The first mutual-interference reduction segment 21321 and the second mutual-interference reduction segment 21322 may be located on a same plane.

Optionally, the mutual-interference reduction segment 2132 of the third antenna radiator 213 may be further electrically connected to another component (for example, the microphone assembly 90 in FIG. 2), so as to facilitate grounding of the another component.

It should be understood that, in the examples shown in FIG. 30 to FIG. 32, the first antenna radiator 211 may be disposed in the top segment of the wireless earphone 100. In another example, for example, when the wireless earphone 100 does not have the top segment 22, the first antenna radiator 211 may extend from the connecting segment 21 to the earbud part 1. For another example, when the wireless earphone 100 has the top segment 22, the first antenna radiator 211 may not pass through the top segment 22.

Figure 33:
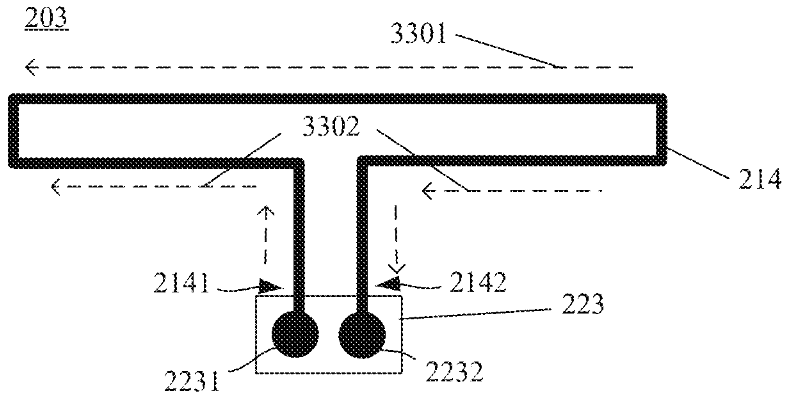
FIG. 33 is a diagram of an operating principle of a loop antenna according to an embodiment of this application.

FIG. 33 is a schematic diagram of an operating principle of a loop antenna 203 according to an embodiment of this application. The loop antenna 203 may include a fourth antenna radiator 214 and a third feeding unit 223.

A first end 2141 of the fourth antenna radiator 214 may be electrically connected to a first end 2231 (for example, a high-voltage end) of the third feeding unit 223, and a second end 2142 of the fourth antenna radiator 214 may be electrically connected to a second end 2232 (for example, a low-voltage end or a ground point) of the third feeding unit 223. An electrical length of the fourth antenna radiator 214 may be % or an integer multiple of $\lambda$, where $\lambda$ is a target resonance wavelength (for example, $0.7\lambda$ to $1.3\lambda$, or an integer multiple of $0.7\lambda$ to $1.3\lambda$). Therefore, a third current 3301 (as shown by a dashed line in FIG. 33) may be formed on a side that is of the fourth antenna radiator 214 and that is far away from the third feeding unit 223. A fourth current 3302 (as shown by a dashed line in FIG. 33) may be formed on a side that is of the fourth antenna radiator 214 and that is close to the third feeding unit 223. A direction of the third current 3301 may be the same as or approximately the same as a direction of the fourth current 3302. The third current 3301 and the fourth current 3302 may form a third equivalent current.

Figure 34A:
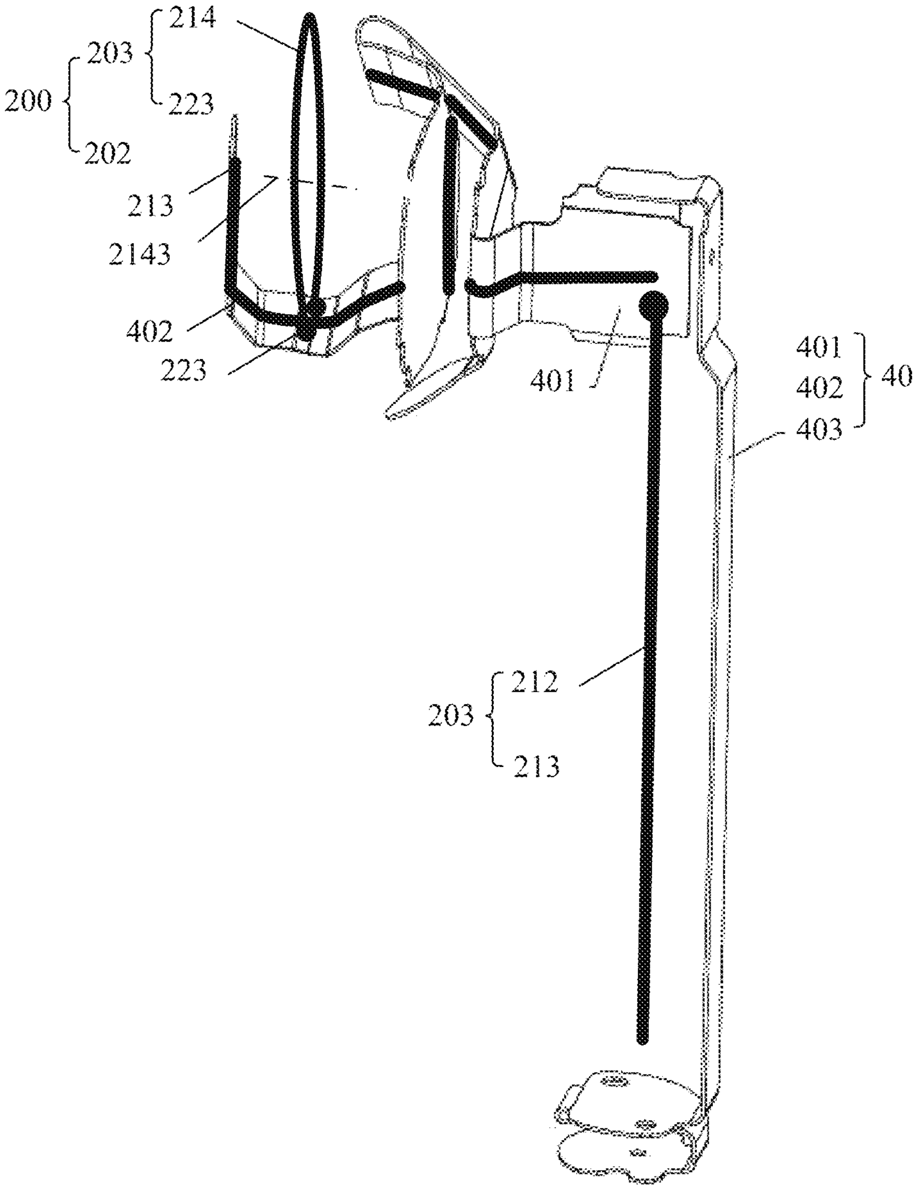
FIG. 34(*a*) and FIG. 34(*b*) are a schematic diagram of a structure of a circuit board component according to an embodiment of this application.
Figure 34B:
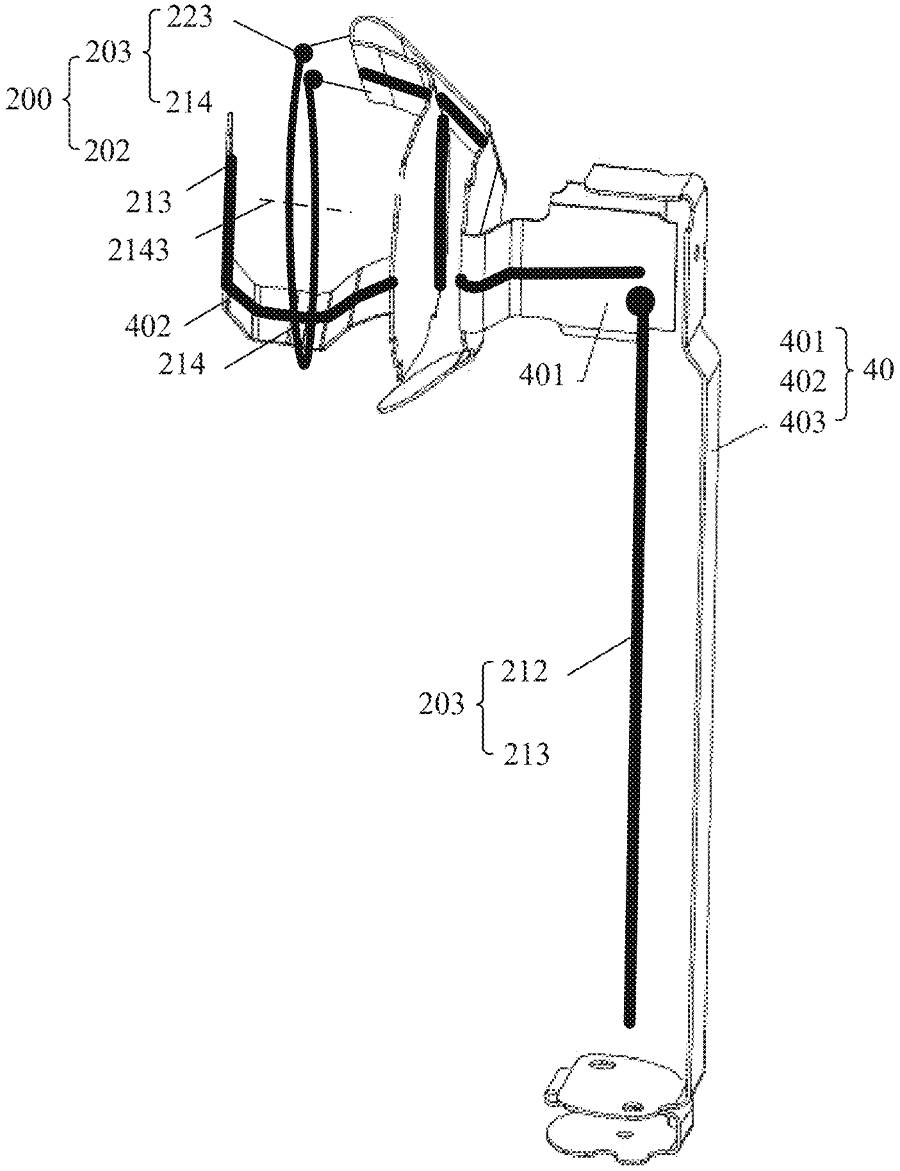

FIG. 34(*a*) and FIG. 34(*b*) each show a possible implementation in which the loop antenna 203 shown in FIG. 33 is disposed on the circuit board 40 shown in FIG. 4. Compared with the implementation shown in FIG. 4, the circuit board 40 shown in FIG. 34(*a*) and FIG. 34(*b*) does not include the first antenna radiator 211 and the first feeding unit 221 shown in FIG. 4, but includes the loop antenna 203 shown in FIG. 33.

With reference to (a) or (b) in FIG. 1 and FIG. 34(*a*) and FIG. 34(*b*), the fourth antenna radiator 214 may be located in the earbud part 1 of the wireless earphone 100. For example, the fourth antenna radiator 214 may be processed on a surface (an outer surface or an inner surface, which is not limited to being "attached" to the inner surface) of the housing of the wireless earphone 100 by using LDS, an FPC, or an iron component. The third feeding unit 223 may be disposed, for example, in the first extension part 402 of the circuit board 40.

In addition, FIG. 34(*a*) and FIG. 34(*b*) respectively show two possible locations of the third feeding unit 223. As shown in FIG. 34(*a*), the third feeding unit 223 may be located on the top of the earbud part 1. As shown in FIG. 34(*b*), the third feeding unit 223 may be located at the bottom of the earbud part 1. It should be understood that, in another embodiment of this application, the fourth antenna radiator 214 is circumferentially disposed relative to the earbud part 1, and a location of disposing the third feeding unit 223 in the wireless earphone 100 may be a location at which 223 shown in FIG. 34(*a*) and FIG. 34(*b*) is circumferentially offset by ±45°.

Figure 35:
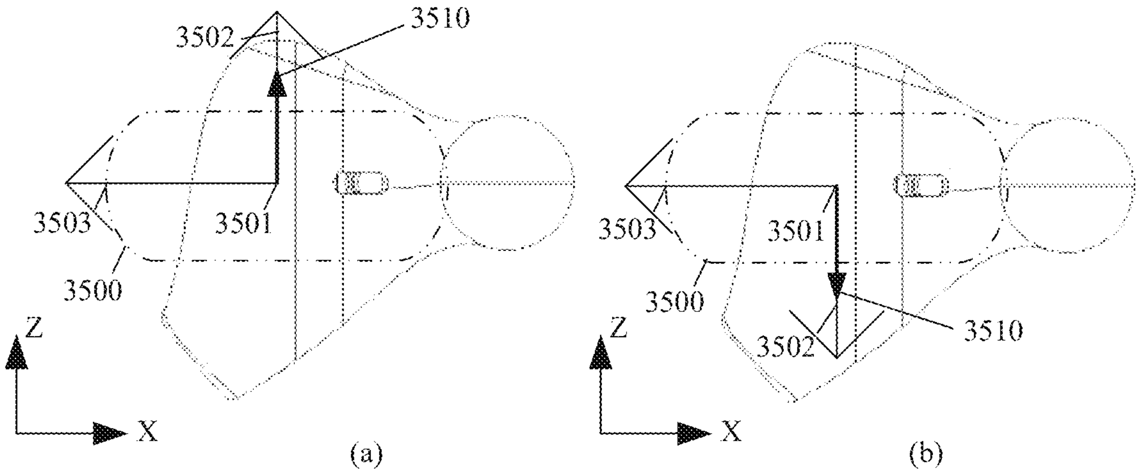
FIG. 35 is a schematic diagram of a current direction of a loop antenna according to an embodiment of this application.

A schematic diagram of the third equivalent current 3510 shown in (a) in FIG. 35 or (b) in FIG. 35 may be obtained based on a specific location of the fourth antenna radiator 214 in FIG. 34(*a*) and FIG. 34(*b*) in the wireless earphone 100 shown in (a) or (b) in FIG. 1. The schematic diagram shown in FIG. 35 is obtained by observing a direction extending from the top of the wireless earphone 100 to the earbud stem. With reference to the X-Y coordinate system shown in (a) or (b) in FIG. 1, the schematic diagram shown in FIG. 35 may be obtained through X-Z plane observation.

It can be learned that, by properly setting a structure and a location of the fourth antenna radiator 214, the third equivalent current 3510 that is (approximately) vertically disposed relative to the X-Y plane shown in (a) or (b) in FIG. 1 may be formed. It can be learned from the foregoing descriptions that a direction of a second equivalent current may be parallel to the X-Y plane shown in (a) or (b) in FIG. 1 (or an included angle between the second equivalent current and the X-Y plane may be less than a seventh preset threshold, where the seventh preset threshold may be, for example, 45°, 30°, 15°. 10°, or 5°). Therefore, the third equivalent current 3510 may be (approximately) perpendicularly disposed relative to the second equivalent current (or an included angle between the second equivalent current and the third equivalent current 3510 may be greater than a third preset threshold, where the third preset threshold may be, for example, 15°, 20°, 30°, 45°, 60°, or 90°).

In an example, an included angle between a target plane of the fourth antenna radiator 214 and an extension direction of an end that is of the second antenna radiator 212 and that is close to the second feeding unit 222 may be less than the foregoing seventh preset threshold, and the target plane may be a plane that is perpendicularly disposed relative to an axis (as shown by 2143 in FIG. 34(*a*) and FIG. 34(*b*)) of the fourth antenna radiator 214. For example, the axis of the fourth antenna radiator 214 may be a central axis of the fourth antenna radiator 214. The axis may be a reference line that may be encircled by the fourth antenna radiator 214.

The third equivalent current 3510 may form, for example, a radiation field pattern 3500 shown in (a) or (b) in FIG. 35 (as shown by a double-dot dashed line in the figure). A connection line between a center 3501 of the radiation field pattern 3500 and a radiation null point 3502 may be approximately (approximately) perpendicular to (a central axis of) the earbud stem part 2. A distance from the connection line between the center 3501 of the radiation field pattern 3500 and the radiation null point 3502 to (the central axis of) the earbud stem part 2 may be approximately a distance from a center of the earbud part 1 to (the central axis of) the earbud stem part 2. A connection line between the center 3501 of the radiation field pattern 3500 and a radiation intensity point 3503 may be approximately (approximately) perpendicular to (the central axis of) the earbud stem part 2. A distance between (the central axis of) the earbud stem part 2 and a plane that passes through the connection line between the center 3501 of the radiation field pattern 3500 and the radiation intensity point 3503 and that is (approximately) parallel to (the central axis of) the earbud stem part 2 may be relatively small, (for example, may be approximately 0).

According to the foregoing descriptions, an antenna directivity diagram of the loop antenna 203 may be different from or greatly different from an antenna directivity diagram of the second antenna 202. Therefore, antenna performance of the loop antenna 203 and antenna performance of the second antenna 202 may complement each other. This helps improve overall antenna performance of the wireless earphone 100, and further helps improve data transmission efficiency, an audio play effect, and the like of the wireless earphone 100.

Figure 36:
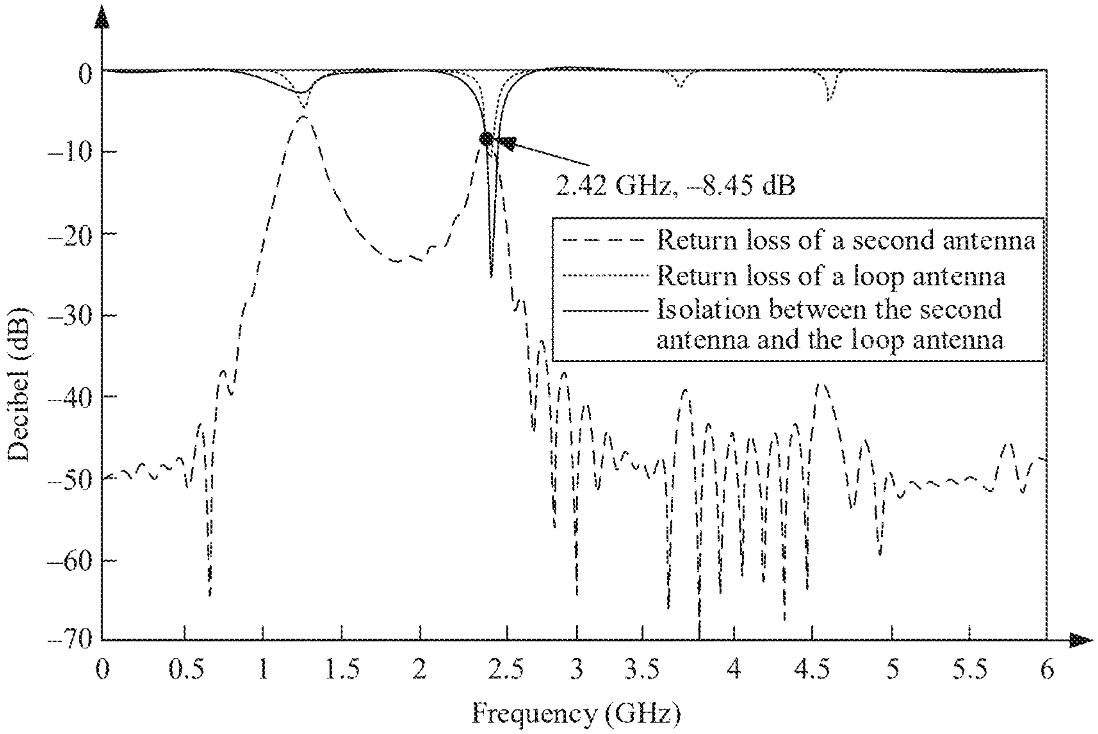
FIG. 36 is a schematic diagram of antenna performance of a dual-antenna structure according to an embodiment of this application.

FIG. 36 shows antenna performance that can be implemented by the dual-antenna structure 200 shown in FIG. 34(*a*) and FIG. 34(*b*).

A dashed line in FIG. 36 shows return losses of the second antenna 202 shown in FIG. 34(*a*) and FIG. 34(*b*) in different frequency bands. It can be learned that a return loss of the second antenna 202 in a Bluetooth frequency band is relatively low (for example, may be less than −8 dB).

A dotted line in FIG. 36 shows return losses of the loop antenna 203 shown in FIG. 34(*a*) and FIG. 34(*b*) in different frequency bands. It can be learned that a return loss of the loop antenna 203 in the Bluetooth frequency band is relatively low (for example, may be less than −8 dB).

A solid line in FIG. 36 shows isolation of the dual-antenna structure 200 shown in FIG. 34(*a*) and FIG. 34(*b*) in different frequency bands. It can be learned that the dual-antenna structure 200 has relatively good isolation in the Bluetooth frequency band (for example, may be less than −8 dB. Specifically, isolation between the second antenna 202 and the loop antenna 203 may be −8.45 dB in 2.42 GHz).

It can be learned from this that the wireless earphone 100 provided in this embodiment of this application may operate in the Bluetooth frequency band, and can have relatively good antenna performance.

Figure 37:
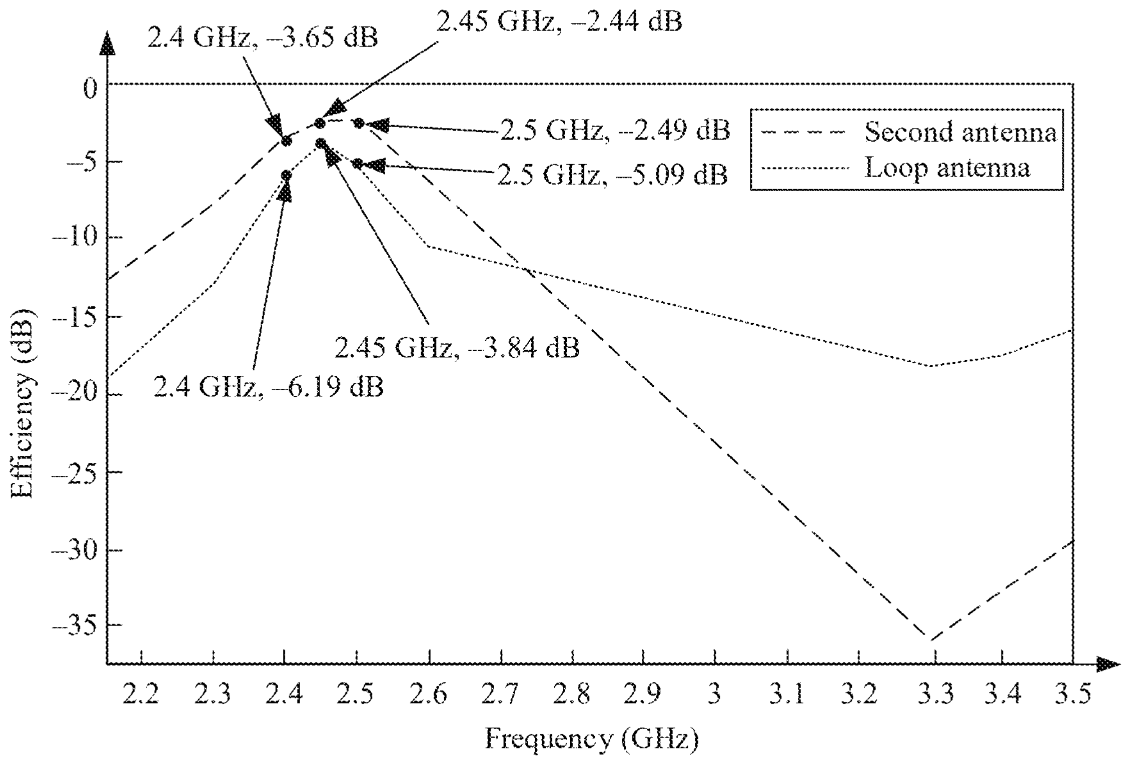
FIG. 37 is a schematic diagram of antenna performance of a dual-antenna structure according to an embodiment of this application.

FIG. 37 shows antenna efficiency (free space efficiency, that is, efficiency that exists when the wireless earphone 100 is not worn) of the dual-antenna structure 200 shown in FIG. 34(*a*) and FIG. 34(*b*).

A dashed line in FIG. 37 shows antenna efficiency of the second antenna 202 in different frequency bands. It can be learned that operating efficiency of the second antenna 202 in a Bluetooth frequency band is relatively high (specifically, the operating efficiency of the second antenna 202 may be −3.65 dB in 2.4 GHz, the operating efficiency of the second antenna 202 may be −2.44 dB in 2.45 GHz, and the operating efficiency of the second antenna 202 may be −2.49 dB in 2.5 GHz). A dotted line in FIG. 37 shows operating efficiency of the loop antenna 203 in different frequency bands. It can be learned that operating efficiency of the loop antenna 203 in the Bluetooth frequency band is relatively high (specifically, the operating efficiency of the second antenna 202 may be −6.19 dB in 2.4 GHz, the operating efficiency of the second antenna 202 may be −3.84 dB in 2.45 GHz, and the operating efficiency of the second antenna 202 may be −5.09 dB in 2.5 GHz).

Figure 38:
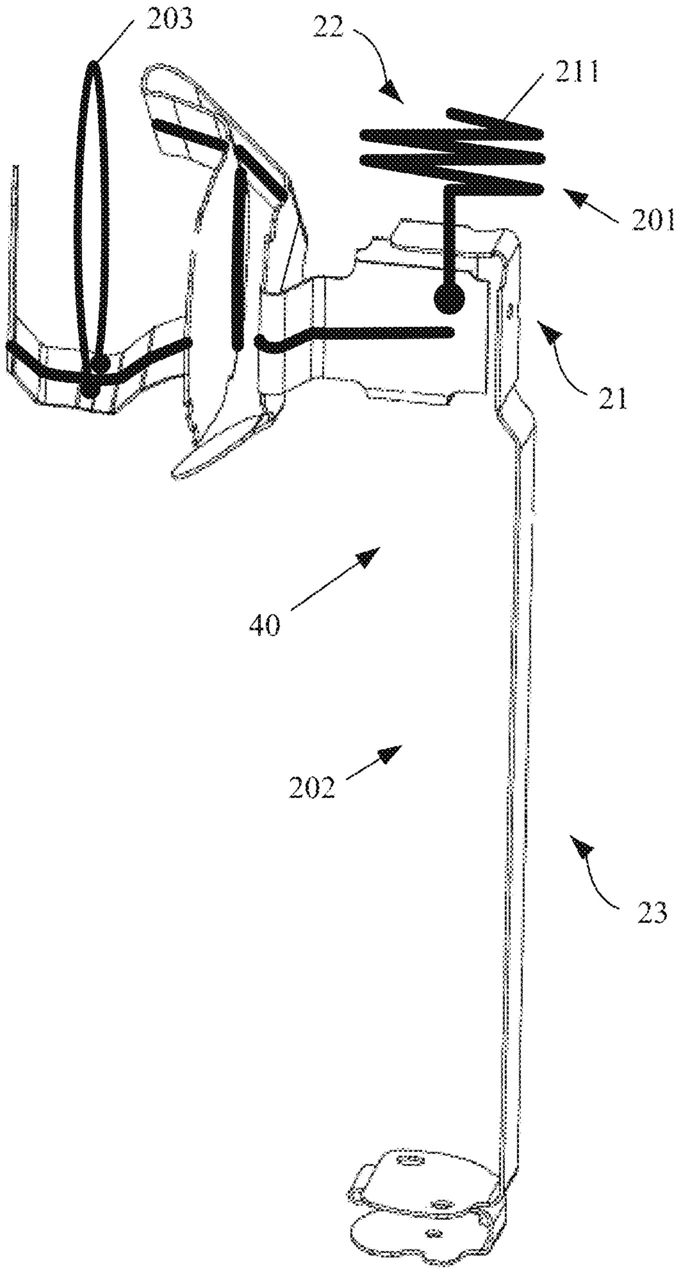
FIG. 38 is a schematic diagram of a structure of a circuit board component according to an embodiment of this application.

FIG. 38 shows another possible implementation in which the loop antenna 203 shown in FIG. 33 is disposed on the circuit board 40 shown in FIG. 4. Compared with the implementation shown in FIG. 34(*a*) and FIG. 34(*b*), the circuit board 40 shown in FIG. 38 does not include the second antenna radiator 212 shown in FIG. 34(*a*) and FIG. 34(*b*), but includes the first antenna radiator 211 shown in FIG. 4. Similar to the implementation shown in FIG. 34(*a*) and FIG. 34(*b*), an antenna directivity diagram of the loop antenna 203 shown in FIG. 38 may be different from or greatly different from an antenna directivity diagram of the first antenna 201. Therefore, antenna performance of the loop antenna 203 and antenna performance of the first antenna 201 may complement each other. This helps improve overall antenna performance of the wireless earphone 100, and further helps improve data transmission efficiency, an audio play effect, and the like of the wireless earphone 100.

It should be understood that, with reference to (b) in FIG. 1, when the wireless earphone 100 does not have the top segment 22, the first antenna radiator 211 may extend from the connecting segment 21 to the earbud part 1. In addition, when the wireless earphone 100 has the top segment 22, the first antenna radiator 211 may not pass through the top segment 22 either.

Figure 39:
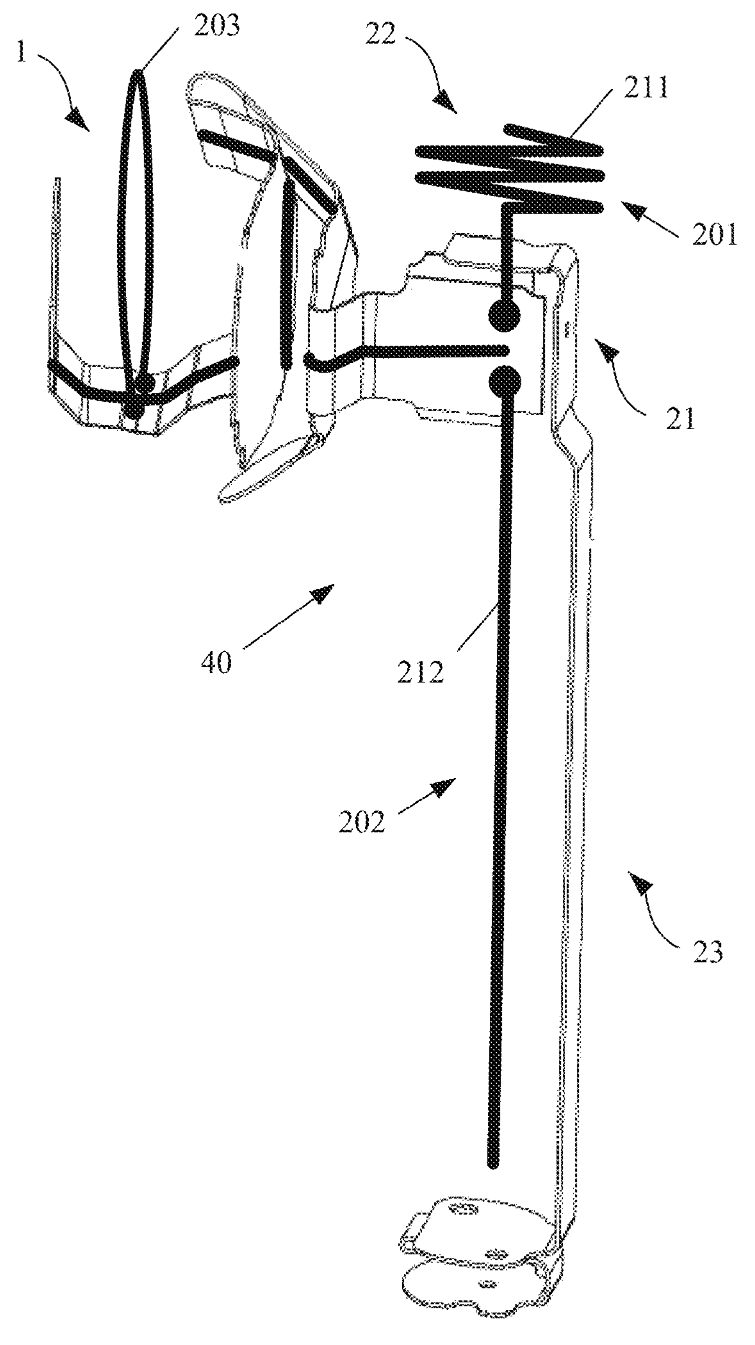
FIG. 39 is a schematic diagram of a structure of a circuit board component according to an embodiment of this application.
Figure 40A:
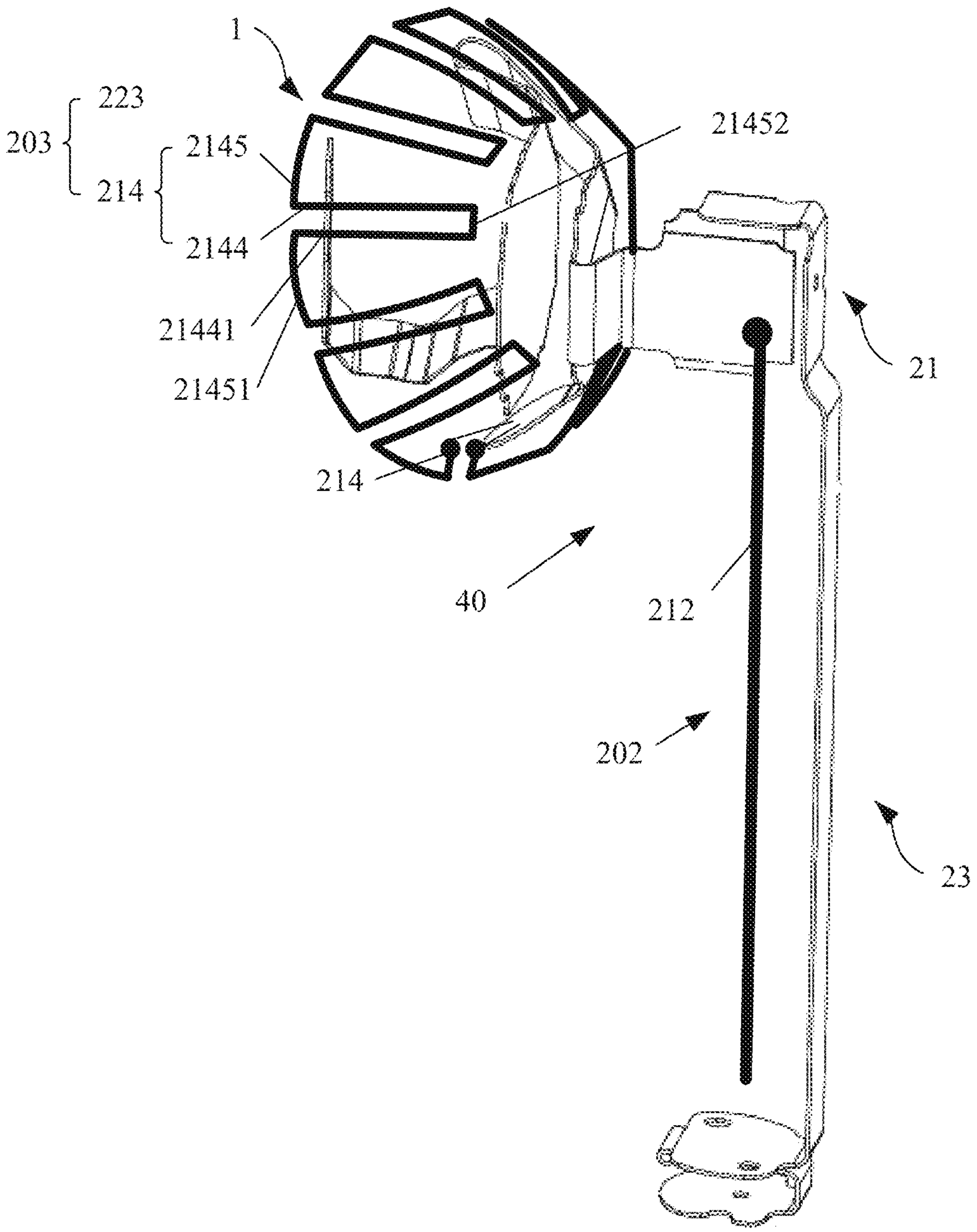
FIG. 40(*a*) to FIG. 40(*d*) are a schematic diagram of a structure of a circuit board component according to an embodiment of this application.
Figure 40B:
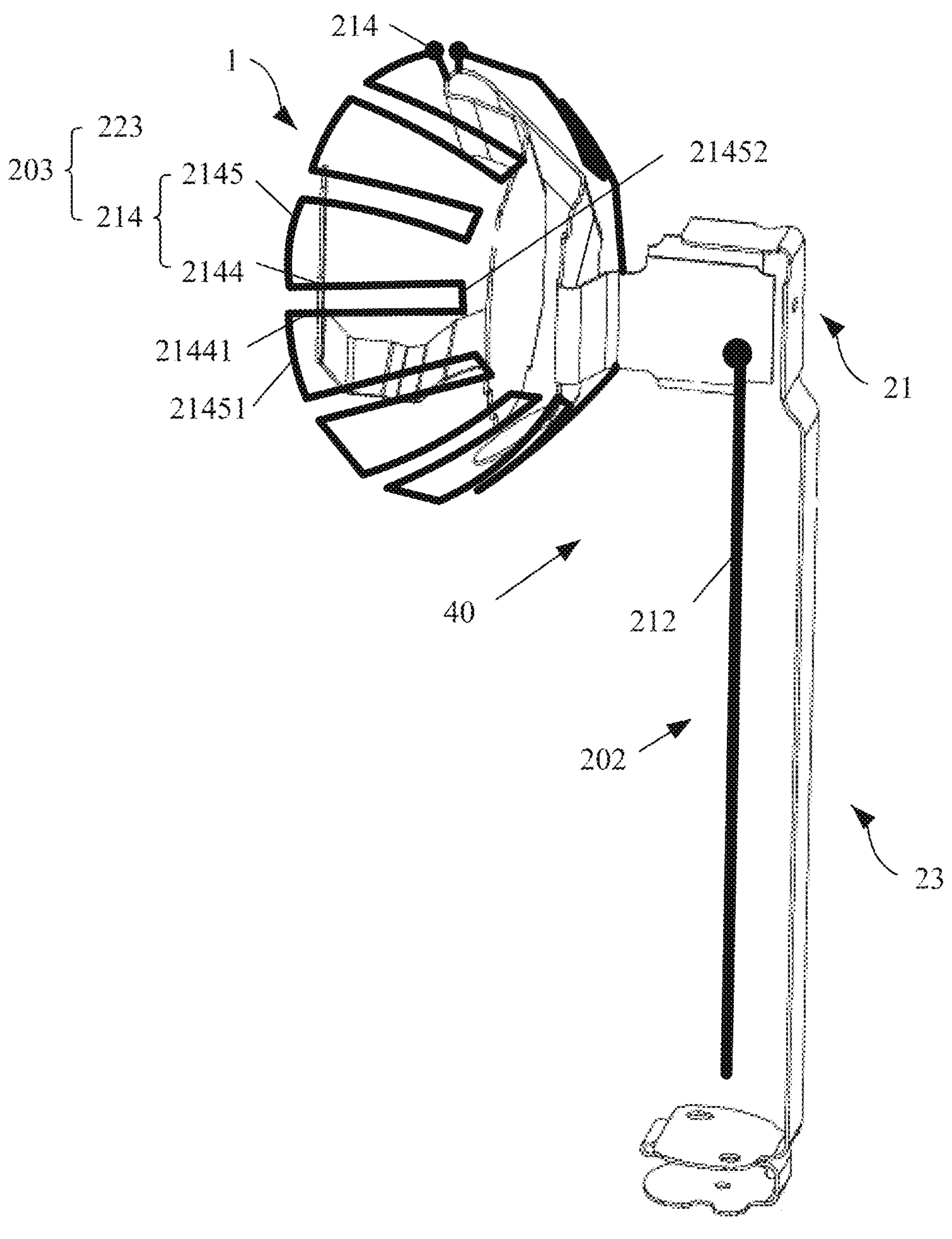
Figure 40C:
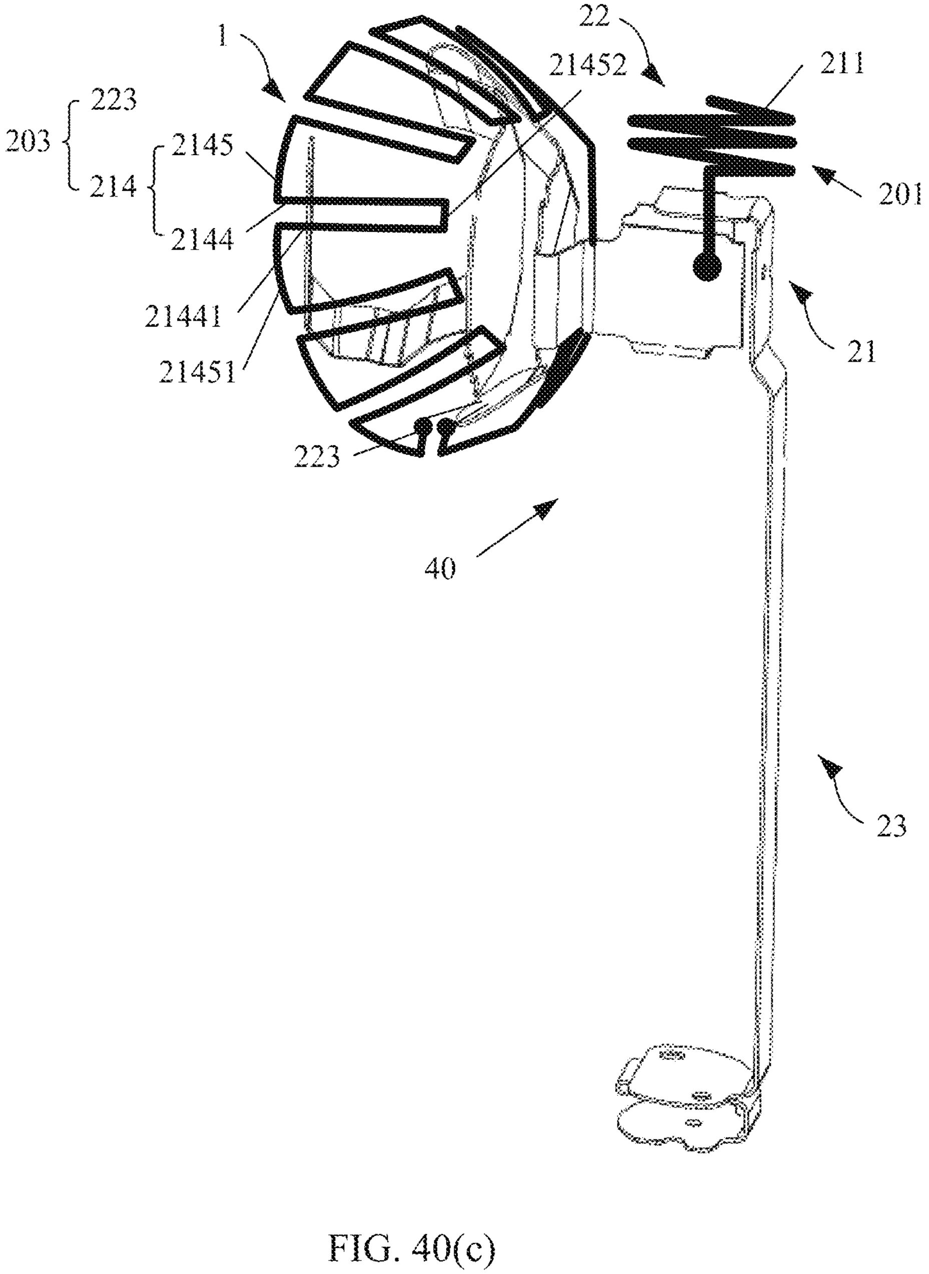
Figure 40D:
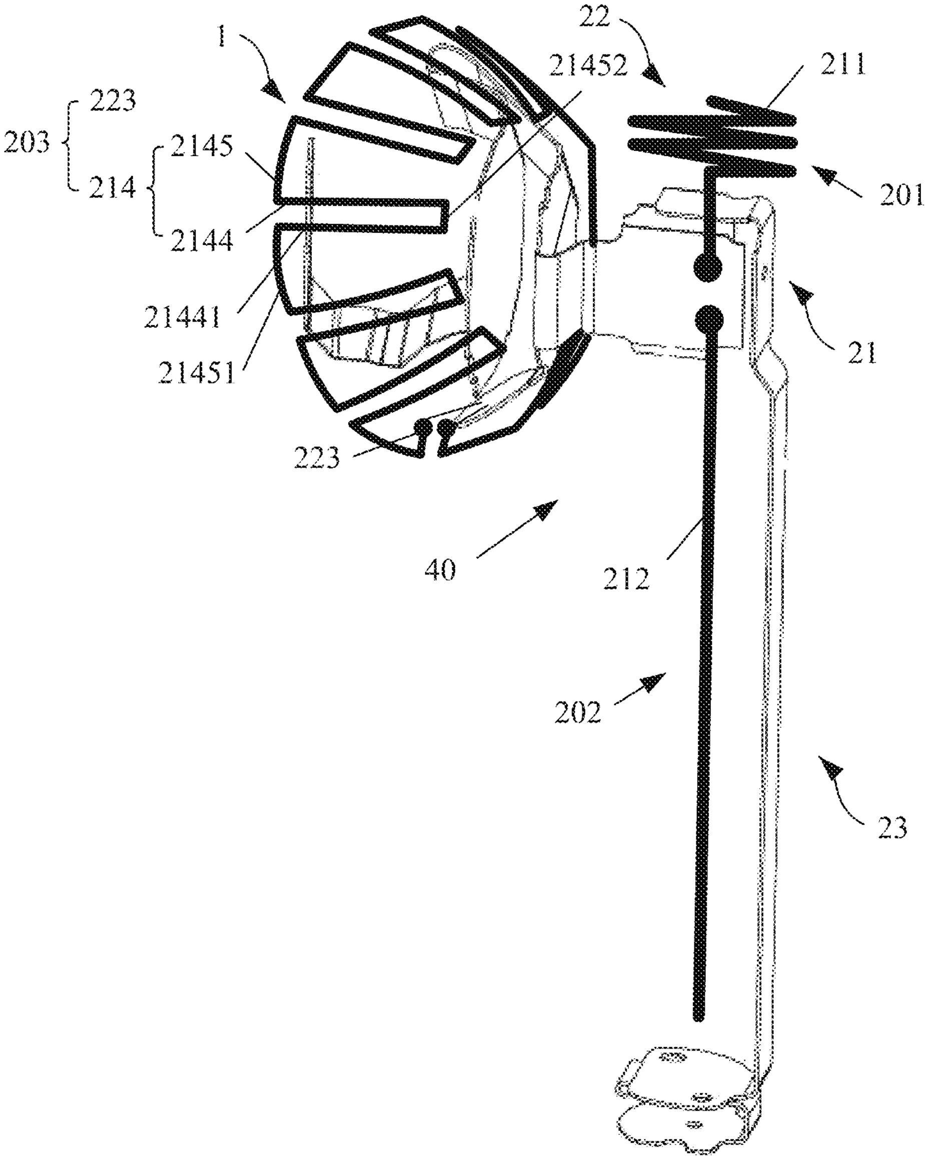

FIG. 39 shows still another possible implementation in which the loop antenna 203 is disposed on the circuit board 40 shown in FIG. 4. Compared with the implementations shown in FIG. 34(*a*) and FIG. 34(*b*) and FIG. 38, the circuit board 40 shown in FIG. 39 includes the first antenna radiator 211 shown in FIG. 4, and also includes the second antenna radiator 212 shown in FIG. 4. Antenna directivity diagrams of the loop antenna 203, the first antenna 201, and the second antenna 202 may be different from each other. Therefore, antenna performance of the loop antenna 203, the first antenna 201, and the second antenna 202 may complement each other. This helps further improve overall antenna performance of the wireless earphone 100, and further helps improve data transmission efficiency, an audio play effect, and the like of the wireless earphone 100.

FIG. 40(*a*) to FIG. 40(*d*) show a structure of a loop antenna 203 and some possible implementations in which the loop antenna 203 is disposed on the circuit board 40 shown in FIG. 4 according to an embodiment of this application. A difference from the embodiments shown in FIG. 34(*a*) and FIG. 34(*b*), FIG. 38, and FIG. 39 includes: A structure of the fourth antenna radiator 214 is different.

A profile of the fourth antenna radiator 214 may correspond to a profile of the earbud part 1. As shown in FIG. 40(*a*) to FIG. 40(*d*), the earbud part 1 may be approximately of a cone-shaped/truncated-cone-shaped structure (or referred to as an umbrella structure). The fourth antenna radiator 214 may be circumferentially disposed relative to the earbud part 1, that is, the fourth antenna radiator 214 is disposed along a cone-shaped surface of the earbud part 1 or disposed relative to the cone-shaped surface. For example, the fourth antenna radiator 214 is approximately disposed along the cone-shaped surface or circumferentially disposed relative to the cone-shaped surface, and the fourth antenna radiator 214 may be approximately circumferentially disposed in a straight line, or circumferentially disposed in a broken line shown in FIG. 40(*a*) to FIG. 40(*d*). It should be understood that the fourth antenna radiator 214 may alternatively be of a curved shape or an irregular bent shape, and is circumferentially disposed in the earbud part 1. In addition, a distance between bent regions on a radiator is not limited in this application, so as to design an overall electrical length of the fourth antenna radiator 214. This meets an electrical length requirement of a target resonance frequency.

For ease of description, the umbrella-shaped earbud part 1 may have a virtual "umbrella bone", and the fourth antenna radiator 214 may include a plurality of umbrella bone edges 2144, where an extension direction of the umbrella bone edge 2144 corresponds to an extension direction of the virtual "umbrella bone".

The fourth antenna radiator 214 further includes a plurality of umbrella bone connecting edges 2145. The umbrella bone connecting edge 2145 is connected between two adjacent umbrella bone edges 2144, and is located on a same side of the two adjacent umbrella bone edges 2144. Only one umbrella bone connecting edge 2145 is connected between two adjacent umbrella bone edges 2144. A target umbrella bone edge 21441 may be connected between a first umbrella bone connecting edge 21451 and a second umbrella bone connecting edge 21452. A length of the first umbrella bone connecting edge 21451 may be different from a length of the second umbrella bone connecting edge 21452. The first umbrella bone connecting edge 21451 and the second umbrella bone connecting edge 21452 may be located at two ends of the target umbrella bone edge 21441.

It should be understood that this embodiment of this application is not limited to a specific structure of the fourth antenna radiator 214 provided in this application.

The loop antenna 203 shown in FIG. 40(*a*) to FIG. 40(*d*) may form the third equivalent current 3502 shown in FIG. 35. Details are not described herein again.

Similar to FIG. 34(*a*), FIG. 40(*a*) shows an example in which the second antenna 202 and the loop antenna 203 exist and the third feeding unit 214 is disposed at the bottom of the earbud part 1.

Similar to FIG. 34(*b*). FIG. 40(*b*) shows an example in which the second antenna 202 and the loop antenna 203 exist and the third feeding unit 214 is disposed on the top of the earbud part 1.

Similar to FIG. 38, FIG. 40(*c*) shows an embodiment having the first antenna 201 and the loop antenna 203.

Similar to FIG. 39, FIG. 40(*d*) shows an embodiment having the first antenna 201, the second antenna 202, and the loop antenna 203.

Figure 41:
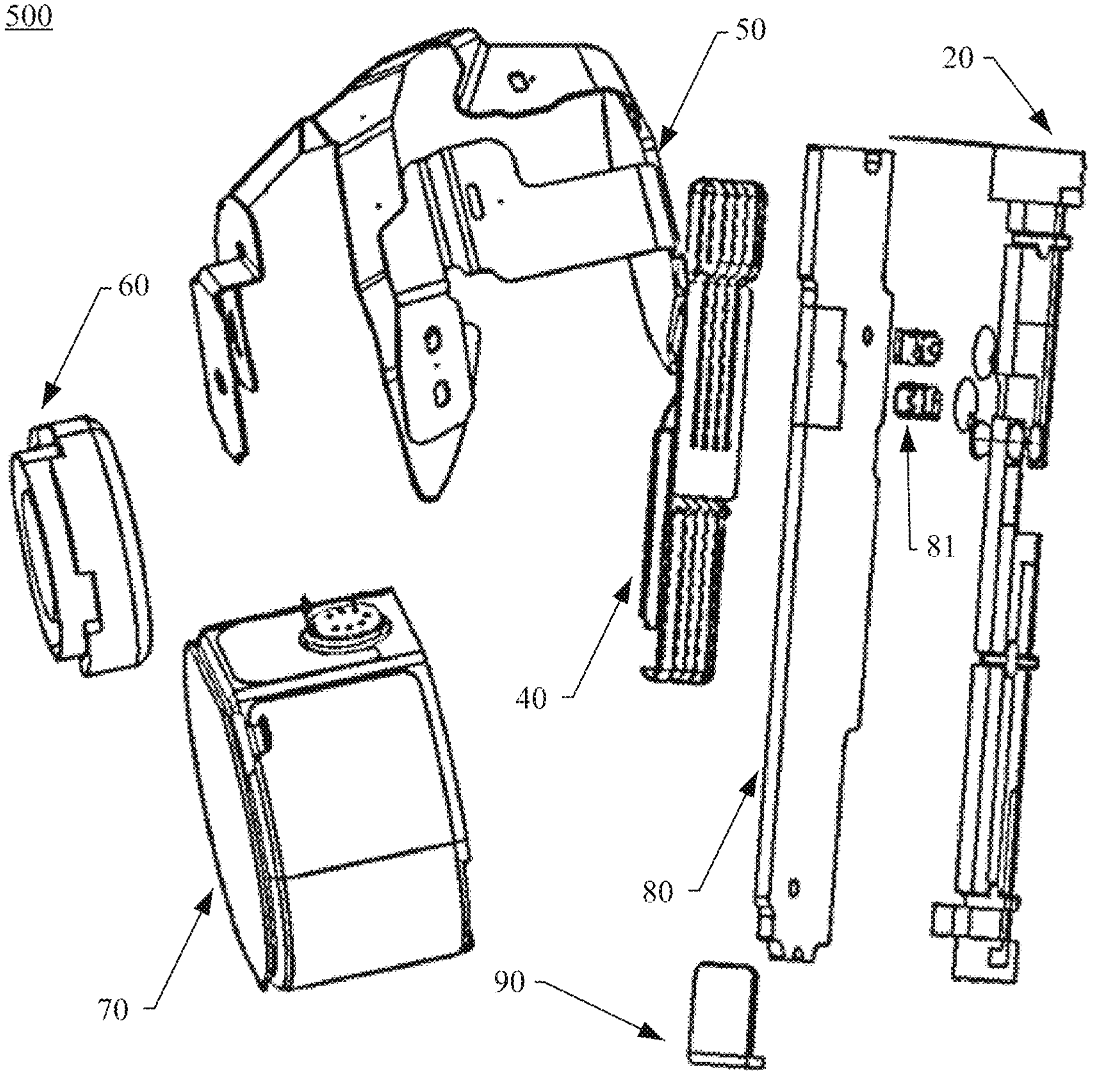
FIG. 41 is an exploded diagram of a wireless earphone according to an embodiment of this application.

FIG. 41 is a schematic diagram of disassembling internal parts of a wireless earphone 100 according to another embodiment of this application. The wireless earphone 100 in FIG. 41 may be described with reference to FIG. 2 and the appearance and structure of the wireless earphone shown in (c) in FIG. 1.

Components in the wireless earphone 100 may include an antenna 20, a flexible circuit board 40, a substrate 80, an elastomer 81, a chip 50, a speaker assembly 60, a battery 70, and a microphone assembly 90.

A difference from the wireless earphone 100 shown in FIG. 2 may include: A location of the battery 70 shown in FIG. 41 in the wireless earphone 100 is different, and a location of the antenna 20 in the wireless earphone 100 is different.

The battery 70 may be a power supply of the wireless earphone 100, and is configured to provide electrical energy for a plurality of components in the wireless earphone 100. The battery 70 may be electrically connected to the chip 50 and the flexible circuit board 40 to be coupled or electrically connected to an electronic component (such as the antenna 20, the speaker assembly 60, the substrate 80, or the microphone assembly 90) in the wireless earphone 100. With reference to FIG. 1 and FIG. 41, the battery 70 may be disposed, for example, in the earbud part 1. The flexible circuit board 40 may be flexed at a location of the earbud part 1 to form a space for accommodating the battery 70. The battery 70 may be of a pie shape, a short column shape, or the like, so as to be better accommodated in the earbud part 1 of the main housing 101. The shape of the battery 70 may be not limited in this embodiment of this application.

The flexible circuit board 40 may be configured to transmit signals between a plurality of components (such as the antenna 20, the chip 50, the speaker assembly 60, the battery 70, the substrate 80, and the microphone assembly 90) in the wireless earphone 100. With reference to FIG. 1 and FIG. 41, the flexible circuit board 40 may extend from the bottom segment 23 of the earbud stem part 2 to the earbud part 1 through the connecting segment 21 of the earbud stem part 2. The flexible circuit board 40 may have one or more bending structures, and any bending structure may be located in the earbud part 1 or the earbud stem part 2. For example, the flexible circuit board 40 may be electrically connected to two ends (a positive electrode and a negative electrode) of the battery 70 in the earbud part 1 or at the connecting end 21 of the earbud stem part 2. The flexible circuit board 40 may be further electrically connected to a component that is close to the flexible circuit board 40, so as to supply power to the component that is close to the flexible circuit board 40.

The chip 50 may be configured to process signal data. The chip 50 may be, for example, a system-on-a-chip (system-on-a-chip, SOC). For example, the chip 50 may include a radio frequency circuit. The radio frequency circuit may be configured to process a radio frequency signal from the antenna 20 or to be transmitted to the antenna 20. The radio frequency circuit may be, for example, configured to modulate or demodulate a radio frequency signal. For another example, the chip 50 may be configured to process an electrical signal to be transmitted to the speaker assembly 60. With reference to FIG. 1 and FIG. 41, the chip 50 may be disposed, for example, in the earbud part 1, located in a space enclosed by the flexible circuit board, and located on a side that is of the battery 70 and that is close to the antenna 20. The chip 50 may be fastened (for example, through welding) to the flexible circuit board 40, and is electrically connected to the flexible circuit board 40. The chip 50 may be disposed, for example, in the earbud part 1.

The substrate 80 may be configured to transmit signals between a plurality of components (such as the antenna 20, the flexible circuit board 40, the chip 50, the speaker assembly 60, the battery 70, and the microphone assembly 90) in the wireless earphone 100. With reference to FIG. 1 and FIG. 41, the substrate 80 may extend from the bottom segment 23 of the earbud stem part 2 to the top segment 22 of the earbud stem part 2 through the connecting segment 21 of the earbud stem part 2. The substrate 80 may be electrically connected to a component that is close to the substrate 80. The feeding elastomer 81 of the antenna 20 may be disposed on the substrate 80.

With reference to FIG. 1 and FIG. 41, the antenna 20 may extend, for example, from the bottom segment 23 of the earbud stem part 2 to the earbud part 1 through the connecting segment 21 of the earbud stem part 2. The chip 50 may perform feeding at a feeding point of the antenna 20 by using the flexible circuit board 40, the substrate 80, and the feeding elastomer 81 on the substrate 80. A radiator of the antenna 20 may be located in the earbud stem part 2. A feeding point of the radiator of the antenna 20 may be located, for example, in the middle of the earbud stem part 2. The feeding elastomer on the substrate 80 may be located in the middle of the substrate 80.

The speaker assembly (or earpiece assembly) 60 may be configured to convert an electrical signal into a sound signal. With reference to FIG. 1 and FIG. 41, the speaker assembly 60 may be disposed in the earbud part 1, and is located on a side that is of the battery 70 and that is far away from the main chip 50, so as to be close to the outside of the wireless earphone 100, so that a sound signal formed by the speaker assembly 60 is output to the outside of the wireless earphone 100. The speaker assembly 60 may be electrically connected to the flexible circuit board 40.

The microphone assembly (or microphone assembly) 90 is configured to convert a sound signal into an electrical signal. For example, an electrical signal that is output by the microphone assembly 90 may be transmitted to the chip 50 by using the flexible circuit board 40. The microphone assembly 90 may be located, for example, in the bottom segment 23 or the connecting segment 21 of the earbud stem part 2.

In addition, a charging pin, a communications pin, and the like may be further disposed in the bottom segment 23 of the earbud stem part 2.

Figure 42:
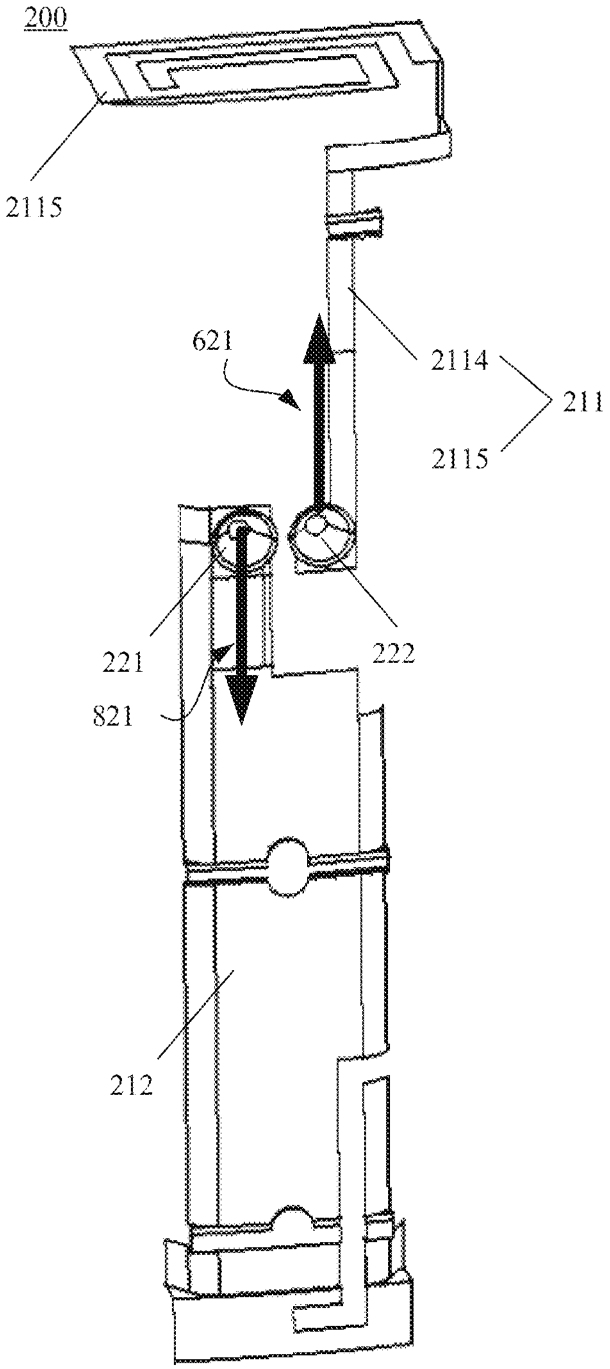
FIG. 42 is a schematic diagram of a structure of a circuit board component according to an embodiment of this application.

With reference to (c) in FIG. 1, FIG. 3, and FIG. 41, an embodiment of this application provides a possible implementation in which the dual-antenna structure 200 is disposed on the circuit board 40, as shown in FIG. 42.

With reference to (c) in FIG. 1 and FIG. 42, the first feeding unit 221 and the second feeding unit 222 may be disposed in the connecting segment 21 of the earbud stem part 2 or near the connecting segment 21 of the earbud stem part 2 (for example, in the middle of the earbud stem part 2).

With reference to (c) in FIG. 1 and FIG. 42, both the first antenna radiator 211 and the second antenna radiator 212 may be disposed in the earbud stem part 2 shown in (c) in FIG. 1. The third antenna radiator 213 (not shown in FIG. 42) may be disposed in the earbud part 1 shown in (c) in FIG. 1.

With reference to (c) in FIG. 1 and FIG. 42, the first antenna radiator 211 may extend, for example, from the connecting segment 21 of the earbud stem part 2 (or the middle of the earbud stem part 2) to the top segment 22 of the earbud stem part 2. As shown in FIG. 42, at least a part of the first antenna radiator 211 may be accommodated in the top segment 22 of the earbud stem part 2. The top segment 22 and a part of the connecting segment 21 of the earbud stem part 2 may be used to accommodate the first antenna radiator 211. Therefore, a first current 621 may be formed on the first antenna radiator 211, the first current 621 may be (approximately) parallel to an extension direction of the earbud stem part 2, and the first current 621 may (approximately) extend from the connecting segment 21 of the earbud stem part 2 to the top segment 22 of the earbud stem part 2, as shown in FIG. 42.

With reference to (c) in FIG. 1 and FIG. 42, in an example, the first antenna radiator 211 may be helically encircled on a plane that is (approximately) perpendicularly disposed relative to the extension direction of the earbud stem part 2. In this case, a helical encircling manner of the first antenna radiator 211 may be planar helical encircling. To be specific, the first antenna radiator 211 may perform helical encircling on a preset plane relative to a preset axis, and the preset axis is perpendicular to the preset plane. The "helical" encircling manner may be not limited in this embodiment of this application. In another example, the first antenna radiator 211 is helically encircled on a preset cone-shaped plane or a preset cone-like plane (for example, a truncated-cone-shaped plane) relative to the preset axis, a start location of the first antenna radiator 211 is located on a first plane, an end location of the first antenna radiator 211 is located on a second plane, the preset axis is perpendicular to the first plane, the preset axis is perpendicular to the second plane, and the first plane and the second plane are not coplanar with each other (in this case, a helical encircling manner of the first antenna radiator 211 may be three-dimensional helical encircling).

In other words, the first antenna radiator 211 may include a first segment 2114 and a second segment 2115, the first segment 2114 may be disposed in parallel with the earbud stem part 2, the second segment 2115 may be helical, and the first segment 2114 is connected or electrically connected between the first feeding unit 221 and the second segment 2115.

With reference to (c) in FIG. 1 and FIG. 42, the second antenna radiator 212 may extend from the connecting segment 21 of the earbud stem part 2 (or the middle of the earbud stem part 2) to the bottom segment 23 of the earbud stem part 2. In other words, at least a part of the second antenna radiator 212 may be accommodated in the bottom segment 23 of the earbud stem part 2. The bottom segment 23 and a part of the connecting segment 21 of the earbud stem part 2 may be used to accommodate the second antenna radiator 212. Therefore, a second current 821 is formed on the second antenna radiator 212, and the second current 821 may (approximately) extend from the connecting segment 21 of the earbud stem part 2 to the bottom segment 23 of the earbud stem part 2, as shown in FIG. 42.

With reference to (c) in FIG. 1 and FIG. 42, the second antenna radiator 212 and the second segment 2115 of the first antenna radiator 211 may be located at two ends of the earbud stem part 2.

With reference to (c) in FIG. 1 and FIG. 42, in an example, the second antenna radiator 212 may be disposed in parallel with the earbud stem part 2. For example, the second antenna radiator 212 may be encircled or bent on a plane disposed (approximately) in parallel with the extension direction of the earbud stem part 2. For another example, the second antenna radiator 212 may be located on a plane disposed (approximately) in parallel with the extension direction of the earbud stem part 2, and does not include an encircled part or a bent part.

With reference to (c) in FIG. 1 and FIG. 42, in an example, a width of the first antenna radiator 211 may be less than a width of the second antenna radiator 212 (in this application, the width may be any one of an average width, a maximum width, and a minimum width).

For a manner of disposing the third antenna radiator 213 in the wireless earphone 100 and a ground current formed on the third antenna radiator 213, refer to the example shown in FIG. 5. Details are not described herein again.

With reference to FIG. 6, FIG. 8, and FIG. 42, when the first antenna radiator 211 and the second antenna radiator 212 simultaneously perform feeding, the first current 621, the second current 821, and the ground current on the third antenna radiator 213 may form a ground current, where the ground current includes the first equivalent current 623 and the second equivalent current 823, and a difference between the direction of the first equivalent current 623 and the direction of the second equivalent current 823 is relatively large (for example, greater than the foregoing third preset threshold).

In another example, with reference to (b) in FIG. 1, it can be learned that, when the wireless earphone 100 does not have the top segment 22, the first antenna radiator 211 may extend in the length direction of the earbud stem part 2. In addition, when the wireless earphone 100 has the top segment 22, the first antenna radiator 211 may not pass through the top segment 22 either.

It should be understood that the circuit board component 500 shown in FIG. 42 may be further used in another wireless earphone, for example, may be used in the wireless earphone 100 shown in (a) or (b) in FIG. 1.

Figure 43:
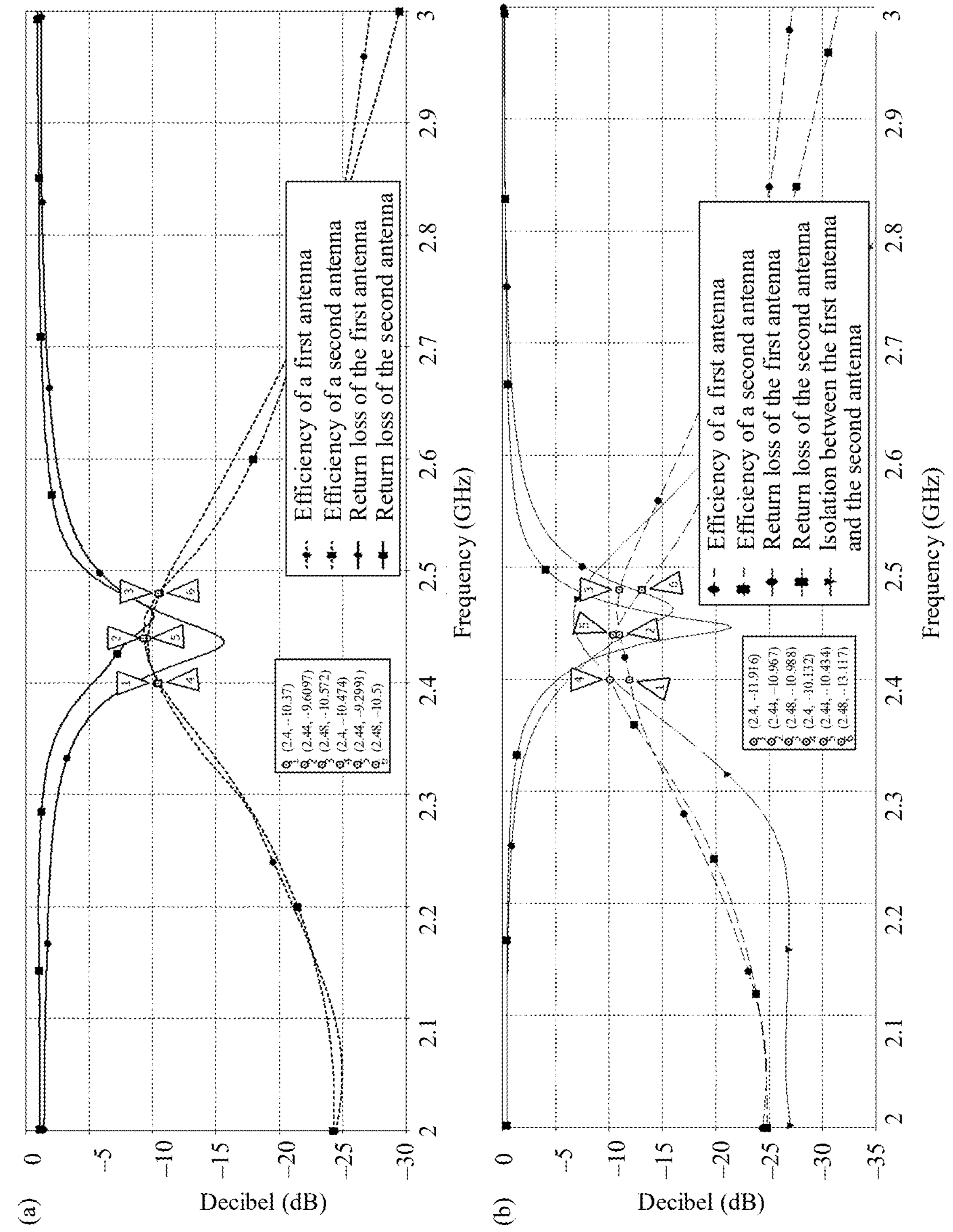
FIG. 43 is a schematic diagram of antenna performance of a dual-antenna structure according to an embodiment of this application.

FIG. 43 shows antenna efficiency and a return loss that can be implemented by the circuit board component 500 shown in FIG. 41.

With reference to FIG. 3, FIG. 42, and (a) in FIG. 43, when only the first antenna 201 including the first antenna radiator 211 and the third antenna radiator 242 is used, relatively high antenna efficiency may be implemented in 2.4 GHz to 2.48 GHz, and the first antenna 201 may further have a relatively low return loss in 2.4 GHz to 2.48 GHz.

With reference to FIG. 3, FIG. 42, and (a) in FIG. 43, when only the second antenna 202 including the second antenna radiator 212 and the third antenna radiator 242 is used, relatively high antenna efficiency may be implemented in 2.4 GHz to 2.48 GHz, and the second antenna 202 may further have a relatively low return loss in 2.4 GHz to 2.48 GHz.

With reference to FIG. 3, FIG. 42, and (b) in FIG. 43, when both the first antenna 201 and the second antenna 202 are used, both the first antenna 201 and the second antenna 202 may implement relatively high antenna efficiency in 2.4 GHz to 2.48 GHz, the first antenna 201 and the second antenna 202 each may have a relatively low return loss in 2.4 GHz to 2.48 GHz, and isolation between the first antenna 201 and the second antenna 202 is relatively good (less than −7 dB).

Compared with a case in which only the first antenna 201 or only the second antenna 202 is used, return losses of the first antenna 201 and the second antenna 202 may be slightly reduced, and antenna efficiency of the first antenna 201 and the second antenna 202 may be slightly reduced.

Figure 44:
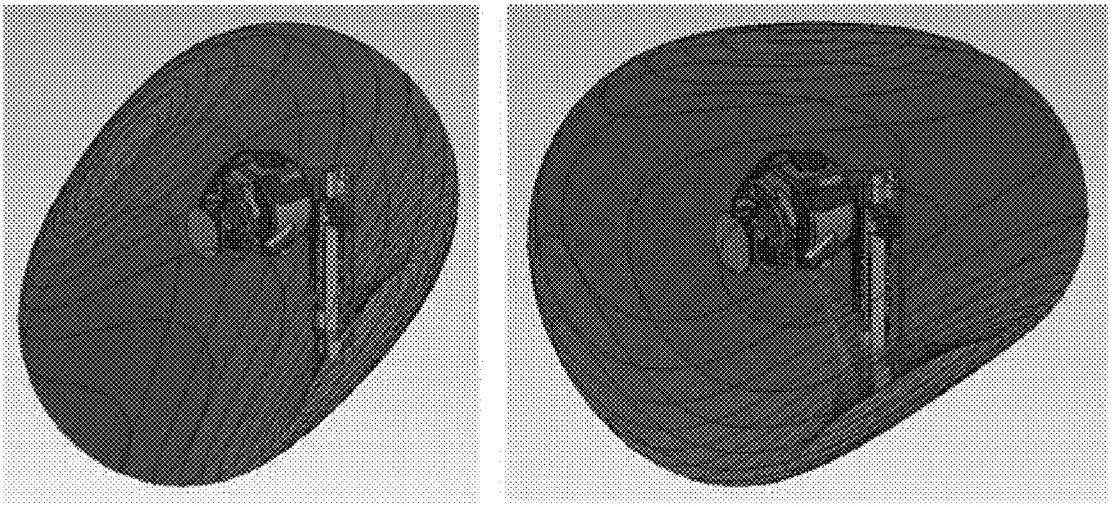
FIG. 44 is a schematic diagram of a head phantom directivity mode of a dual-antenna structure according to an embodiment of this application.
Figure 45A:
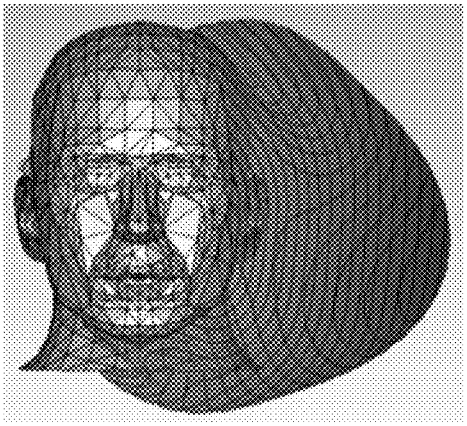
FIG. 45 is a schematic diagram of a head phantom directivity mode and antenna performance of a dual-antenna structure according to an embodiment of this application.
Figure 45B:
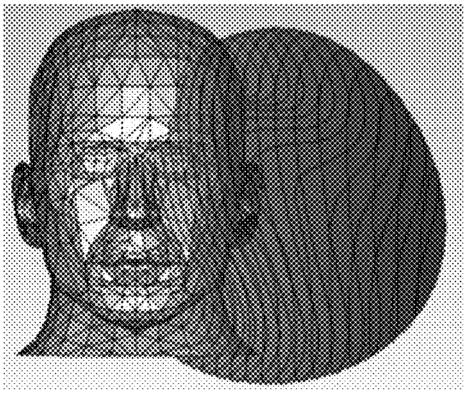
Figure 45C:
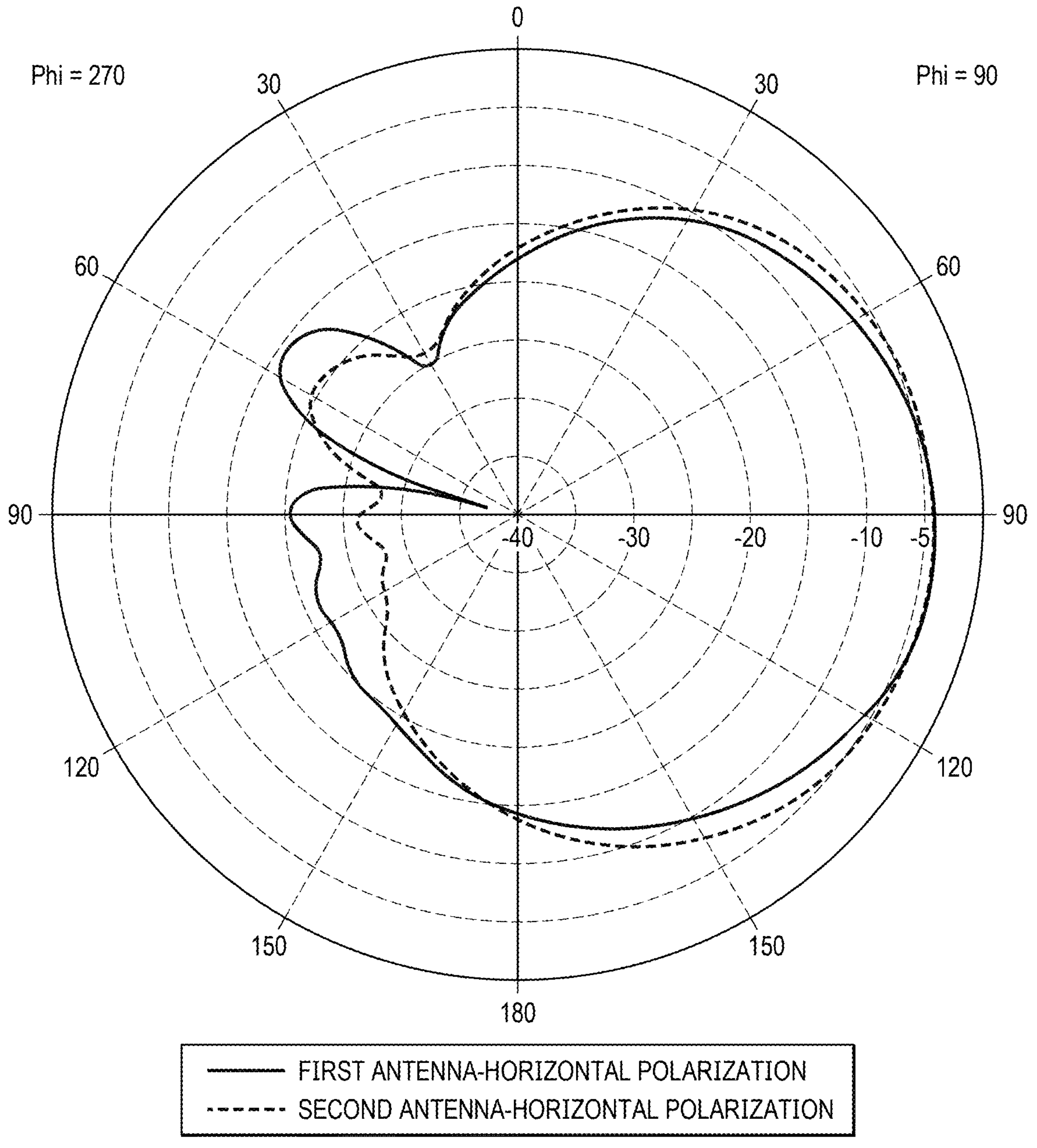
Figure 45D:
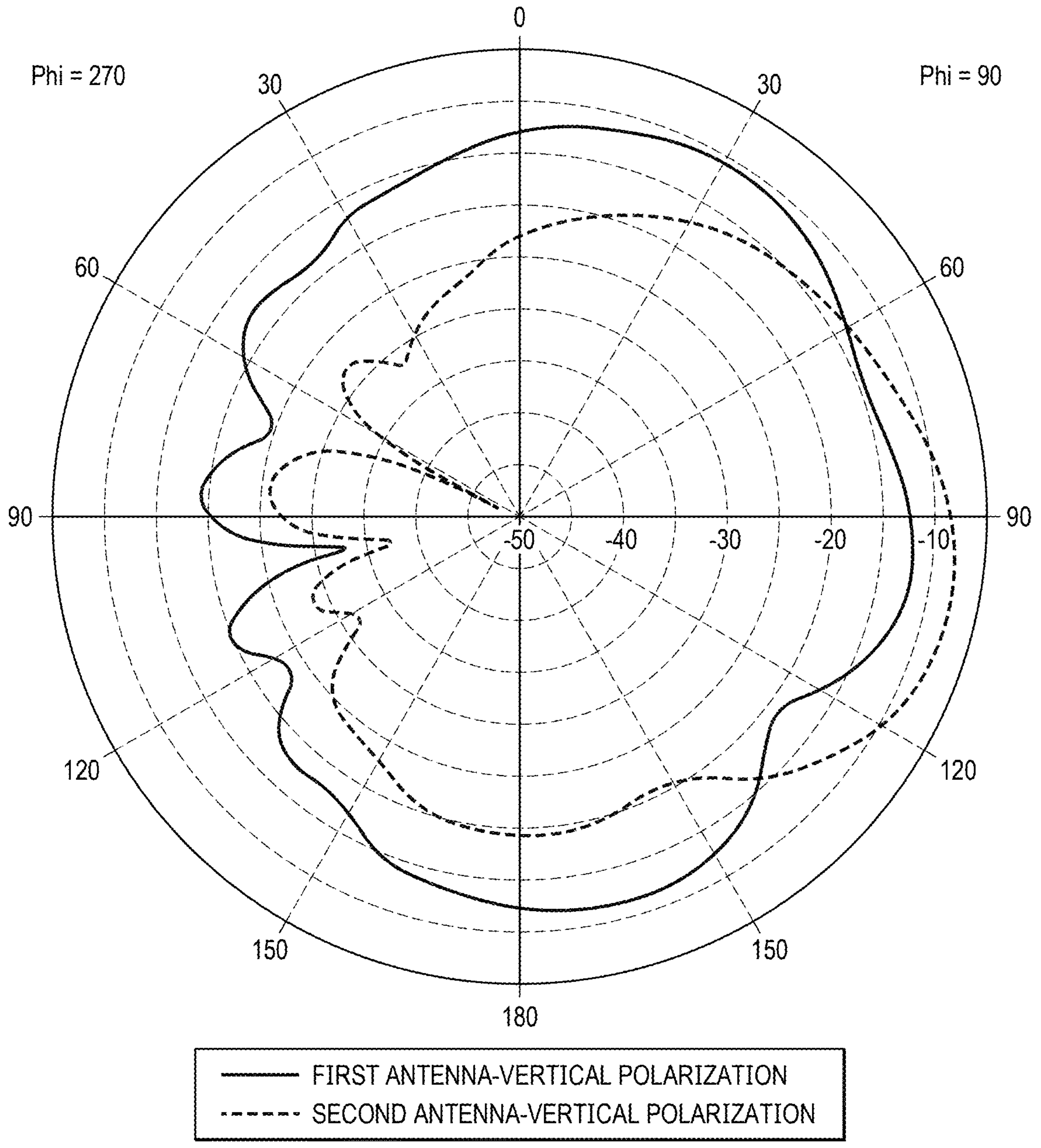
Figure 45E:
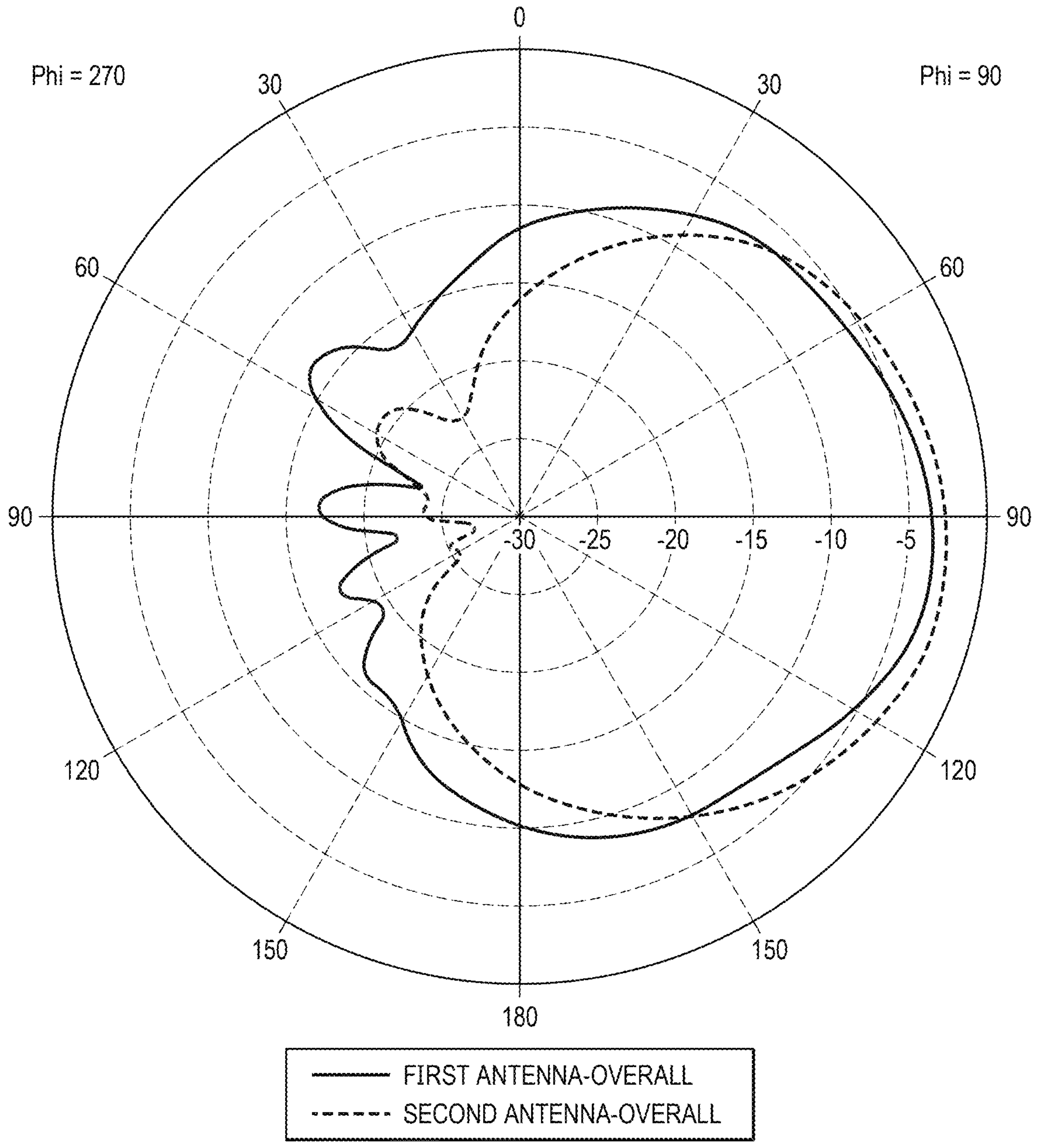
Figure 46A:
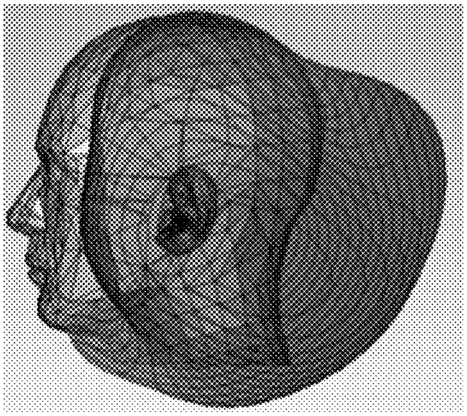
FIG. 46 is a schematic diagram of a head phantom directivity mode and antenna performance of a dual-antenna structure according to an embodiment of this application.
Figure 46B:
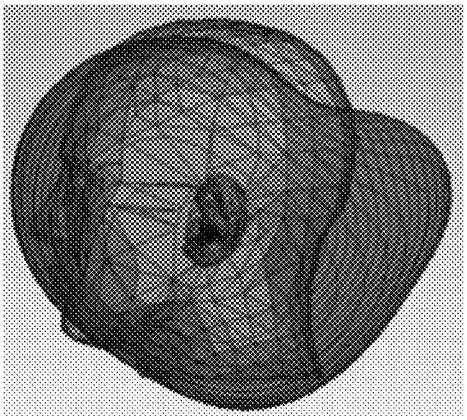
Figure 46C:
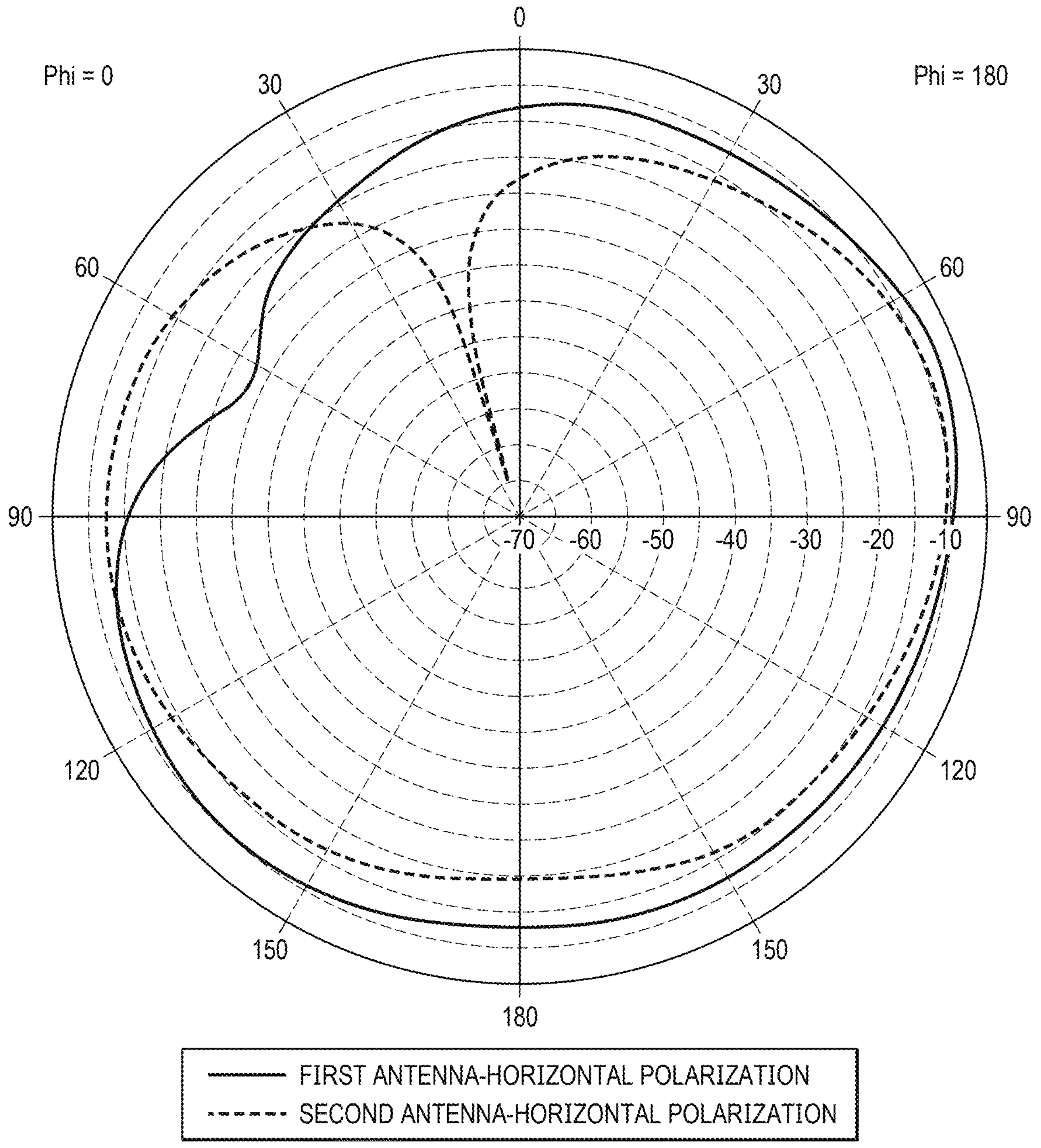
Figure 46D:
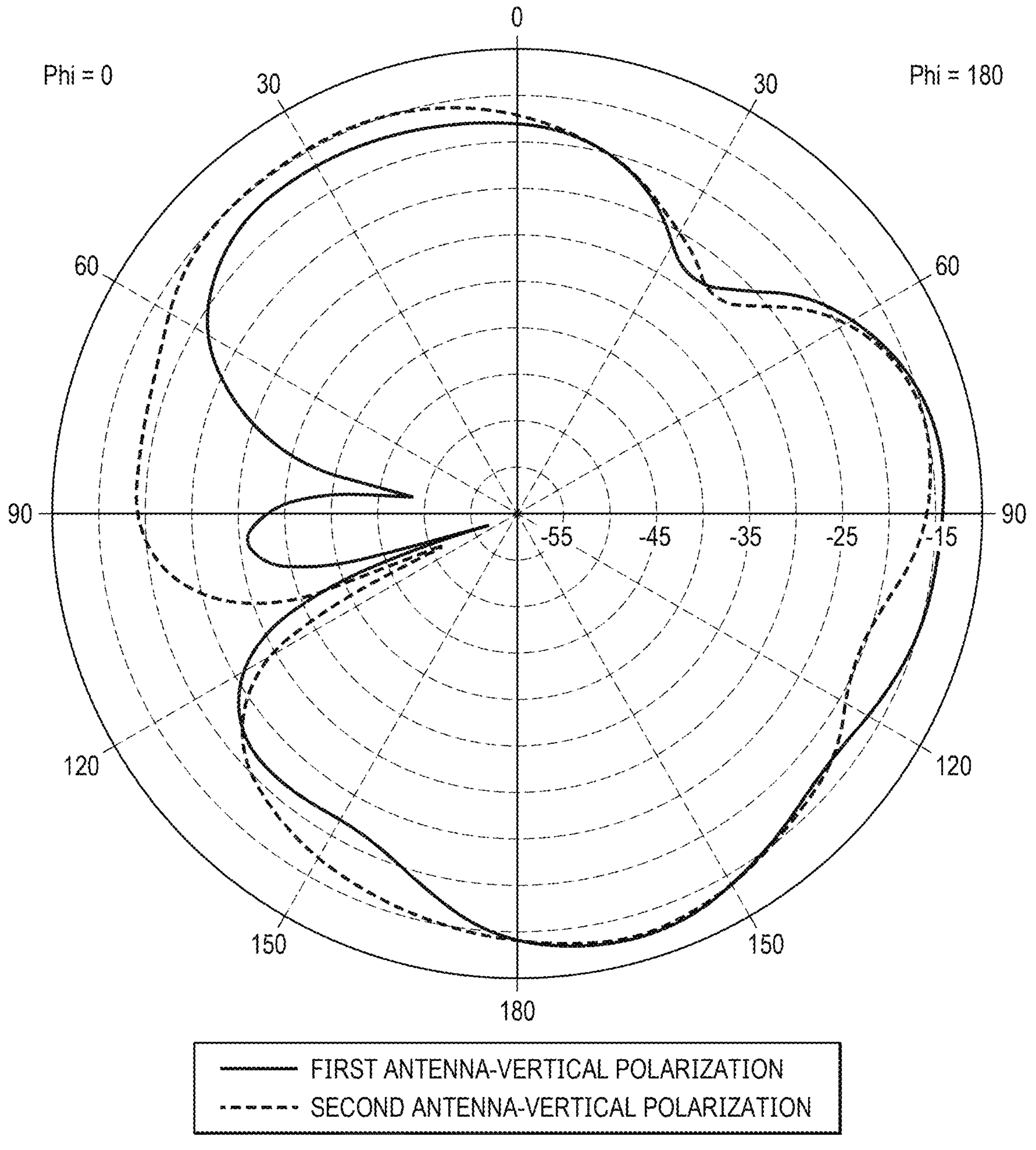
Figure 46E:
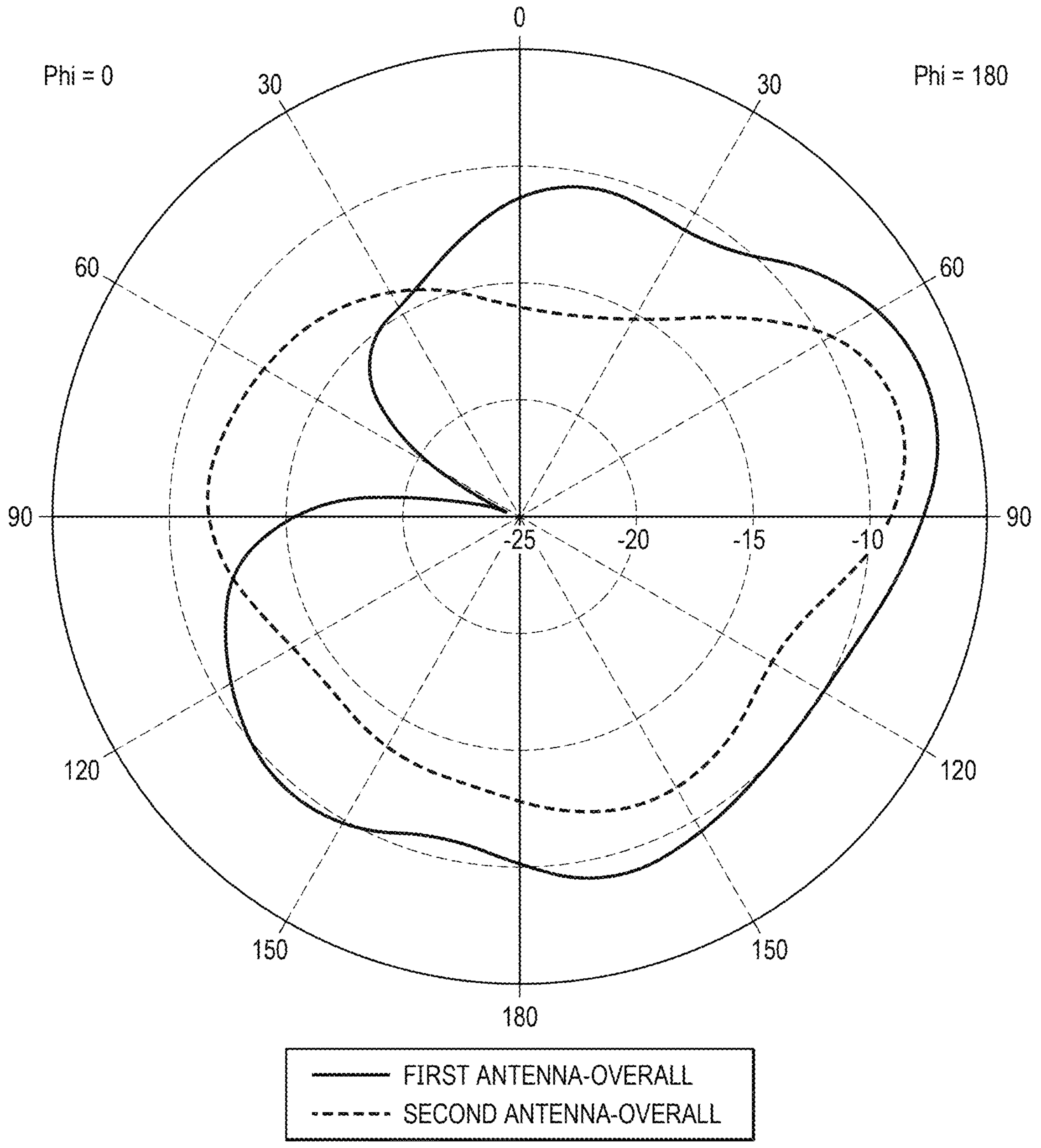

FIG. 44 is an antenna directivity diagram that can be implemented by a wireless earphone 10. The wireless earphone 100 includes the circuit board component 500 shown in FIG. 41 and FIG. 42, and the wireless earphone 100 is not worn on the ear of a user.

From a front view of the earphone, an antenna directivity diagram of the first antenna 201 shown in (a) in FIG. 44 may be obtained. From the front view of the earphone, an antenna directivity diagram of the second antenna 202 shown in (b) in FIG. 44 may be obtained.

It can be learned from this that the antenna directivity diagram of the first antenna 201 is greatly different from the antenna directivity diagram of the second antenna 202.

It can be learned from the antenna performance shown in FIG. 14 and FIG. 20 that, when the wireless earphone 100 is not worn on the ear of the user, the antenna directivity diagram of the first antenna 201 shown in FIG. 18 may be different from the antenna directivity diagram of the first antenna 201 shown in FIG. 12. In other words, changing a location of the battery 70 in the wireless earphone 100 and/or changing a structure and a location of the antenna radiator in the wireless earphone 100 can change the antenna directivity diagram of the wireless earphone 100. In addition, the first antenna radiator 211 and the second antenna radiator 212 extend in opposite directions, so as to help implement mutually different antenna directivity diagrams.

Figure 47:
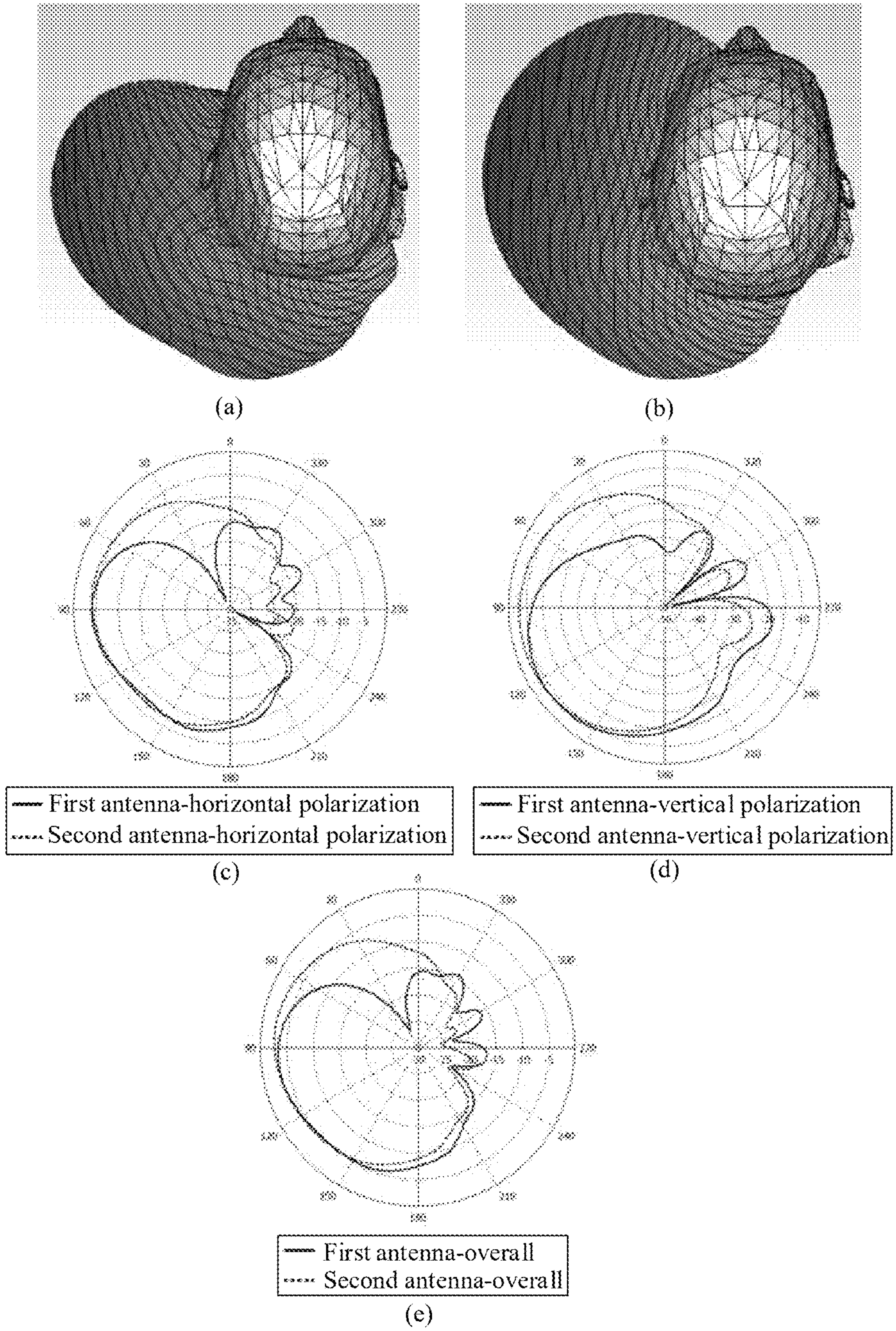
FIG. 47 is a schematic diagram of a head phantom directivity mode and antenna performance of a dual-antenna structure according to an embodiment of this application.

FIG. 45 to FIG. 47 each show a head phantom directivity mode that can be implemented by a wireless earphone 100. The wireless earphone 100 includes the circuit board component 500 shown in FIG. 42, and the wireless earphone 100 is worn on the ear of a user.

From a front view of the face of the user, a profile (shown in (a) in FIG. 45) of a head phantom directivity mode of the first antenna 201 may be obtained.

From the front view of the face of the user, a profile (shown in (b) in FIG. 45) of the head phantom directivity mode of the second antenna 202 may be obtained.

From the front view of the face of the user, a plan view 1-1-7 (shown in (c) in FIG. 45) of the head phantom directivity mode of the first antenna 201 in a horizontal polarization direction and a plan view 2-1-7 (shown in (c) in FIG. 45) of the head phantom directivity mode of the second antenna 202 in the horizontal polarization direction may be obtained. From the front view of the face of the user, a radiation low point of the dual-antenna structure 200 shown in FIG. 42 in a horizontal polarization direction may be approximately −37 dB.

From the front view of the face of the user, a plan view 1-1-8 (shown in (d) in FIG. 45) of the head phantom directivity mode of the first antenna 201 in a vertical polarization direction and a plan view 2-1-8 (shown in (d) in FIG. 45) of the head phantom directivity mode of the second antenna 202 in the vertical polarization direction may be obtained. From the front view of the face of the user, a radiation low point of the dual-antenna structure 200 shown in FIG. 42 in a vertical polarization direction may be approximately −33 dB.

From the front view of the face of the user, an overall plan view 1-1-9 (shown in (e) in FIG. 45) of the head phantom directivity mode of the first antenna 201 and an overall plan view 2-1-9 (shown in (e) in FIG. 45) of the head phantom directivity mode of the second antenna 202 may be obtained by combining the foregoing plan views 1-1-7 and 2-1-7 of the head phantom directivity mode in the horizontal polarization direction and the foregoing plan views 1-1-8 and 2-1-8 of the head phantom directivity mode in the vertical polarization direction. From the front view of the face of the user, an overall radiation low point of the dual-antenna structure 200 shown in FIG. 42 may be approximately −23 dB.

From a side view of the face of the user, a profile (shown in (a) in FIG. 46) of a head phantom directivity mode of the first antenna 201 may be obtained.

From the side view of the face of the user, a profile (shown in (b) in FIG. 46) of the head phantom directivity mode of the second antenna 202 may be obtained.

From the side view of the face of the user, a plan view 1-2-7 (shown in (c) in FIG. 46) of the head phantom directivity mode of the first antenna 201 in a horizontal polarization direction and a plan view 2-2-7 (shown in (c) in FIG. 46) of the head phantom directivity mode of the second antenna 202 in the horizontal polarization direction may be obtained. From the side view of the face of the user, a radiation low point of the dual-antenna structure 200 shown in FIG. 42 in a vertical polarization direction may be approximately −20 dB.

From the side view of the face of the user, a plan view 1-2-8 (shown in (d) in FIG. 46) of the head phantom directivity mode of the first antenna 201 in a vertical polarization direction and a plan view 2-2-8 (shown in (d) in FIG. 46) of the head phantom directivity mode of the second antenna 202 in the vertical polarization direction may be obtained. From the side view of the face of the user, a radiation low point of the dual-antenna structure 200 shown in FIG. 42 in a vertical polarization direction may be approximately −35 dB.

From the side view of the face of the user, an overall plan view 1-2-9 (shown in (e) in FIG. 46) of the head phantom directivity mode of the first antenna 201 and an overall plan view 2-2-9 (shown in (e) in FIG. 46) of the head phantom directivity mode of the second antenna 202 may be obtained by combining the foregoing plan views 1-2-7 and 2-2-7 of the head phantom directivity mode in the horizontal polarization direction and the foregoing plan views 1-2-8 and 2-2-8 of the head phantom directivity mode in the vertical polarization direction. From the side view of the face of the user, an overall radiation low point of the dual-antenna structure 200 shown in FIG. 42 may be approximately −14 dB.

From a top view of the head of the user, a profile (shown in (a) in FIG. 47) of a head phantom directivity mode of the first antenna 201 may be obtained.

From the top view of the head of the user, a profile (shown in (b) in FIG. 47) of the head phantom directivity mode of the second antenna 202 may be obtained.

From the top view of the head of the user, a plan view 1-3-7 (shown in (c) in FIG. 47) of the head phantom directivity mode of the first antenna 201 in a horizontal polarization direction and a plan view 2-3-7 (shown in (c) in FIG. 47) of the head phantom directivity mode of the second antenna 202 in the horizontal polarization direction may be obtained. From the top view of the head of the user, a radiation low point of the dual-antenna structure 200 shown in FIG. 42 in a vertical polarization direction may be approximately −24 dB.

From the top view of the head of the user, a plan view 1-3-8 (shown in (d) in FIG. 47) of the head phantom directivity mode of the first antenna 201 in a vertical polarization direction and a plan view 2-3-8 (shown in (d) in FIG. 47) of the head phantom directivity mode of the second antenna 202 in the vertical polarization direction may be obtained. From the top view of the head of the user, a radiation low point of the dual-antenna structure 200 shown in FIG. 42 in a vertical polarization direction may be approximately −42 dB.

From the top view of the head of the user, an overall plan view 1-3-9 (shown in (e) in FIG. 47) of the head phantom directivity mode of the first antenna 201 and an overall plan view 2-3-9 (shown in (e) in FIG. 47) of the head phantom directivity mode of the second antenna 202 may be obtained by combining the foregoing plan views 1-3-7 and 2-3-7 of the head phantom directivity mode in the horizontal polarization direction and the foregoing plan views 1-3-8 and 2-3-8 of the head phantom directivity mode in the vertical polarization direction. From the top view of the head of the user, an overall radiation low point of the dual-antenna structure 200 shown in FIG. 42 may be approximately −23 dB.

It can be learned from the antenna performance shown in FIG. 45 to FIG. 47 that disposing dual antennas with different antenna directivity diagrams in the wireless earphone 100 helps improve overall antenna performance of the wireless earphone 100, and further helps improve data transmission efficiency, an audio play effect, and the like of the wireless earphone 100.

Figure 48:
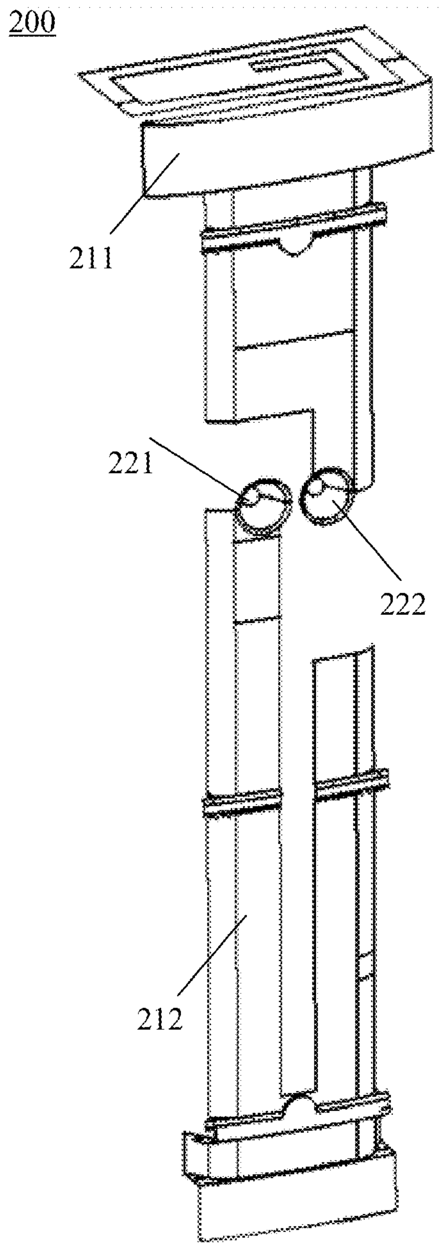
FIG. 48 is a schematic diagram of a structure of a circuit board component according to an embodiment of this application.

With reference to (c) in FIG. 1, FIG. 3, and FIG. 41, an embodiment of this application provides another possible implementation in which the dual-antenna structure 200 is disposed on the circuit board 40, as shown in FIG. 48. A difference between the implementation shown in FIG. 48 and the implementation shown in FIG. 42 may include: The first antenna radiator 211 and the second antenna radiator 212 each may have different specific structures.

In the implementation shown in FIG. 42, an average width of the first antenna radiator 211 is relatively small. However, in the implementation shown in FIG. 48, an average width of the first antenna radiator 211 is relatively large. In the example shown in FIG. 48, a side that is of the first antenna radiator 211 and that is close to the first feeding unit has a relatively large width.

In the implementation shown in FIG. 42, an average width of the second antenna radiator 212 is relatively small. However, in the implementation shown in FIG. 48, an average width of the second antenna radiator 212 is relatively large. In the example shown in FIG. 48, the average width of the second antenna radiator 212 may be approximately ⅓ to ½ of a maximum width of the first antenna radiator 211.

In other words, in the example shown in FIG. 48, a difference between the width of the first antenna radiator 211 and the width of the second antenna radiator 212 may be relatively small (for example, less than a preset width, where the preset width may be, for example, 1 mm, 2 mm, 3 mm, or 5 mm).

In another example, with reference to (b) in FIG. 1, it can be learned that, when the wireless earphone 100 does not have the top segment 22, the first antenna radiator 211 may extend in the length direction of the earbud stem part 2. In addition, when the wireless earphone 100 has the top segment 22, the first antenna radiator 211 may not pass through the top segment 22 either.

Figure 49:
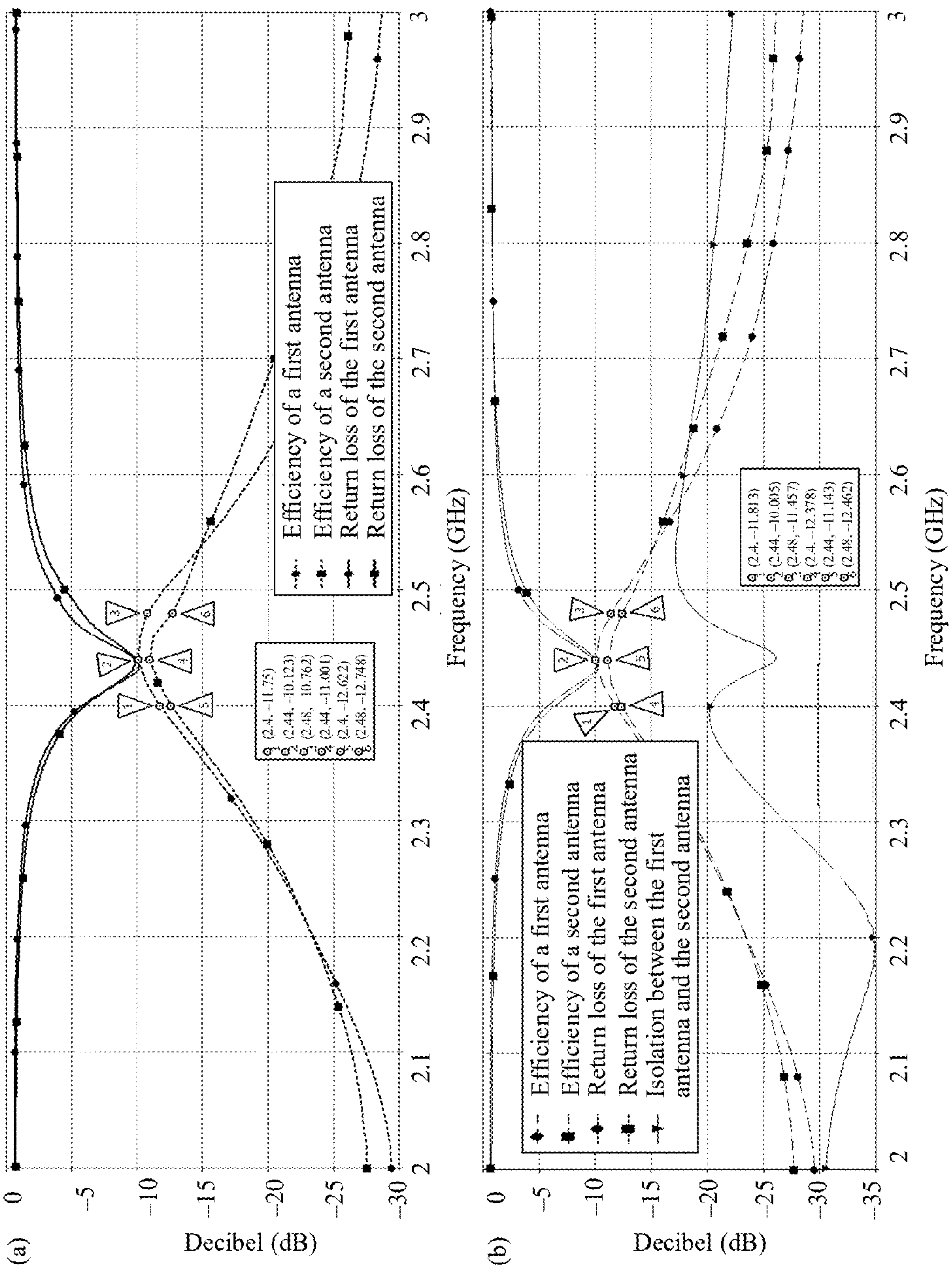
FIG. 49 is a schematic diagram of antenna performance of a dual-antenna structure according to an embodiment of this application.

FIG. 49 shows antenna efficiency and a return loss that can be implemented by the circuit board component 500 shown in FIG. 41.

With reference to FIG. 3, FIG. 48, and (a) in FIG. 49, when only the first antenna 201 including the first antenna radiator 211 and the third antenna radiator 248 is used, relatively high antenna efficiency may be implemented in 2.4 GHz to 2.48 GHz, and the first antenna 201 may further have a relatively low return loss in 2.4 GHz to 2.48 GHz.

With reference to FIG. 3, FIG. 48, and (a) in FIG. 49, when only the second antenna 202 including the second antenna radiator 212 and the third antenna radiator 248 is used, relatively high antenna efficiency may be implemented in 2.4 GHz to 2.48 GHz, and the second antenna 202 may further have a relatively low return loss in 2.4 GHz to 2.48 GHz.

With reference to FIG. 3, FIG. 48, and (b) in FIG. 49, when both the first antenna 201 and the second antenna 202 are used, both the first antenna 201 and the second antenna 202 may implement relatively high antenna efficiency in 2.4 GHz to 2.48 GHz, the first antenna 201 and the second antenna 202 each may have a relatively low return loss in 2.4 GHz to 2.48 GHz, and isolation between the first antenna 201 and the second antenna 202 is relatively good (less than −17 dB).

Compared with a case in which only the first antenna 201 or only the second antenna 202 is used, in a case in which both the first antenna 201 and the second antenna 202 are used, return losses and antenna efficiency of the first antenna 201 and the second antenna 202 may remain unchanged basically.

Figure 50:
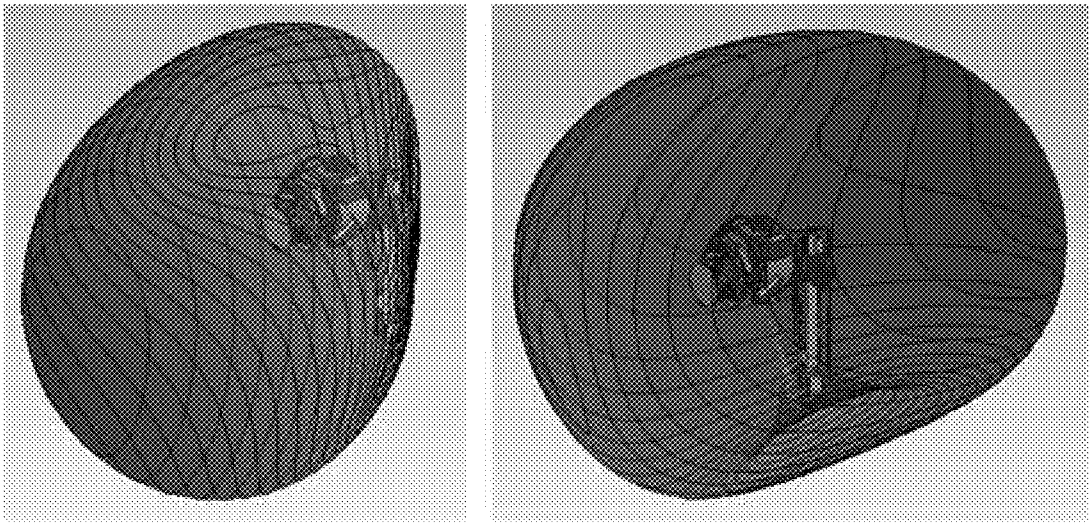
FIG. 50 is a schematic diagram of a head phantom directivity mode of a dual-antenna structure according to an embodiment of this application.

FIG. 50 is an antenna directivity diagram that can be implemented by a wireless earphone 100. The wireless earphone 100 includes the circuit board component 500 shown in FIG. 41 and FIG. 48, and the wireless earphone 100 is not worn on the ear of a user.

From a front view of the earphone, an antenna directivity diagram of the first antenna 201 shown in (a) in FIG. 50 may be obtained. From the front view of the earphone, an antenna directivity diagram of the second antenna 202 shown in (b) in FIG. 50 may be obtained.

It can be learned from this that the antenna directivity diagram of the first antenna 201 is greatly different from the antenna directivity diagram of the second antenna 202.

It can be learned from the antenna performance shown in FIG. 14 and FIG. 20 that, when the wireless earphone 100 is not worn on the ear of the user, the antenna directivity diagram of the first antenna 201 shown in FIG. 18 may be different from the antenna directivity diagram of the first antenna 201 shown in FIG. 12. In other words, changing a location of the battery 70 in the wireless earphone 100 and/or changing a structure and a location of the antenna radiator in the wireless earphone 100 can change the antenna directivity diagram of the wireless earphone 100.

Figure 51:
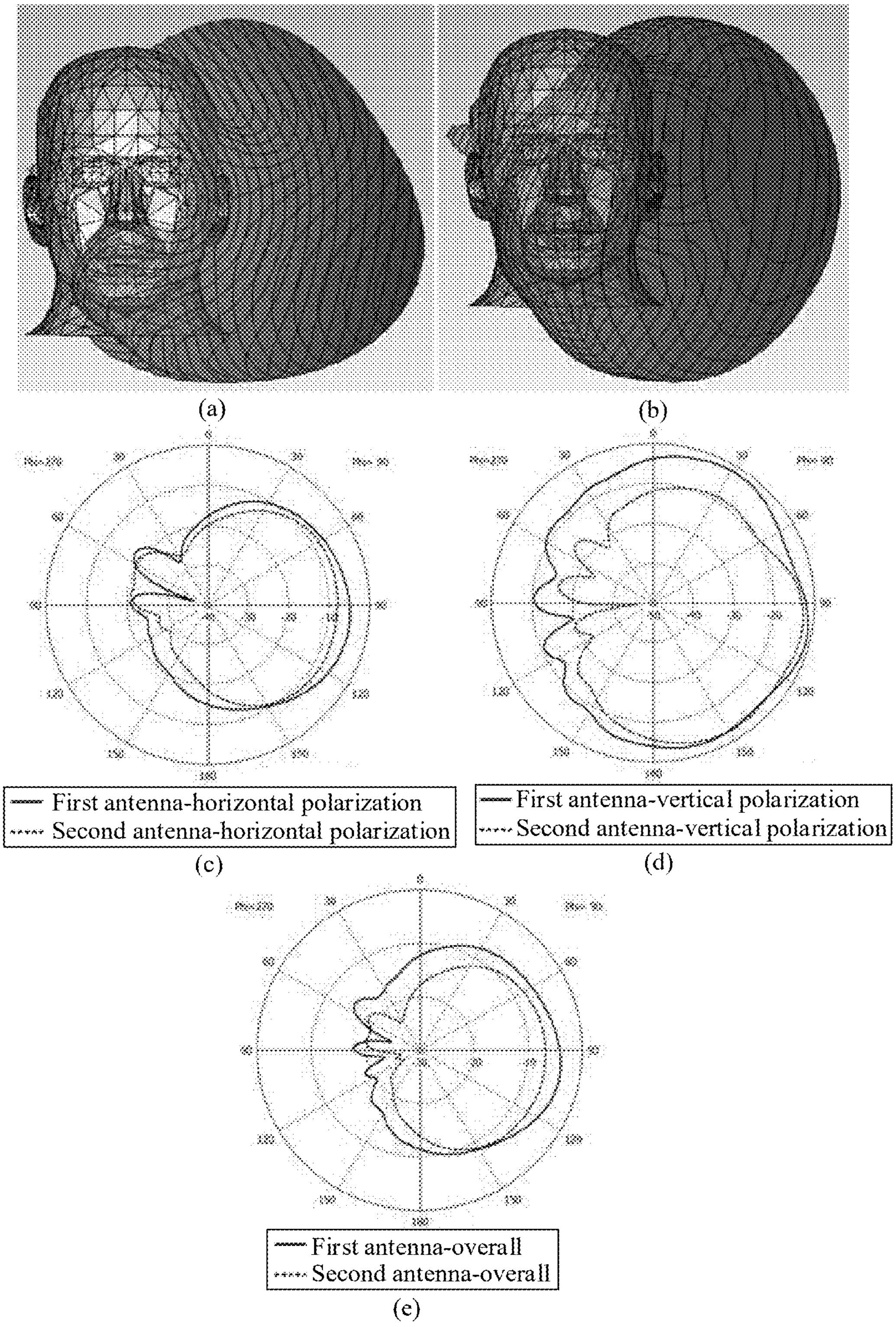
FIG. 51 is a schematic diagram of a head phantom directivity mode and antenna performance of a dual-antenna structure according to an embodiment of this application.
Figure 52A:
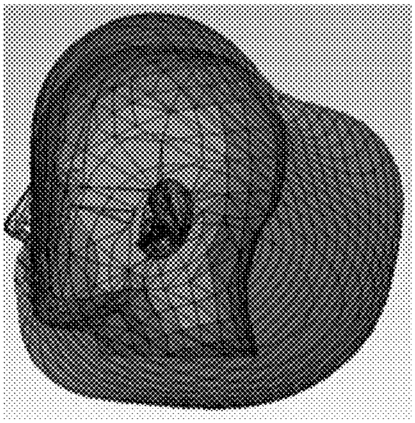
FIG. 52 is a schematic diagram of a head phantom directivity mode and antenna performance of a dual-antenna structure according to an embodiment of this application.
Figure 52B:
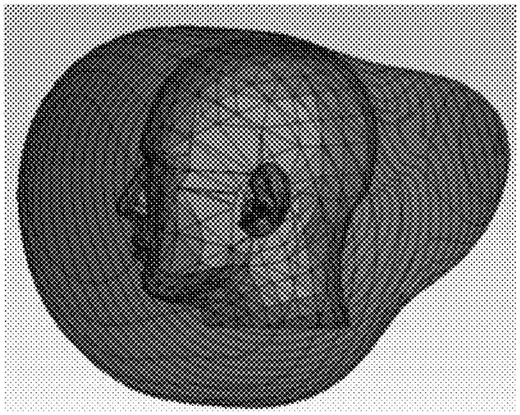
Figure 52C:
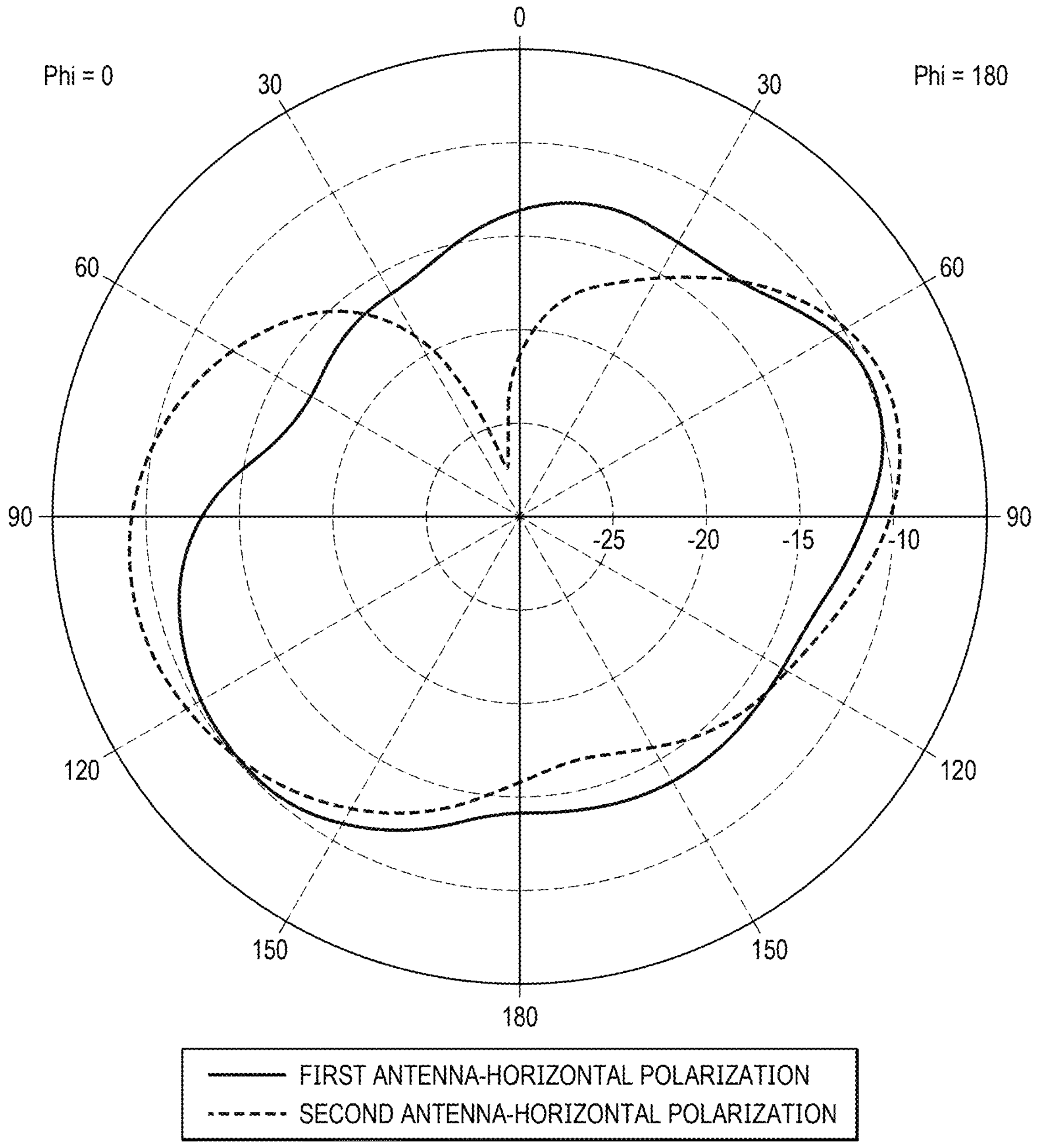
Figure 52D:
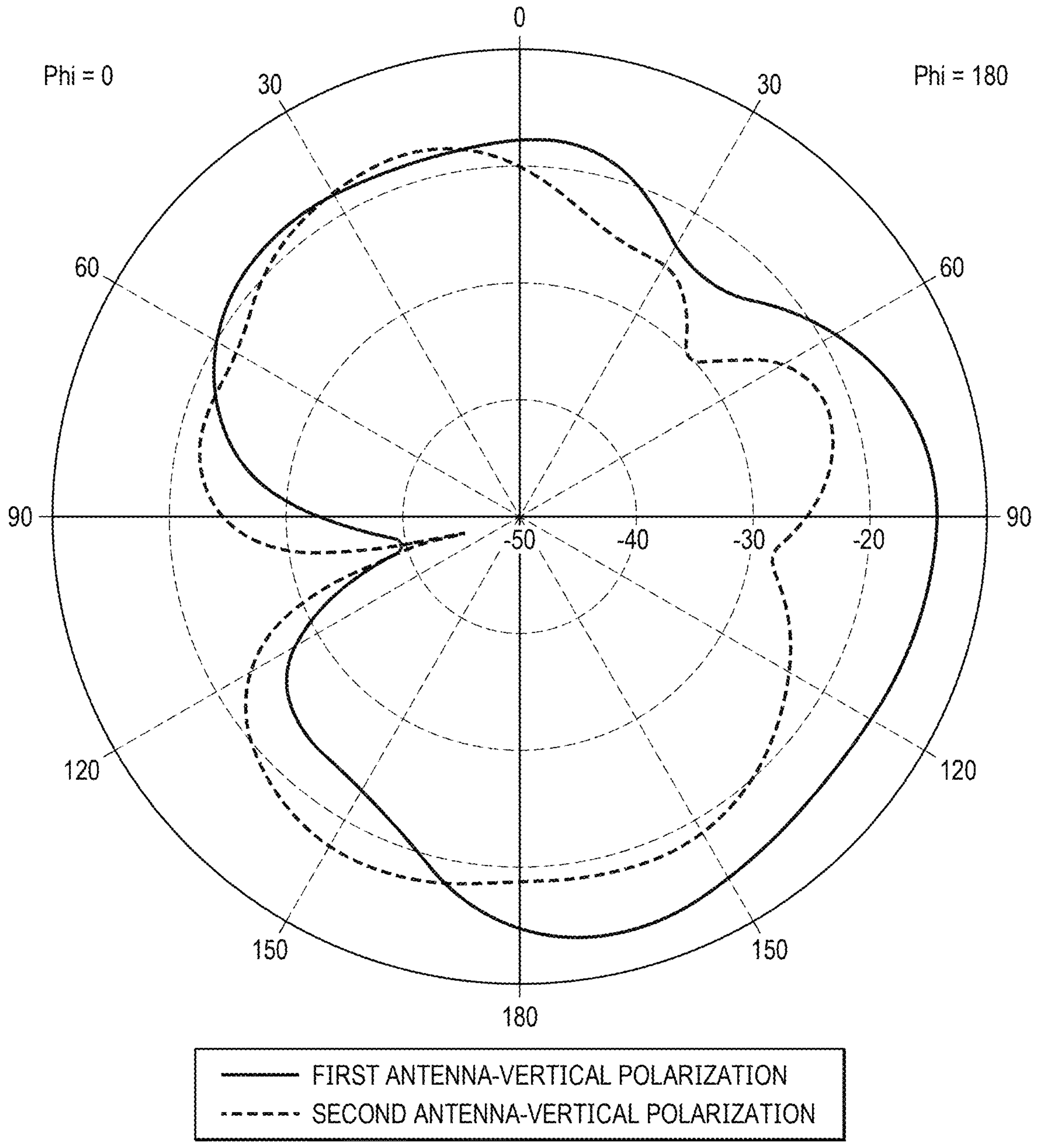
Figure 52E:
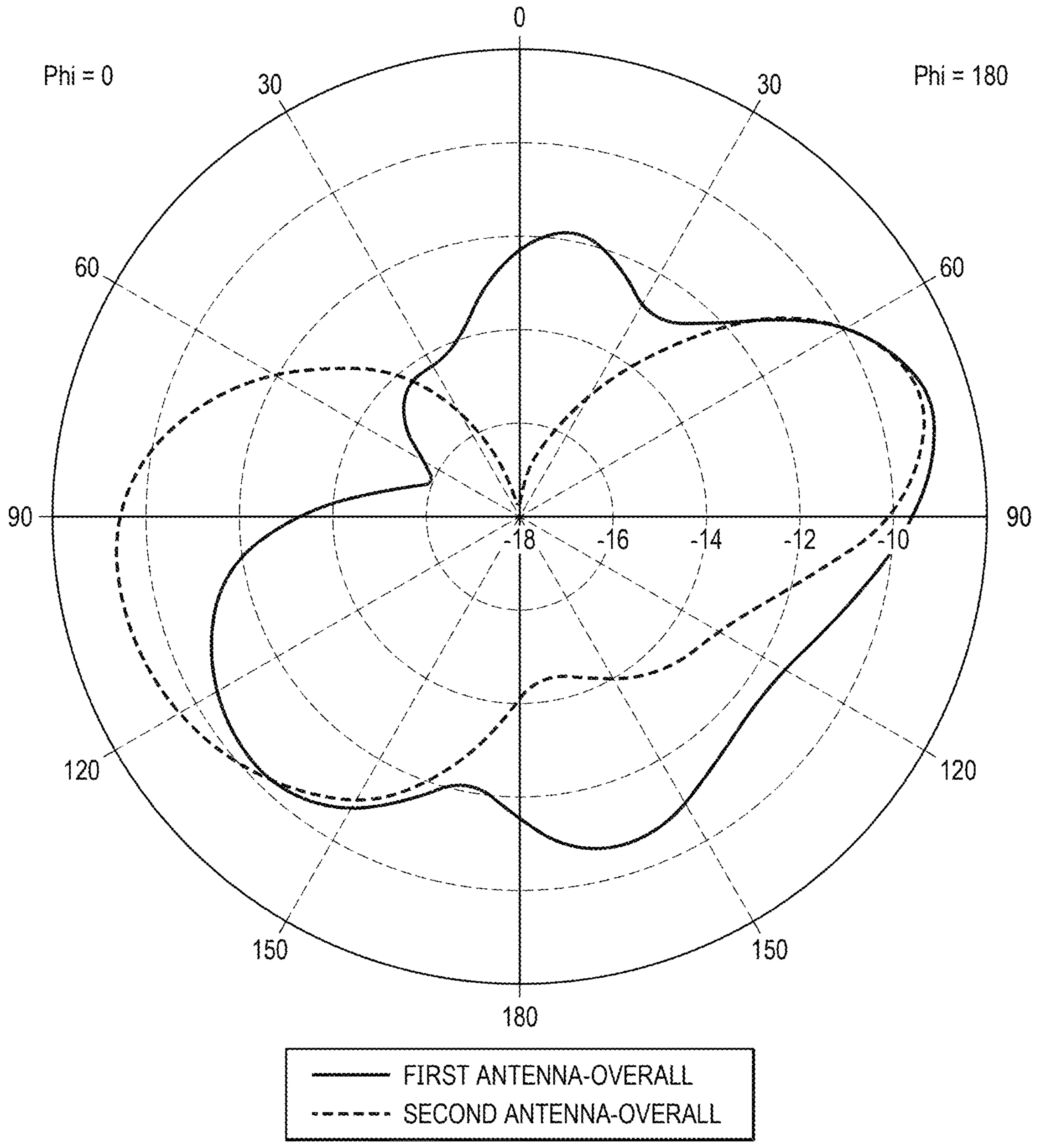
Figure 53:
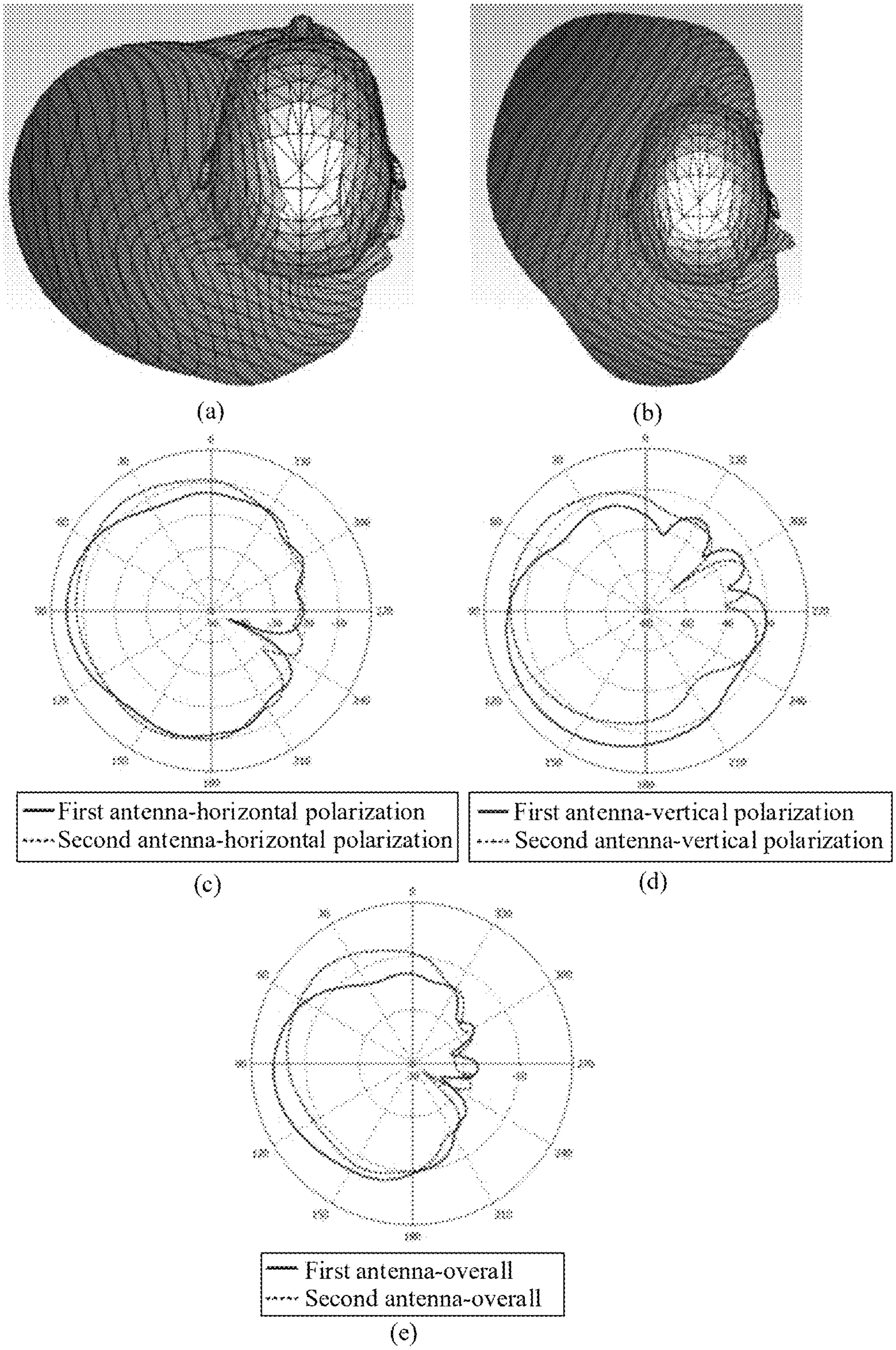
FIG. 53 is a schematic diagram of a head phantom directivity mode and antenna performance of a dual-antenna structure according to an embodiment of this application.

FIG. 51 to FIG. 53 each show ahead phantom directivity mode that can be implemented by a wireless earphone 100. The wireless earphone 100 includes the circuit board component 500 shown in FIG. 48, and the wireless earphone 100 is worn on the ear of a user.

From a front view of the face of the user, a profile (shown in (a) in FIG. 51) of a head phantom directivity mode of the first antenna 201 may be obtained.

From the front view of the face of the user, a profile (shown in (b) in FIG. 51) of the head phantom directivity mode of the second antenna 202 may be obtained.

From the front view of the face of the user, a plan view 1-1-10 (shown in (c) in FIG. 51) of the head phantom directivity mode of the first antenna 201 in a horizontal polarization direction and a plan view 2-1-10 (shown in (c) in FIG. 51) of the head phantom directivity mode of the second antenna 202 in the horizontal polarization direction may be obtained. From the front view of the face of the user, a radiation low point of the dual-antenna structure 200 shown in FIG. 48 in a horizontal polarization direction may be approximately −36 dB.

From the front view of the face of the user, a plan view 1-1-11 (shown in (d) in FIG. 51) of the head phantom directivity mode of the first antenna 201 in a vertical polarization direction and a plan view 2-1-11 (shown in (d) in FIG. 51) of the head phantom directivity mode of the second antenna 202 in the vertical polarization direction may be obtained. From the front view of the face of the user, a radiation low point of the dual-antenna structure 200 shown in FIG. 48 in a vertical polarization direction may be approximately −30 dB.

From the front view of the face of the user, an overall plan view 1-1-12 (shown in (e) in FIG. 51) of the head phantom directivity mode of the first antenna 201 and an overall plan view 2-1-12 (shown in (e) in FIG. 51) of the head phantom directivity mode of the second antenna 202 may be obtained by combining the foregoing plan views 1-1-10 and 2-1-10 of the head phantom directivity mode in the horizontal polarization direction and the foregoing plan views 1-1-11 and 2-1-11 of the head phantom directivity mode in the vertical polarization direction. From the front view of the face of the user, an overall radiation low point of the dual-antenna structure 200 shown in FIG. 48 may be approximately −23 dB.

From a side view of the face of the user, a profile (shown in (a) in FIG. 52) of a head phantom directivity mode of the first antenna 201 may be obtained.

From the side view of the face of the user, a profile (shown in (b) in FIG. 52) of the head phantom directivity mode of the second antenna 202 may be obtained.

From the side view of the face of the user, a plan view 1-2-10 (shown in (c) in FIG. 52) of the head phantom directivity mode of the first antenna 201 in a horizontal polarization direction and a plan view 2-2-10 (shown in (c)

in FIG. 52) of the head phantom directivity mode of the second antenna 202 in the horizontal polarization direction may be obtained. From the side view of the face of the user, a radiation low point of the dual-antenna structure 200 shown in FIG. 48 in a vertical polarization direction may be approximately −17 dB.

From the side view of the face of the user, a plan view 1-2-11 (shown in (d) in FIG. 52) of the head phantom directivity mode of the first antenna 201 in a vertical polarization direction and a plan view 2-2-11 (shown in (d) in FIG. 52) of the head phantom directivity mode of the second antenna 202 in the vertical polarization direction may be obtained. From the side view of the face of the user, a radiation low point of the dual-antenna structure 200 shown in FIG. 48 in a vertical polarization direction may be approximately −40 dB.

From the side view of the face of the user, an overall plan view 1-2-12 (shown in (e) in FIG. 52) of the head phantom directivity mode of the first antenna 201 and an overall plan view 2-2-12 (shown in (e) in FIG. 52) of the head phantom directivity mode of the second antenna 202 may be obtained by combining the foregoing plan views 1-2-10 and 2-2-10 of the head phantom directivity mode in the horizontal polarization direction and the foregoing plan views 1-2-11 and 2-2-11 of the head phantom directivity mode in the vertical polarization direction. From the side view of the face of the user, an overall radiation low point of the dual-antenna structure 200 shown in FIG. 48 may be approximately −15 dB.

From a top view of the head of the user, a profile (shown in (a) in FIG. 53) of a head phantom directivity mode of the first antenna 201 may be obtained.

From the top view of the head of the user, a profile (shown in (b) in FIG. 53) of the head phantom directivity mode of the second antenna 202 may be obtained.

From the top view of the head of the user, a plan view 1-3-10 (shown in (c) in FIG. 53) of the head phantom directivity mode of the first antenna 201 in a horizontal polarization direction and a plan view 2-3-10 (shown in (c) in FIG. 53) of the head phantom directivity mode of the second antenna 202 in the horizontal polarization direction may be obtained. From the top view of the head of the user, a radiation low point of the dual-antenna structure 200 shown in FIG. 48 in a vertical polarization direction may be approximately −22 dB.

From the top view of the head of the user, a plan view 1-3-11 (shown in (d) in FIG. 53) of the head phantom directivity mode of the first antenna 201 in a vertical polarization direction and a plan view 2-3-11 (shown in (d) in FIG. 53) of the head phantom directivity mode of the second antenna 202 in the vertical polarization direction may be obtained. From the top view of the head of the user, a radiation low point of the dual-antenna structure 200 shown in FIG. 48 in a vertical polarization direction may be approximately −26 dB.

From the top view of the head of the user, an overall plan view 1-3-12 (shown in (e) in FIG. 53) of the head phantom directivity mode of the first antenna 201 and an overall plan view 2-3-12 (shown in (e) in FIG. 53) of the head phantom directivity mode of the second antenna 202 may be obtained by combining the foregoing plan views 1-3-10 and 2-3-10 of the head phantom directivity mode in the horizontal polarization direction and the foregoing plan views 1-3-11 and 2-3-11 of the head phantom directivity mode in the vertical polarization direction. From the top view of the head of the user, an overall radiation low point of the dual-antenna structure 200 shown in FIG. 48 may be approximately −21 dB.

It can be learned from the antenna performance shown in FIG. 51 to FIG. 53 that disposing dual antennas with different head phantom directivity modes in the wireless earphone 100 helps improve overall antenna performance of the wireless earphone 100, and further helps improve data transmission efficiency, an audio play effect, and the like of the wireless earphone 100.

Figure 54:
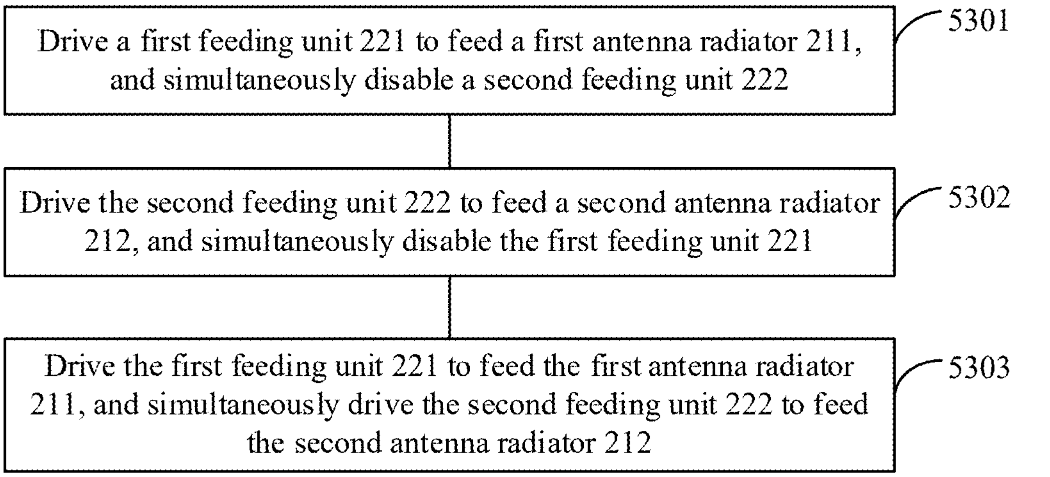
FIG. 54 is a schematic flowchart of a driving method applied to a wireless earphone according to an embodiment of this application.

FIG. 54 shows a driving method applied to a wireless earphone 100 according to an embodiment of this application. The wireless earphone 100 may include a dual-antenna structure 200.

5301: Drive a first feeding unit 221 to feed a first antenna radiator 211, and simultaneously disable a second feeding unit 222.

5302: Drive the second feeding unit 222 to feed a second antenna radiator 211, and simultaneously disable the first feeding unit 221.

5303: Drive the first feeding unit 221 to feed the first antenna radiator 211, and simultaneously drive the second feeding unit 222 to feed the second antenna radiator 211.

Figure 55:
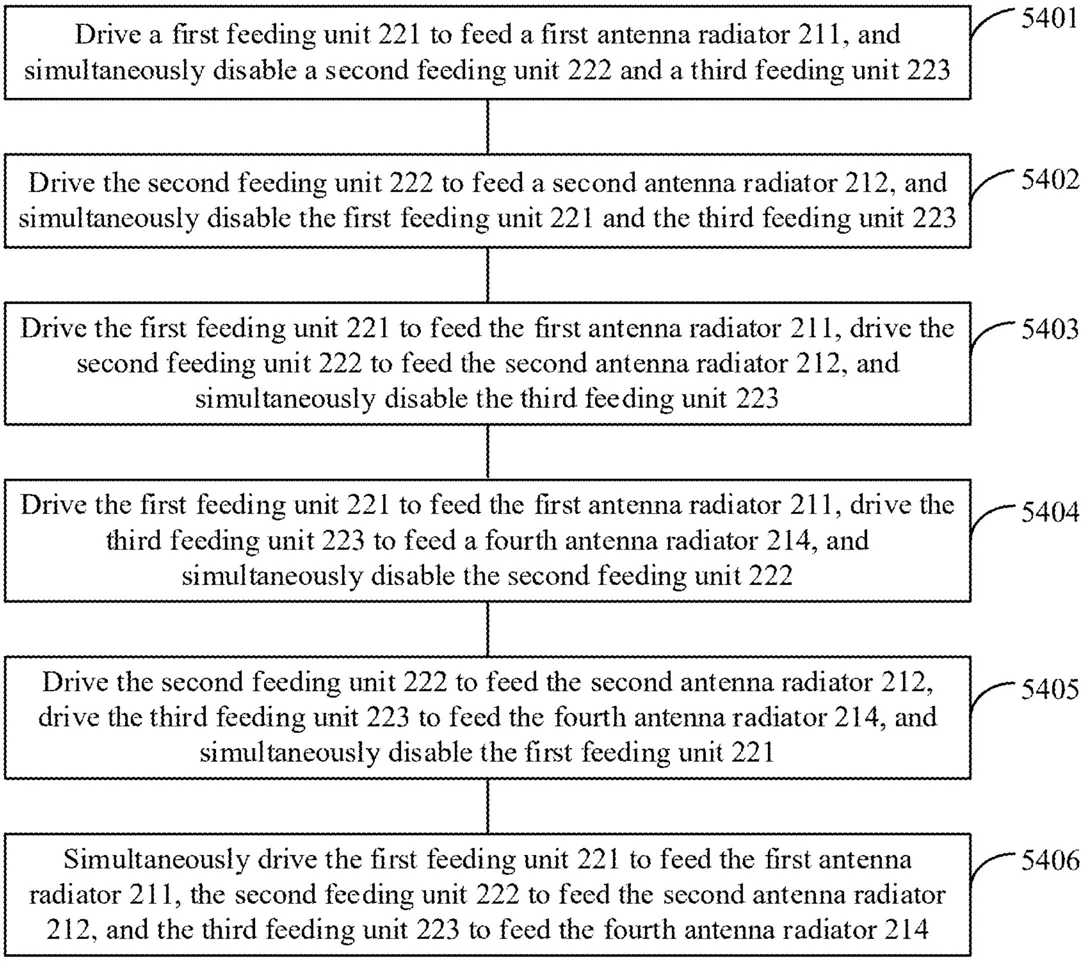
FIG. 55 is a schematic flowchart of a driving method applied to a wireless earphone according to an embodiment of this application.

FIG. 55 shows another driving method applied to a wireless earphone 100 according to an embodiment of this application. The wireless earphone 100 may include a dual-antenna structure 200 and a loop antenna 203.

5401: Drive a first feeding unit 221 to feed a first antenna radiator 211, and simultaneously disable a second feeding unit 222 and a third feeding unit 223.

5402: Drive the second feeding unit 222 to feed a second antenna radiator 211, and simultaneously disable the first feeding unit 221 and the third feeding unit 223.

5403: Drive the first feeding unit 221 to feed the first antenna radiator 211, drive the second feeding unit 222 to feed the second antenna radiator 211, and simultaneously disable the third feeding unit 223.

5404: Drive the first feeding unit 221 to feed the first antenna radiator 211, drive the third feeding unit 223 to feed a fourth antenna radiator 214, and simultaneously disable the second feeding unit 222.

5405: Drive the second feeding unit 222 to feed the second antenna radiator 211, drive the third feeding unit 223 to feed the fourth antenna radiator 214, and simultaneously disable the first feeding unit 221.

5406: Simultaneously drive the first feeding unit 221 to feed the first antenna radiator 211, the second feeding unit 222 to feed the second antenna radiator 211, and the third feeding unit 223 to feed the fourth antenna radiator 214.

In other words, three antennas are disposed in the wireless earphone 100, so as to implement a plurality of antenna operating modes and a plurality of antenna directivity diagrams, and further facilitate application to a plurality of application scenarios (for example, a plurality of data transmission modes or a plurality of audio play modes).

It can be understood that a driving apparatus used in the wireless earphone 100 may include corresponding hardware and/or software modules for performing various functions. In combination with the examples described in embodiments disclosed in this specification, algorithm steps may be implemented by hardware or a combination of hardware and computer software in this application. Whether functions are performed by hardware or hardware driven by computer software depends on particular applications and design constraints of the technical solutions. A person skilled in the art may use different methods to implement the described functions for each particular application with reference to embodiments, but it should not be considered that the implementation goes beyond the scope of this application.

In this embodiment, the driving apparatus used in the wireless earphone 100 may be divided into function modules according to the foregoing method examples. For example, each function module may be obtained through division based on each corresponding function, or two or more functions may be integrated into one processing module. The integrated module may be implemented in a form of hardware. It should be noted that division into the modules in this embodiment is an example and is merely logical function division, and may be other division during actual implementation.

Figure 56:
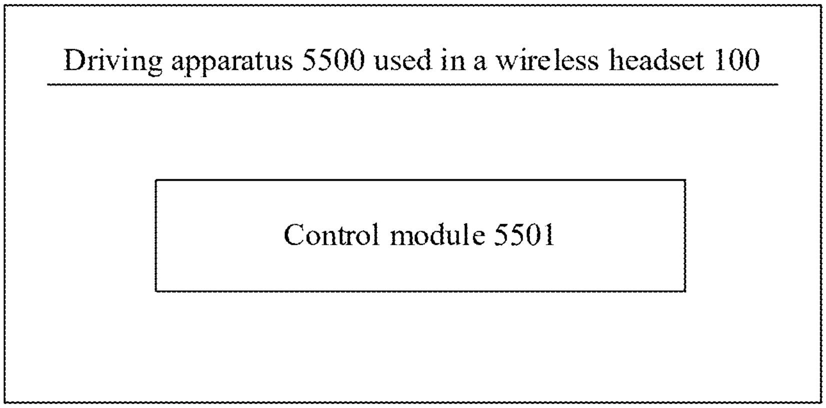
FIG. 56 is a schematic flowchart of a driving apparatus used in a wireless earphone according to an embodiment of this application.

When each function module is obtained through division based on each corresponding function, FIG. 56 is a possible schematic composition diagram of a driving apparatus used in a wireless earphone 100. As shown in FIG. 56, the driving apparatus 5500 used in the wireless earphone 100 may include a control module 5501.

The control module 5501 is configured to perform at least one of the following steps:

driving a first feeding unit 221 to feed a first antenna radiator 212, and simultaneously disabling a second feeding unit 222.

driving the second feeding unit 222 to feed a second antenna radiator 212, and simultaneously disabling the first feeding unit 221; and driving the first feeding unit 221 to feed the first antenna radiator 212, and simultaneously driving the second feeding unit 222 to feed the second antenna radiator 212.

It should be noted that all related content of steps in the foregoing method embodiments may be cited in function descriptions of corresponding function modules. Details are not described herein again.

The driving apparatus 5500 used in the wireless earphone 100 provided in this embodiment is configured to perform the foregoing driving method applied to the wireless earphone 100, and therefore can achieve a same effect as the foregoing implementation method.

Figure 57:
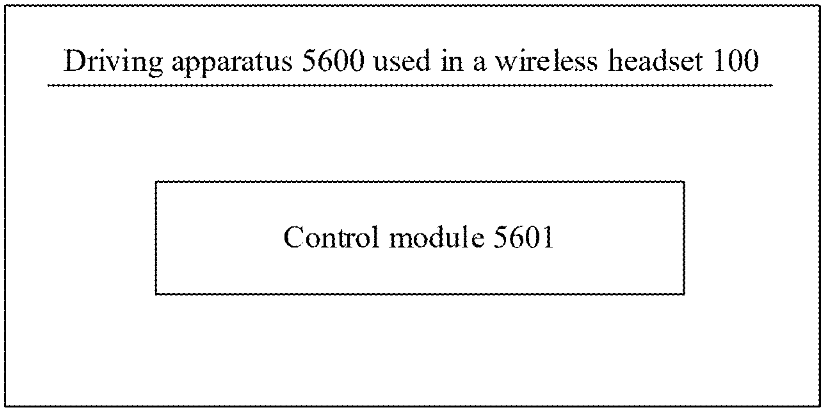
FIG. 57 is a schematic flowchart of a driving apparatus used in a wireless earphone according to an embodiment of this application.

When each function module is obtained through division based on each corresponding function, FIG. 57 is a possible schematic composition diagram of a driving apparatus 5600 used in a wireless earphone 100 in the foregoing embodiment. As shown in FIG. 57, the driving apparatus 5600 used in the wireless earphone 100 may include a control module 5601.

The control module 5601 is configured to perform at least one of the following steps:

driving a first feeding unit 221 to feed a first antenna radiator 212, and simultaneously disabling a second feeding unit 222 and a third feeding unit 223;

driving the second feeding unit 222 to feed a second antenna radiator 212, and simultaneously disabling the first feeding unit 221 and the third feeding unit 223;

driving the first feeding unit 221 to feed the first antenna radiator 212, driving the second feeding unit 222 to feed the second antenna radiator 212, and simultaneously disabling the third feeding unit 223;

driving the first feeding unit 221 to feed the first antenna radiator 212, driving the third feeding unit 223 to feed a fourth antenna radiator 214, and simultaneously disabling the second feeding unit 222;

driving the second feeding unit 222 to feed the second antenna radiator 212, driving the third feeding unit 223 to feed the fourth antenna radiator 214, and simultaneously disabling the first feeding unit 221; and simultaneously driving the first feeding unit 221 to feed the first antenna radiator 212, the second feeding unit 222 to feed the second antenna radiator 212, and the third feeding unit 223 to feed the fourth antenna radiator 214.

It should be noted that all related content of steps in the foregoing method embodiments may be cited in function descriptions of corresponding function modules. Details are not described herein again.

The driving apparatus 5600 used in the wireless earphone 100 provided in this embodiment is configured to perform the foregoing driving method applied to the wireless earphone 100, and therefore can achieve a same effect as the foregoing implementation method.

When an integrated unit is used, the driving apparatus 5600 used in the wireless earphone 100 may include a processing module, a storage module, and a communications module. The processing module may be configured to perform control management on an action of the driving apparatus 5600 used in the wireless earphone 100, for example, may be configured to support the driving apparatus 5600 used in the wireless earphone 100 in performing the steps performed by the foregoing units. The storage module may be configured to support the driving apparatus 5600 used in the wireless earphone 100 in storing program code, data, and the like.

The processing module may be a processor or a controller. The processing module may implement or execute logical blocks, modules, and circuits in various examples described with reference to content disclosed in this application. The processor may alternatively be a combination of implementing a computing function, for example, a combination of one or more microprocessors, or a combination of a digital signal processor (digital signal processor, DSP) and a microprocessor. The storage module may be a memory.

An embodiment further provides a computer program product. When the computer program product runs on a computer, the computer is enabled to perform the foregoing related steps, so as to implement the driving method applied to the wireless earphone 100 in the foregoing embodiment.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, so that the chip performs the driving method applied to the wireless earphone 100 in the foregoing method embodiment.

An embodiment of this application further provides a computer-readable storage medium. The computer-readable storage medium stores a computer program. When the computer program is executed by a computer, the driving method procedure applied to the wireless earphone 100 in any one of the foregoing method embodiments is implemented.

An embodiment of this application further provides a computer program or a computer program product including a computer program. When the computer program is executed on a computer, the computer is enabled to implement the driving method procedure applied to the wireless earphone 100 in any one of the foregoing method embodiments.

An embodiment of this application further provides an apparatus. The apparatus is coupled to a memory, and is configured to read and execute instructions stored in the memory, so that the apparatus can perform the driving method procedure applied to the wireless earphone 100 in any one of the foregoing method embodiments. The memory may be integrated into the processor, or may be independent of the processor. The apparatus may be a chip (for example, a system-on-a-chip (system-on-a-chip, SoC)).

It should be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory. RAM), and is used as an external cache. By way of example and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that the memory described in this specification is intended to include but not limited to these memories and any other appropriate types of memories.

It should be further understood that “first”, “second”, and various numbers in this specification are merely used for ease of distinguishing, and are not intended to limit the scope of this application.

In this application, “and/or” describes an association relationship between associated objects and represents that three relationships may exist. For example, A and/or B may represent the following cases: Only A exists, both A and B exist, and only B exists, where A and B may be singular or plural. A character “/” usually indicates an “or” relationship between associated objects.

In this application, “at least one” means one or more, and “a plurality of” means to two or more. In addition, “at least one of” the following items (pieces) or a similar expression thereof indicates any combination of these items, including a single item (piece) or any combination of a plurality of items (pieces). For example, “at least one of a, b, or c” or “at least one of a, b, and c” may represent a, b, c, a and b, a and c, b and c, or a, b, and c, where a, b, and c may be singular or plural.

It should be understood that sequence numbers of the foregoing processes do not mean execution sequences in various embodiments of this application. Some or all steps may be performed in parallel or in sequence. The sequence of executing the processes should be determined based on functions and internal logic of the processes, and shall not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether these functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for the purpose of convenient and brief description, for a detailed operating process of the foregoing system, apparatus, and unit, refer to a corresponding process in the foregoing method embodiment. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may be or may not be physically separate, and parts displayed as units may be or may not be physical units, that is, may be located in one place, or may be distributed on a plurality of network units. Some or all of the units may be selected according to actual requirements to achieve the objectives of the solutions of embodiments.

In addition, function units in embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory. RAM), a magnetic disk, or an optical disc.

Related parts in the method embodiments of this application may be mutually referenced. The apparatuses provided in the apparatus embodiments are configured to perform the methods provided in the corresponding method embodiments. Therefore, for the apparatus embodiments, refer to related parts in the related method embodiments for understanding.

The diagrams of the structures of the apparatuses provided in the apparatus embodiments of this application show only simplified designs of corresponding apparatuses. During actual application, the apparatus may include any quantity of transmitters, receivers, processors, memories, and the like, so as to implement functions or operations performed by the apparatus in each apparatus embodiment of this application, and all apparatuses that can implement this application fall within the protection scope of this application.

Names of the message/frame/indication information, the module, the unit, and the like provided in embodiments of this application are merely examples, and other names may be used provided that functions of the message/frame/indication information, the module, the unit, and the like are the same.

Terms used in embodiments of this application are merely for the purpose of describing specific embodiments, and are not intended to limit this application. Terms "a", "said", and "the" of singular forms used in embodiments and the appended claims of this application are also intended to include plural forms, unless otherwise specified in the context clearly. It should be further understood that a term "and/or" used in this specification indicates and includes any or all possible combinations of one or more associated listed items. In this specification, a character "/" usually indicates an "or" relationship between associated objects.

Depending on the context, for example, a word "if" used herein may be explained as "while", or "when", or "in response to determining", or "in response to detecting". Similarly, depending on the context, phrases "if determining" or "if detecting (a stated condition or event)" may be explained as "when determining", or "in response to determining", or "when detecting (the stated condition or event)", or "in response to detecting (the stated condition or event)".

A person of ordinary skill in the art may understand that all or some of the steps of the method in the foregoing embodiment may be implemented by a program instructing related hardware. The program may be stored in a readable storage medium of a device, such as a flash memory or an EEPROM. When the program runs, the program executes all or some of the steps described above.

In the foregoing specific implementations, the objectives, technical solutions, and benefits of this application are further described in detail. It should be understood that different embodiments may be combined, and the foregoing descriptions are merely specific implementations of this application, but are not intended to limit the protection scope of this application. Any combination, modification, equivalent replacement, or improvement made within the spirit and principle of this application should fall within the protection scope of this application.

What is claimed is:

1. A wireless earphone comprising:
an earbud part;
an earbud stem part; and
an antenna unit disposed in the earbud part and the earbud stem part and comprising:
a first antenna radiator comprising a first end;
a first feeding unit electrically coupled to the first end, and configured to feed the first antenna radiator;
a second antenna radiator comprising a second end, wherein the second end and the first end are disposed at intervals, wherein at least a part of one of the first antenna radiator or the second antenna radiator is located in the earbud part, and the other is located in the earbud stem part, or at least a part of the first antenna radiator and at least a part of the second antenna radiator both are located in the earbud stem part;
a second feeding unit electrically coupled to the second end, and configured to feed the second antenna radiator; and
a third antenna radiator comprising:
a first ground point;
at least a part located in the earbud part; and
a third end,
wherein there is a first distance between the third end and the first end, and
wherein there is a second distance between the third end and the second end.

2. The wireless earphone of claim 1, wherein a first extension direction of the first antenna radiator at the first end is a first direction, wherein a second extension direction of the second antenna radiator at the second end is a second direction, and wherein an included angle between the first direction and the second direction ranges from 90 degrees (°) to 270°.

3. The wireless earphone of claim 1, wherein the earbud stem part comprises:
a top segment;
a bottom segment; and
a connecting segment located between the top segment and the bottom segment and coupled to the earbud part, wherein the first antenna radiator further comprises a part extending from the connecting segment to the top segment, and the second antenna radiator further comprises a part extending from the connecting segment to the bottom segment, or the first antenna radiator comprises a part extending from the connecting segment to the top segment, and the second antenna radiator comprises a part extending from the connecting segment to the earbud part.

4. The wireless earphone of claim 1, wherein the earbud stem part comprises:
a bottom segment; and
a connecting segment coupled between the earbud part and the bottom segment,
wherein the first antenna radiator further comprises a part extending from the connecting segment to the earbud part, and
wherein the second antenna radiator comprises a part extending from the connecting segment to the bottom segment.

5. The wireless earphone of claim 1, wherein the second antenna radiator is configured to extend in a length direction of the earbud stem part, wherein the third antenna radiator further comprises:
a fourth end located in the earbud part; and
a fifth end is located in the earbud stem part,
wherein the third end is coupled between the fourth end and the fifth end,
wherein the third antenna radiator is configured to extend from the fourth end to the third end and further extend from the third end to the fifth end,
wherein a part that is of the third antenna radiator and that is between the third end and the fifth end comprises:
a first mutual-interference reduction segment;
a second mutual-interference reduction segment; and
a mutual-interference reduction segment connecting segment coupled between the first mutual-interference reduction segment and the second mutual-interference reduction segment, wherein both the first mutual-interference reduction segment and the second mutual-interference reduction segment are configured to extend in the length direction, and wherein there is a third distance between the first mutual-interference reduction segment and the second antenna radiator and a fourth distance between the second mutual-interference reduction segment and the second antenna radiator.

6. The wireless earphone of claim 1, further comprising a loop antenna comprising:

a fourth antenna radiator located in the earbud part and comprising:

a fourth end; and a fifth end; and a third feeding unit comprising:

a sixth end electrically coupled to the fourth end; and a seventh end electrically coupled to the fifth end.

7. The wireless earphone of claim 6, wherein the fourth antenna radiator is configured to operate as the loop antenna when the third feeding unit feeds the fourth antenna radiator, wherein an electrical length of the loop antenna is an integer multiple of a, wherein:

$$a=(0.7\sim1.3)\times\lambda, \text{ and}$$

wherein λ is a target resonance wavelength corresponding to an operating frequency band of the wireless earphone.

8. The wireless earphone of claim 7, wherein the earbud part is of a truncated-cone shape, and wherein the fourth antenna radiator is circumferentially disposed relative to the earbud part.

9. The wireless earphone of claim 1, further comprising a battery located in the earbud part, wherein both the first antenna radiator and the second antenna radiator are located in the earbud stem part.

10. The wireless earphone of claim 9, wherein the first antenna radiator is configured to extend in a length direction of the earbud stem part.

11. The wireless earphone of claim 9, wherein the first antenna radiator further comprises:

a first segment configured to extend in a length direction of the earbud stem part; and a second segment of a spiral shape, wherein the first segment is coupled between the first feeding unit and the second segment.

12. The wireless earphone of claim 11, wherein the second segment is perpendicularly disposed relative to the length direction.

13. The wireless earphone of claim 10, wherein the earbud stem part comprises two ends, and wherein the second antenna radiator and the first antenna radiator are respectively located at the two ends.

14. The wireless earphone of claim 10, wherein a difference between a second width of the second antenna radiator and a first width of the first antenna radiator is less than a preset width.

15. The wireless earphone of claim 1, further comprising a battery located in the earbud stem part and disposed in a length direction of the earbud stem part.

16. The wireless earphone of claim 1, wherein when the first feeding unit feeds the first antenna radiator;

the first antenna radiator and the third antenna radiator are configured to operate as a first antenna; and a first electrical length of the first antenna is an integer multiple of b, wherein:

$$b=\left(\frac{0.7}{2}\sim\frac{1.3}{2}\right)\times\lambda;$$

and when the second feeding unit feeds the second antenna radiator;

the second antenna radiator and the third antenna radiator are configured to operate as a second antenna; and a second electrical length of the second antenna is an integer multiple of c, wherein:

$$c=\left(\frac{0.7}{2}\sim\frac{1.3}{2}\right)\times\lambda,$$

wherein λ is a target resonance wavelength corresponding to an operating frequency band of the wireless earphone.

17. The wireless earphone of claim 1, wherein the first antenna radiator and the first feeding unit are configured to form a monopole antenna or an inverted F antenna.

18. The wireless earphone of claim 1, wherein the second antenna radiator and the second feeding unit are configured to form an inverted F antenna.

19. The wireless earphone of claim 1, wherein the first distance between the third end and the first end is less than 5 millimeters (mm), and wherein the second distance between the third end and the second end is less than 5 mm.

20. The wireless earphone of claim 5, wherein the third distance between the first mutual-interference reduction segment and the second antenna radiator is less than 5 millimeters (mm), and wherein the fourth distance between the second mutual-interference reduction segment and the second antenna radiator is less than 5 mm.

* * * * *